United States Patent
Yamanaka et al.

(10) Patent No.: US 8,885,326 B2
(45) Date of Patent: Nov. 11, 2014

(54) SOLID ELECTROLYTIC CAPACITOR AND METHOD FOR MANUFACTURING THE SAME

(75) Inventors: Takafumi Yamanaka, Kyoto (JP); Naotsugu Sugimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 143 days.

(21) Appl. No.: 13/455,671

(22) Filed: Apr. 25, 2012

(65) Prior Publication Data

US 2012/0275083 A1 Nov. 1, 2012

(30) Foreign Application Priority Data

Apr. 26, 2011 (JP) .................................. 2011-97861
May 13, 2011 (JP) ................................ 2011-108412
Aug. 31, 2011 (JP) ................................ 2011-189839

(51) Int. Cl.
| | | |
|---|---|---|
| *H01G 4/228* | (2006.01) | |
| *H01G 9/00* | (2006.01) | |
| *H01G 9/012* | (2006.01) | |
| *H01G 9/15* | (2006.01) | |
| *H01G 9/028* | (2006.01) | |
| *H01G 9/052* | (2006.01) | |

(52) U.S. Cl.
CPC ............. *H01G 9/012* (2013.01); *H01G 9/052* (2013.01); *H01G 9/15* (2013.01); *H01G 9/028* (2013.01)
USPC .......................................... 361/540; 361/528

(58) Field of Classification Search
CPC ................................ H01G 9/012; H01G 9/008
USPC .................. 361/540, 533, 531, 528
See application file for complete search history.

(56) References Cited

U.S. PATENT DOCUMENTS

| | | | | |
|---|---|---|---|---|
| 6,507,482 B2* | 1/2003 | Harada et al. | ............... | 361/535 |
| 7,359,181 B2* | 4/2008 | Kuriyama | .................. | 361/540 |
| 7,787,235 B2* | 8/2010 | Fujita et al. | .................. | 361/528 |
| 8,289,678 B2* | 10/2012 | Kim et al. | .................... | 361/538 |
| 2007/0188982 A1* | 8/2007 | Kuriyama | .................. | 361/528 |
| 2008/0062617 A1* | 3/2008 | Edson et al. | ................ | 361/529 |
| 2008/0259528 A1* | 10/2008 | Fujita et al. | ................. | 361/528 |
| 2009/0080144 A1* | 3/2009 | Matumoto et al. | ........... | 361/528 |
| 2009/0116172 A1* | 5/2009 | Takahashi et al. | ........... | 361/528 |

FOREIGN PATENT DOCUMENTS

| | | | |
|---|---|---|---|
| JP | 06-196349 | | 7/1994 |
| JP | 07-050231 | | 2/1995 |
| JP | 07-249727 | | 9/1995 |
| JP | 2002-367862 | | 12/2002 |
| JP | 2003163136 A | * | 6/2003 |
| JP | 2008091704 A | * | 4/2008 |
| JP | 2008-135460 | | 6/2008 |

* cited by examiner

*Primary Examiner* — Eric Thomas
(74) *Attorney, Agent, or Firm* — Hamre, Schumann, Mueller & Larson, P.C.

(57) ABSTRACT

A solid electrolytic capacitor includes: a porous sintered body; an anode wire extending in a first direction and connected to the porous sintered body such that one end portion of the anode wire in the first direction is exposed; a resin package covering the porous sintered body and the anode wire; and a lead including a terminal exposed from the resin package and a lead side connector connected to the terminal. The anode wire includes a base and a connector placed at one side of the base in the first direction, a sectional area of the connector is smaller than that of the base, and the connector and the lead side connector are welded together.

19 Claims, 39 Drawing Sheets

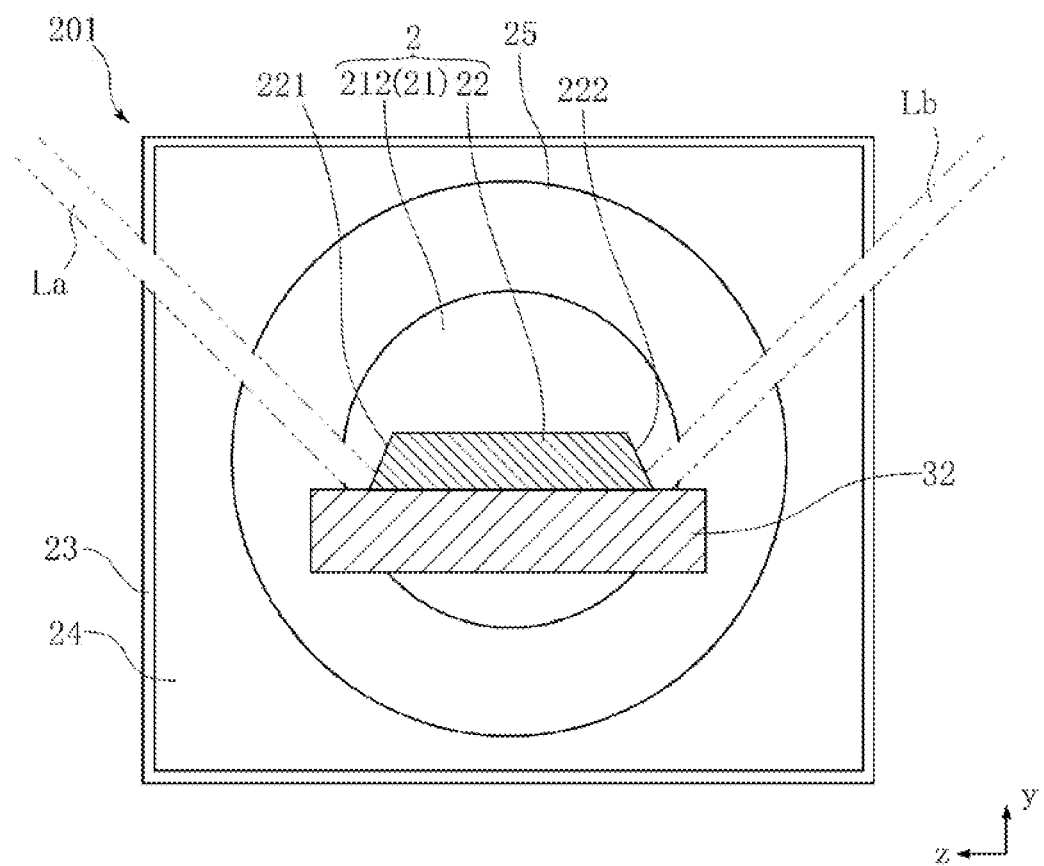

| | Thickness (μm) | Thermal expansion coefficient | Thermal conductivity |
|---|---|---|---|
| First layer | 10~100 | Small | Small |
| Second layer | 10~100 | Middle | Middle |
| Third layer | 10~100 | Large | Large |

SOLID ELECTROLYTIC CAPACITOR AND METHOD FOR MANUFACTURING THE SAME

CROSS-REFERENCE TO RELATED APPLICATIONS

This application is based upon and claims the benefit of priority from Japanese Patent Applications No. 2011-97861, 2011-108412 and 2011-189839, filed on Apr. 26, 2011, May 13, 2011 and Aug. 31, 2011, respectively, the entire contents of which are incorporated herein by reference.

TECHNICAL FIELD

The present disclosure relates to a solid electrolytic capacitor and a method for manufacturing the same.

BACKGROUND

Solid electrolytic capacitors made of a valve-acting metal such as tantalum, niobium or the like have been used for electronic devices requiring high capacity and compactness.

FIG. 42 is a sectional view showing an example of a conventional solid electrolytic capacitor. Referring to FIG. 42, a solid electrolytic capacitor 90 is of a surface mounting type and includes a resin package 91, a solid electrolytic capacitor chip 92, an anode lead 93 and a cathode lead 94. The resin package 91 is made of a thermosetting resin such as epoxy resin or the like and covers the entire surface of the solid electrolytic capacitor chip 92. The resin package 91 also covers the anode lead 93 in a manner to expose an anode lead portion 931 of the anode lead 93 and the cathode lead 94 in a manner to expose a cathode lead portion 941 of the cathode lead 94. Such a solid electrolytic capacitor 90 is manufactured in substantially the same way as the electronic components of a resin package type semiconductor and so on. That is, after the solid electrolytic capacitor chip 92 is fixed between lead frames for manufacture, a mold surrounding the solid electrolytic capacitor chip 92 with resin is formed. Thereafter, the lead frames are machined into a predetermined shape while removing unnecessary portions of the lead frames.

The solid electrolytic capacitor chip 92 is, for example, a dry tantalum capacitor chip. The solid electrolytic capacitor chip 92 includes an anode wire 921, a cathode metal film 922 and a porous sintered body 923. The anode wire 921 has an elongated shape with a predetermined diameter and is made of tantalum, as shown in FIG. 42. A proximal end 921a (the right end in FIG. 42) of the anode wire 921 is buried in the porous sintered body 923. A distal end 921b (the left end in FIG. 42) of the anode wire 921 is connected to the anode lead 93, as shown in FIG. 42. The cathode metal film 922 covers the porous sintered body 923 in a manner to expose only the left end of the porous sintered body 923 in FIG. 42. The cathode metal film 922 is connected to the cathode lead 94 via a silver paste 95. The porous sintered body 923 is made by sintering tantalum powder pressed into a predetermined shape under a vacuum atmosphere and forming an oxide film on the resulting sintered body. Pores of the porous sintered body 923 are filled with semiconductors such as manganese dioxide and the like.

Connection between the distal end 921b of the anode wire 921 and the anode lead 93 is made by welding using, for example, a laser. Specifically, the distal end 921b of the anode wire 921 and the anode lead 93 are brought into contact with each other, and then a laser is irradiated on a contact portion therebetween. The laser-heated contact portion between the distal end 921b of the anode wire 921 and the anode lead 93 is melted and then cooled to be welded together.

The solid electrolytic capacitor 90 is assembled in, for example, an electronic device. The solid electrolytic capacitor 90 requires a low equivalent series resistance (ESR) in order to lower power consumption of the electronic device. A method of lowering the ESR of the solid electrolytic capacitor 90 may be increasing the diameter of the anode wire 921 to thereby increase the contact area between the anode wire 921 and the porous sintered body 923.

However, increasing the diameter of the anode wire 921 may cause a problem in that the amount of heat required to weld the anode wire 921 with a laser increases with an increase of the diameter of the anode wire 921. Accordingly, heat transferred to the anode wire 921 during the welding increases as much as the diameter increases, which results in an increase in the amount of heat transferred to the porous sintered body 923 via the anode wire 921. The increase in the amount of heat transferred to the porous sintered body 923 may lead to damage of the oxide film formed on the porous sintered body 923. The damage to the oxide film may cause a current leakage between the anode wire 921 and the cathode metal film 922 when using the solid electrolytic capacitor 90.

FIG. 43 is a perspective view showing an example of another conventional solid electrolytic capacitor. Referring to FIG. 43, a solid electrolytic capacitor 90 includes a cubic resin package 91, a solid electrolytic capacitor chip 92, an anode wire 921, an anode lead 93, a lead side connector 95 and a cathode lead 94. The resin package 91 is made of a thermosetting resin such as epoxy resin or the like and covers the entire surface of the solid electrolytic capacitor chip 92, the anode wire 921 and the lead side connector 95 and a partial surface of the anode lead 93 and the cathode lead 94. Portions of the anode lead 93 and the cathode lead 94 are exposed from the resin package 91 and these exposed portions act as terminals of the solid electrolytic capacitor 90. The solid electrolytic capacitor 90 is mounded on, for example, a printed circuit board. The above-mentioned terminals are used to mount the solid electrolytic capacitor 90 on the printed circuit board.

As shown in FIG. 43, the solid electrolytic capacitor chip 92 has a cubic shape and the anode wire 921 extends and projects from one surface of the chip 92 in the longitudinal direction. The lead side connector 95 is disposed at one side of the solid electrolytic capacitor chip 92 in the longitudinal direction and welded to the anode wire 921. With this arrangement, the resin package 91 is formed to be longer than the solid electrolytic capacitor chip 92 in the longitudinal direction by as much as the lengths of the anode wire 921 and lead side connector 95.

Recently, there has been an increasing need for high capacity for the solid electrolytic capacitor 90. In general, the solid electrolytic capacitor 90 is required to have a large volume in order to obtain a high capacity. In this case, the resin package 91 covering the solid electrolytic capacitor 90 is also required to have a large volume, which results in an increase in size of the solid electrolytic capacitor 90.

On the other hand, the printed circuit board on which the solid electrolytic capacitor 90 is mounted becomes more compact with the miniaturization of electronic components. Accordingly, there is an inevitable need for the miniaturization of the solid electrolytic capacitor 90. However, as described above, in order to achieve the high capacity of the solid electrolytic capacitor 90, it is difficult to avoid increasing the size of the solid electrolytic capacitor 90 and achieving miniaturization of the solid electrolytic capacitor 90.

In the related art, there has been proposed a solid electrolytic capacitor using manganese dioxide as a solid electrolytic layer. An electrode substrate of the proposed solid electrolytic capacitor includes a base material made of nickel or a nickel alloy, for example, a 42 alloy (including nickel of 42% and iron of 58%) or a Cu—Ni—Zn alloy (also called a German alloy), a copper underlying layer plated on the base material, and a tin or solder layer plated on the copper underlying layer.

Using the above-mentioned material as a plating material is a result of considering connection stability of a conductive bonding member for connecting a solid electrolytic capacitor chip and an electrode substrate and solder adhesiveness (i.e., solder wettability) during the process of mounting chip components.

In addition, in a solid electrolytic capacitor of a type using a conductive polymer as a solid electrolytic layer, a frame base material made of a copper-based metal, silver plating, gold plating or palladium plating may be used to prevent the electrical characteristics of a solid electrolytic capacitor chip from being damaged.

Specifically, the chip-shaped solid electrolytic capacitor of the conductive polymer type places an emphasis on high conductivity, as described above, and, in many cases, uses a 3-layered plating structure including nickel/palladium/gold.

There has also been proposed a solid electrolytic capacitor of a conductive polymer type which prevents deterioration of ESR (Equivalent Series Resistance) characteristics while avoiding the use of expensive metal such as gold or palladium in order to reduce production costs.

However, the above-mentioned conventional capacitor has a problem in that a solid electrolytic capacitor chip may be damaged by heat transferred thereto from an electrode substrate during a solder mounting process or a reflow process, for example. To overcome this problem, the use of a metal having low thermal conductivity may be considered. However, selectable metals are limited when considering compatibility with materials contacting the metal or the conductivity of the metal.

FIG. 44 is a sectional view showing an example of another conventional solid electrolytic capacitor. As shown in FIG. 44, the solid electrolytic capacitor has a structure in which a solid electrolytic capacitor chip 92, a lead side connector 95 and an electrode substrate 96 are assembled together. The solid electrolytic capacitor chip 92 has a structure in which a porous sintered body 923, a dielectric layer 13, a solid electrolytic layer 14 and a cathode lead-out layer 15 are sequentially formed, and includes an anode wire 921. The cathode lead-out layer 15 is bonded to the electrode substrate 96 via a bonding member 17.

The electrically functioning part of the solid electrolytic capacitor in FIG. 44 is mainly divided into the solid electrolytic capacitor chip 92 and the electrode substrate 96. The base material of the electrode substrate 96 is required to have properties such as, for example, mechanical strength, heat resistance (thermal peeling resistance), thermal conductivity and soldering wettability.

Meanwhile, there has also been proposed a technique for alleviating stress distortion due to thermal stress in a resin sealing type semiconductor device by forming a die pad loading semiconductor chips into a multi-layered structure, in which the thermal expansion coefficient of a first layer is larger than that of a second layer disposed above the first layer.

SUMMARY

The present disclosure provides some embodiments of a solid electrolytic capacitor and a method for manufacturing the same, the solid electrolytic capacitor being capable of decreasing ESR while suppressing a leakage current.

The solid electrolytic capacitor also has a configuration capable of simultaneously achieving high capacity and compactness and has a structure in which metal materials such as metal or an alloy are stacked, cutouts and unevenness are formed, and contact points between the elements and resin materials are optimally designed, thereby improving heat resistance and reliability.

According to one aspect of the present disclosure, there is provided a solid electrolytic capacitor including: a porous sintered body; an anode wire extending in a first direction and connected to the porous sintered body such that one end of the anode wire in the first direction is exposed; a resin package covering the porous sintered body and the anode wire; and a lead including a terminal exposed from the resin package and a lead side connector connected to the terminal, wherein the anode wire includes a base and a connector placed at one side of the base in the first direction, a sectional area of the connector is smaller than that of the base, and the connector and the lead side connector are welded together.

In some embodiments, the base has a circular section and extends in the first direction, the lead side connector is placed at one side of the connector in a second direction perpendicular to the first direction, and a thickness of the connector in the second direction is smaller than a diameter of the section of the base.

In some embodiments, the connector has a plate shape having a thickness in the second direction smaller than the diameter of the section of the base.

In some embodiment, the connector has an inclined portion formed at one edge portion of the connector in a third direction perpendicular to the first and the second direction, a thickness of the inclined portion in the second direction decreasing as it moves toward the third direction.

In some embodiments, said one edge portion of the inclined portion of the connector in the third direction is welded to the lead side connector.

In some embodiments, the connector has a diamond-like section having a diagonal width smaller than the diameter of the base.

In some embodiments, the connector has a circular section having a diameter smaller than that of the base.

In some embodiments, the connector has a circular section having a diameter smaller than that of the base.

In some embodiments, the solid electrolytic capacitor further includes a cavity interposed in the second direction between the connector and one end portion of the groove in the second direction.

In some embodiments, the groove has a V shape when viewed in the first direction, and a pair of slopes forming the V shape is welded to the connector.

In some embodiments, the connector is placed to overlap with the center portion of the section of the base when viewed in the first direction.

In some embodiments, the connector is placed to overlap with one end portion of the base in the second direction when viewed in the first direction.

In some embodiments, a rough surface is formed on one side of the connector in the second direction.

In some embodiments, one end portion of the connector in the first direction is exposed from the porous sintered body.

In some embodiments, one end portion of the base in the first direction is exposed from the porous sintered body.

In some embodiments, the solid electrolytic capacitor further includes a hydrophobic member, wherein the base has an exposed portion exposed from the porous sintered body, and the hydrophobic member is brought into contact with the exposed portion and one end surface of the porous sintered body in the first direction.

In some embodiments, the base further has an embedded portion connected to the exposed portion and embedded in the porous sintered body.

According to another aspect of the present disclosure, there is provided a method for manufacturing a solid electrolytic capacitor including: machining a manufacturing wire extending in a first direction and connected to a porous sintered body such that a first end portion is exposed in the first direction; welding the manufacturing wire and a lead side connector of a manufacturing lead together; and forming a resin package covering the porous sintered body, wherein said machining the manufacturing wire includes decreasing a sectional area of at least a portion of the manufacturing wire exposed from the porous sintered body, wherein a first portion of the manufacturing wire corresponds to a connector, the first portion having a sectional area decreased by said decreasing the sectional area, and wherein a second portion of the manufacturing wire corresponds to a base, the second portion including a second end portion opposite to the first end portion in the first direction and not subjected to said decreasing the sectional area.

In some embodiments, the manufacturing wire has a circular section, wherein in said machining the manufacturing wire, a thickness of the manufacturing wire in a second direction perpendicular to the first direction is machined to be smaller than a diameter of a section of the manufacturing wire, and wherein in said welding the manufacturing wire and the lead side connector, one side of the connector in the second direction is welded to the lead side connector.

With this configuration, when the solid electrolytic capacitor is manufactured, the connector can be welded to the lead side connector with less heat than in the case where the base is welded to the lead side connector. Accordingly, even if the base is formed with a relatively thick manufacturing wire, it is possible to reduce the heat required for welding the connector and to prevent the porous sintered body from being damaged. Accordingly, since the porous sintered body can be prevented from being damaged when the solid electrolytic capacitor of the present disclosure is manufactured, it is possible to prevent a current leak. In addition, since the base can be made thick, the solid electrolytic capacitor of the present disclosure is suitable for the reduction of ESR.

According to yet another aspect of the present disclosure, there is provided a solid electrolytic capacitor including a solid electrolytic capacitor chip; a resin package which cover the solid electrolytic capacitor chip; an anode wire having one end in a longitudinal direction is connected to the solid electrolytic capacitor chip; and an anode lead which makes electrical conduction with the anode wire, wherein the resin package includes a first lateral face having a side extending in a first direction and a second lateral face having a side extending in a second direction perpendicular to the first direction, both of the first and second lateral faces having a side extending in a third direction perpendicular to the first and second direction, and the solid electrolytic capacitor chip includes a first face parallel to the first lateral face, a second face parallel to the second lateral face, and a third face interposed between the first face and the second face when viewed in the longitudinal direction of the anode wire, the anode wire projecting from the third face.

In some embodiments, the longitudinal direction of the anode wire is inclined with respect to either the first direction or the second direction.

In some embodiments, the longitudinal direction of the anode wire is vertical to the third face.

In some embodiments, the longitudinal direction of the anode wire is perpendicular to the third direction.

In some embodiments, the anode wire has a first wire exposed face coinciding with the first lateral face.

In some embodiments, the anode wire has a second wire exposed face coinciding with the second lateral face.

In some embodiments, the anode lead includes a lead side connector welded to the anode wire, the lead side connector overlapping with the solid electrolytic capacitor chip when viewed in the first and second directions.

In some embodiments, the lead side connector has a first exposed face coinciding with the first lateral face.

In some embodiments, one edge of the first exposed face in the first direction overlaps with an edge of the first lateral face in the first direction when viewed in the third direction.

In some embodiments, the lead side connector has a second exposed face coinciding with the second lateral face.

In some embodiments, one edge of the second exposed face in the second direction overlaps with an edge of the second lateral face in the second direction when viewed in the third direction.

In some embodiments, the longitudinal direction of the anode wire is inclined by 45 degrees with respect to the first direction.

In some embodiments, the anode wire has an exposed portion projecting from the first face and an embedded portion embedded in the solid electrolytic capacitor chip.

According to still another aspect of the present disclosure, there is provided a method for manufacturing a solid electrolytic capacitor, including the steps of: forming a solid electrolytic capacitor chip including a first face having a side extending in a first direction, a second face having a side extending in a second direction perpendicular to the first direction, and a third face which connects one edge of the first face in the first direction and one edge of the second face in the second direction, and an intermediate element having a manufacturing wire which projects from the third face; and forming a resin package which cover the solid electrolytic capacitor chip and has a first lateral face parallel to the first face and a second lateral face parallel to the second face.

In some embodiments, the step of forming an intermediate element includes forming the solid electrolytic capacitor chip, and the step of forming the solid electrolytic capacitor chip include pressing metal powders into a power solidified body having the first to third faces using a press mold.

In some embodiments, the method further includes the step of placing the manufacturing wire in the press mold and the step of pressing is performed after the step of placing the manufacturing wire in the press mold is performed.

In some embodiments, the step of forming a resin package includes forming a resin material covering the solid electrolytic capacitor chip and cutting the resin material, and the step of cutting the resin material includes forming the first lateral face by cutting the resin material along the first direction and forming the second lateral face by cutting the resin material along the second direction.

In some embodiments, the step of cutting the resin material includes cutting the manufacturing wire.

In some embodiments, the method further includes the steps of placing a lead for a lead side connector and contacting the lead for the lead side connector with the manufacturing wire, wherein the step of cutting the resin material includes cutting the lead for the lead side connector.

In some embodiments, the method further includes the steps of fixing the other end of the manufacturing wire in the longitudinal direction to an elongated wire support and bending the manufacturing wire, wherein the longitudinal direction of the wire support coincides with the second direction by bending the manufacturing wire.

In conventional structures where an anode wire projects from one face of a cubic solid electrolytic capacitor chip, there has been a need to make a resin package longer than the solid electrolytic capacitor chip in the longitudinal direction of the anode wire as much as the anode wire projects. However, in the present disclosure, the solid electrolytic capacitor chip has the third face interposed between the first and second faces parallel to the first and second lateral faces of the resin package when viewed in the longitudinal direction of the anode wire and the anode wire projects from the third face. This third face is inclined with respect to the first and second faces, and if the resin package is cubic, an available space is formed between a corner of the cube and the third face. In the solid electrolytic capacitor of the present disclosure, this space can be used to make the size of the resin package closer to the size of the solid electrolytic capacitor chip than when the anode wire projects from the first and second faces. In other words, the solid electrolytic capacitor of the present disclosure can improve a ratio of the volume occupied by the solid electrolytic capacitor chip in the resin package. Accordingly, the solid electrolytic capacitor of the present disclosure has a structure that facilitates reduction of the resin package while increasing the volume of the solid electrolytic capacitor chip, and compatibility of high capacity and compactness.

According to still another aspect of the present disclosure, there is provided a solid electrolytic capacitor including: a porous sintered body made of a valve-acting metal; a dielectric layer which covers at least some of the porous sintered body; a solid electrolytic layer which covers at least some of the dielectric layer; a conductive bonding member which covers at least some of the solid electrolytic layer; and an electrode substrate which is at least partially covered by the conductive bonding member and has a stacked structure made of different kinds of metal materials.

In some embodiments, the porous sintered body, the dielectric layer, the solid electrolytic layer and the conductive bonding member are completely embedded in a resin package and a portion of the electrode substrate is exposed from the resin package.

In some embodiments, the stacked structure of the electrode substrate is formed such that a thermal expansion coefficient of each of the metal materials forming the structure is increased as much as a thermal expansion coefficient of the bottom of the device.

In some embodiments, the stacked structure of the electrode substrate is formed such that a thermal conductivity of each of the metal materials forming the structure is increased as much as a thermal conductivity of the bottom of the device.

In some embodiments, the stacked structure of the electrode substrate is formed with two layers of nickel or nickel alloy, and copper or tin.

In some embodiments, the stacked structure of the electrode substrate is formed with three layers of nickel alloy, nickel and copper or tin.

In some embodiments, one main surface of the electrode substrate which is not covered by the conductive bonding member has a cutout which is at least partially covered by the resin package.

In some embodiments, at least a portion of the electrode substrate which is covered by the conductive bonding member has an unevenness structure. The unevenness structure is formed in at least one metal material layer in the metal material stacked structure.

In some embodiments, the unevenness structure has a roughness which is formed in one metal material layer in the metal material stacked structure.

In an example method for manufacturing the solid electrolytic capacitor, a cutout and a fine structure in the stacked structure of the electrode substrate are formed by half etching or deep etching.

With the above-described configuration, since heat resistance of the solid electrolytic capacitor is improved, it is possible to prevent defects of the solid electrolytic capacitor chip due to heat stress such as an increase in current leakage, mold cracks and so on.

The above and other features and advantages of the present disclosure will be more apparent from the following description in conjunction with the accompanying drawings.

BRIEF DESCRIPTION OF THE DRAWINGS

FIG. 7 is a view showing a step subsequent to that shown in FIG. 6.

DETAILED DESCRIPTION

Figure 1:
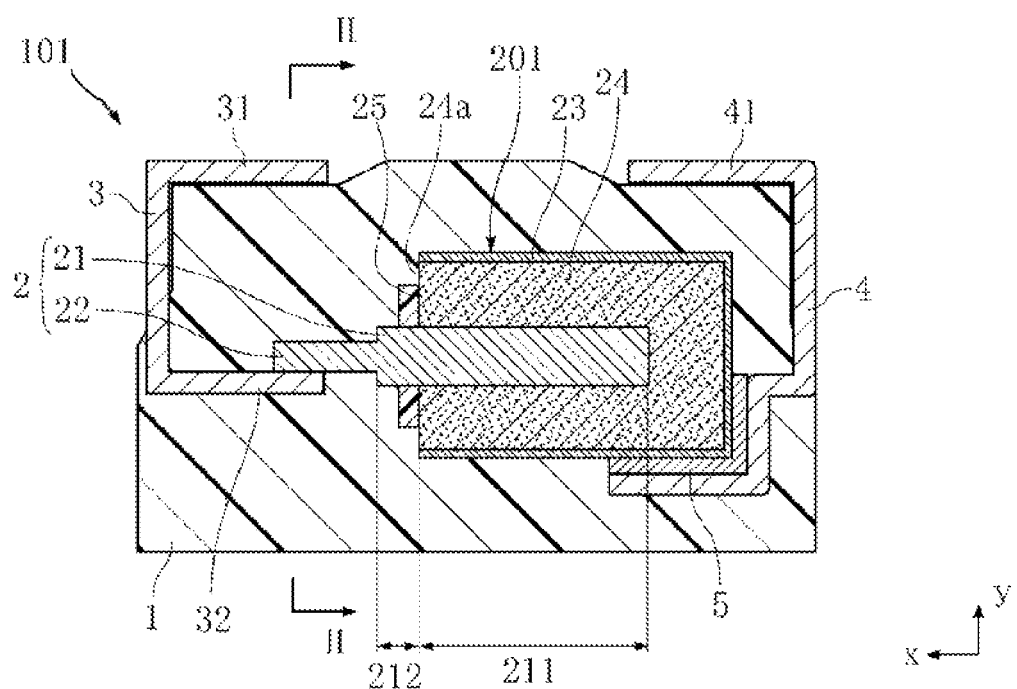
FIG. 1 is a sectional view showing a solid electrolytic capacitor according to a first embodiment of the present disclosure.

Embodiments of the present disclosure will now be described in detail with reference to the drawings. Throughout the drawings, the same or similar elements are denoted by the same reference numerals, and explanations of which will not be repeated.

First, a solid electrolytic capacitor capable of decreasing ESR while suppressing a leakage current and a method for manufacturing the solid electrolytic capacitor will be described with reference to FIGS. 1 to 15.

Figure 2:
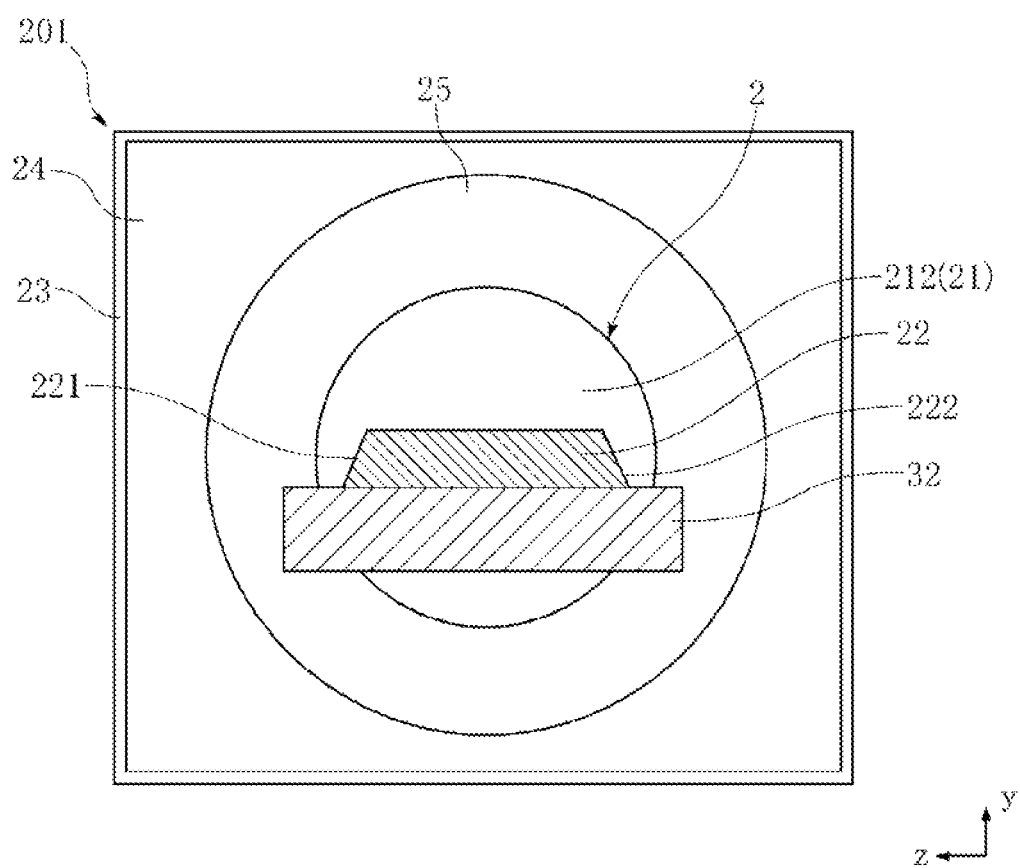
FIG. 2 is a main part sectional view taken along line II-II in FIG. 1.
Figure 3:
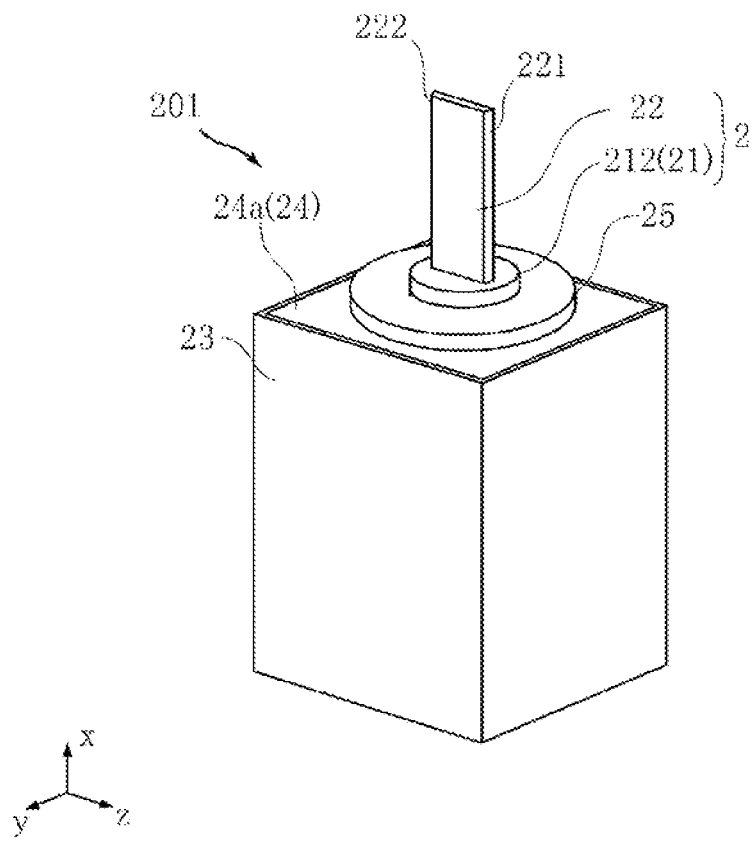
FIG. 3 is a perspective view showing the solid electrolytic capacitor chip shown in FIG. 1.

FIGS. 1 and 2 show one example of a solid electrolytic capacitor according to a first embodiment of the present disclosure. FIGS. 2 and 3 show one example of a solid electrolytic capacitor chip assembled in the solid electrolytic capacitor shown in FIG. 1. A solid electrolytic capacitor 101 includes a resin package 1, a solid electrolytic capacitor chip 201, an anode lead 3, a cathode lead 4 and a bonding member 5. FIG. 2 is a main part section view taken along line II-II in FIG. 1. In FIG. 2, a portion of the resin package 1 and anode lead 3 is omitted. The solid electrolytic capacitor 101 has substantially a cubic shape as a whole. In FIG. 1, the x direction is a longitudinal direction of the solid electrolytic capacitor 101 and corresponds to a first direction in the claims of the present disclosure. The y direction is a direction perpendicular to the x direction and corresponds to a second direction in the claims of the present disclosure. In FIG. 2, the z direction is a direction perpendicular to the x and the y directions and corresponds to a third direction in the claims of the present disclosure.

The resin package 1 is made of a thermosetting resin such as epoxy resin or the like and covers the entire surface of the solid electrolytic capacitor chip 201. The resin package 1 covers the anode lead 3 in a manner that exposes a portion of the anode lead 3. The resin package 1 also covers the cathode lead 4 in a manner that exposes a portion of the cathode lead 4.

The solid electrolytic capacitor chip 201 includes an anode wire 2, a cathode metal film 23, a cubic porous sintered body 24 extending in the x direction, and a hydrophobic member 25, as shown in FIGS. 1 to 3. The solid electrolytic capacitor chip 201 is, for example, a tantalum capacitor chip.

The anode wire 2 is formed by machining a manufacturing wire made of tantalum and is connected to the porous sintered body 24 in such a manner that a left end portion thereof in the x direction in FIG. 1 is exposed to the outside of the porous sintered body 24, as will be described later. The anode wire 2 includes a base 21 and a connector 22 located at a left side of the base 21 in the x direction in FIG. 1. The anode wire 2 is covered by a dielectric film (not shown) such as a tantalum pentoxide film. The base 21 includes an embedded portion 211 embedded in the porous sintered body 24, and an exposed portion 212 exposed from the porous sintered body 24. As shown in FIG. 1, the exposed portion 212 is connected to a left end or the embedded portion 211 in the x direction. The base 21 has a circular section having a diameter of for example, 100 to 400 μm and is formed to extend leftward in the x direction in FIG. 1. The connector 22 extends from the center portion of the exposed portion 212 in the y direction. As shown in FIG. 3, the connector 22 has a thin plate shape having the y direction as a thickness direction. Further, as shown in FIG. 2, the thickness of the connector 22 in the y direction is smaller than the diameter of the base 21 and thus a sectional area of the connector 22 is smaller than that of the base 21.

In addition, the connector 22 has inclined portions 221 and 222 at the left and the right end portion in the z direction in FIG. 2, respectively. The inclined portion 221 has a slope directed downward in the y direction as it goes leftward in the z direction in FIG. 2, so that a thickness of the inclined portion 221 in the y direction decreases as it goes leftward in the z direction in FIG. 2. The inclined portion 222 has a slope directed downward in the y direction as it goes rightward in the z direction in FIG. 2, so that a thickness of the inclined portion 222 in the y direction decreases as it goes rightward in the z direction in FIG. 2.

The cathode metal film 23 is made of, for example, silver and covers the porous sintered body 24 in a manner to expose a left end surface 24a of the porous sintered body 24 in the x direction in FIG. 1.

The porous sintered body 24 is prepared by sintering tantalum powder pressed into a cubic shape. A dielectric film (not shown) is formed to cover the sintered tantalum powder and gaps between the tantalum powders are filled with semiconductors. A graphite layer (not shown) is formed to cover the sintered tantalum powder filled with the semiconductors.

The hydrophobic member 25 is made of, for example, hydrophobic fluorine resin and is formed to have an annular shape when viewed in the x direction. As shown in FIG. 1, the hydrophobic member 25 is brought into contact with the exposed portion 212 of the anode wire 2 and the end surface 24a of the porous sintered body 24. The function of the hydrophobic member 25 will be shown for the manufacture of the solid electrolytic capacitor chip 201, as will be described later.

The anode lead 3 includes a terminal 31 exposed from the resin package 1 and a lead side connector 32 connected to the terminal 31 and the solid electrolytic capacitor chip 201. The cathode lead 4 includes a terminal 41 exposed from the resin package 1 and is connected to the solid electrolytic capacitor chip 201 via the bonding member 5. The bonding member 5 is made, for example, by firing silver paste.

As shown in FIGS. 1 and 2, the lead side connector 32 has a plate shape having the y direction as its thickness direction. The lead side connector 32 is disposed below the connector 22 in the y direction in FIG. 1. As shown in FIG. 2, the bottom surface of the connector 22 is brought into contact with the top surface of the lead side connector 32 in the y direction. In addition, a left and a right edge of the connector 22 in the z direction in FIG. 2 are welded to the lead side connector 32 by a manufacturing method which will be described later. More specifically, a left and a right end edge of the inclined portion 221 in FIG. 2 are welded to the lead side connector 32.

Next, a method for manufacturing the solid electrolytic capacitor 101 will be described with reference to FIGS. 4 to 7.

First, the solid electrolytic capacitor chip 201 is manufactured.

For the manufacture of the solid electrolytic capacitor chip 201, a manufacturing wire 20 made of tantalum and having a diameter of 100 to 400 μm is first prepared and the porous sintered body 24 is formed under a state where a proximal end 20a of the wire 20 is embedded in tantalum powder. The porous sintered body 24 is formed according to the following steps, for example.

First, the tantalum powder is pressed into a cubic shape extending in the x direction and the cubic-shaped tantalum powder is sintered under a high vacuum atmosphere, thereby forming a base of the porous sintered body 24. Next, the base is immersed in a strong acid solution under the application of a voltage. This step results in a tantalum pentoxide film formed on surfaces of tantalum powder particles in the base. The tantalum pentoxide film acts as the above-described not-shown dielectric film and the surface area of the dielectric film defines a capacitance of the solid electrolytic capacitor 101. At this time, a dielectric film made of tantalum pentoxide is also formed on an immersed portion of the manufacturing wire 20 made of tantalum.

Next, the hydrophobic member 25 is provided. In this step, for example, the annular hydrophobic member 25 passes over the manufacturing wire 20 from an end opposite to the proximal end 20a and is moved until it is brought into contact with the base of the porous sintered body 24. Then, the hydrophobic member 25 is fixed to the base of the porous sintered body 24. Alternatively, the hydrophobic member 25 may be attached to the manufacturing wire 20 at the time when the wire 20 is embedded in the tantalum powder.

Next, porous cavities formed in the base of the porous sintered body 24 are filled with semiconductors. The semiconductors are formed by, for example, immersing the base in a manganese acetate solution and pyrolyzing the manganese acetate solution. In this step, the hydrophobic member 25 provided in the previous step prevents the manganese acetate solution from permeating into the manufacturing wire 20. The pyrolysis of the manganese acetate solution allows manganese dioxide, which is a semiconductor oxide, to be formed to cover the tantalum pentoxide film. Thereafter, the base filled with the semiconductors is filled with a graphite layer, thereby forming the porous sintered body 24.

Figure 4:
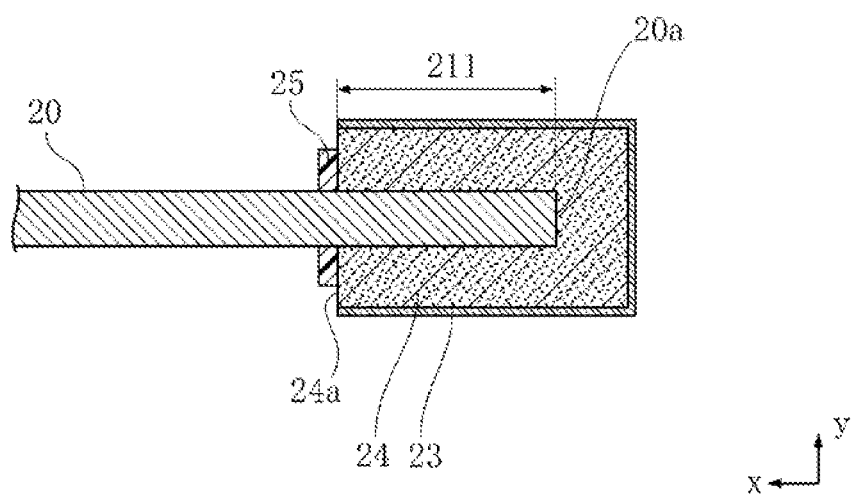
FIG. 4 is a view showing a step of a method for manufacturing the solid electrolytic capacitor chip shown in FIG. 1.

Next, the porous sintered body 24 is covered with, for example, a silver film in a manner to expose the end surface 24a of the porous sintered body 24 from which the manufacturing wire 20 protrudes. Here, the silver film corresponds to the cathode metal film 23. FIG. 4 shows an intermediate product formed by the above-described steps. In the intermediate product shown in FIG. 4, the manufacturing wire 20 extends in the x direction and is connected to the porous sintered body 24 in a manner to expose the left end portion in the x direction. The right end portion of the manufacturing wire 20 in FIG. 4, which includes the proximal end 20a, is embedded in the porous sintered body 24 and corresponds to the embedded portion 211 in the finished product.

Figure 5:
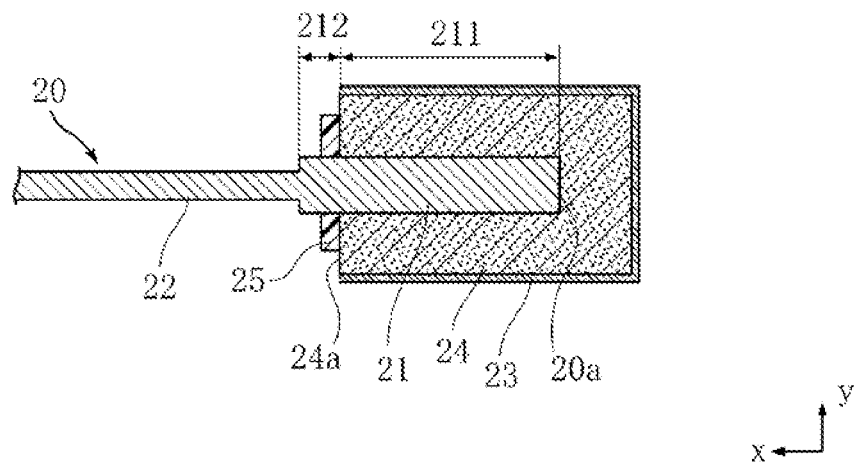
FIG. 5 is a view showing a step subsequent to that shown in FIG. 4.

Next, a wire machining step is performed in which the manufacturing wire 20 is machined. In this step, a sectional area of a portion of the manufacturing wire 20 protruding outward from the porous sintered body 24 is machined to be decreased. For example, a portion of the manufacturing wire 20 is pressed into a thin plate shape by means of a press, thereby obtaining a section as shown in FIG. 5. The portion of the manufacturing wire 20 exposed from the porous sintered body 24 but not being machined in this step corresponds to the exposed portion 212. The combination of the exposed portion 212 and the embedded portion 211 formed in the previous step corresponds to the base 21. Thereafter, the connector 22 is formed, for example, by removing an unnecessary portion, thereby obtaining the solid electrolytic capacitor chip 201 having the connector 22 as shown in FIG. 3. The inclined portions 221 and 222 of the connector 22 may be also formed in the step of removing the unnecessary portion of the manufacturing wire 20. In addition, without completely cutting out the manufacturing wire 20, a welding step to be described later may be carried out, for example, under a state where the connector 22 extends in the x direction to be longer than that shown in FIG. 3. It is preferable that the unnecessary portion be cut out before the resin package 1 is formed.

Figure 6:
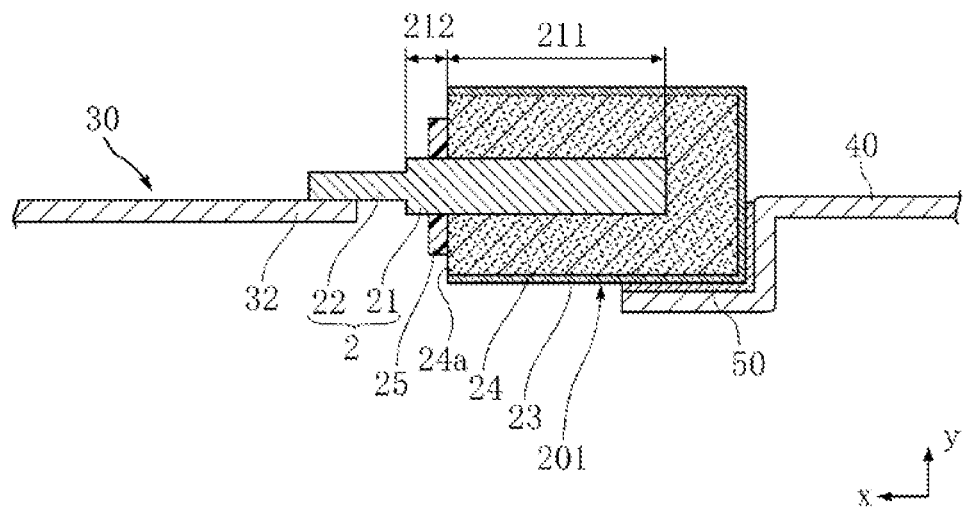
FIG. 6 is a view showing a step subsequent to that shown in FIG. 5.

Next, manufacturing lead frames are subjected to a punching or a bending process, and thus, manufacturing leads 30 and 40 are formed to be separated from each other. Thereafter, as shown in FIG. 6, the solid electrolytic capacitor chip 201 manufactured in the previous step is placed on the manufacturing leads 30 and 40. In this step, the connector 22 of the solid electrolytic capacitor chip 201 is brought into contact with the lead side connector 32 of the manufacturing lead 30. In addition, in this step, a silver paste 50 is coated on the manufacturing lead 40 before placing the solid electrolytic capacitor chip 201 on the manufacturing lead 40. The cathode metal film 23 of the solid electrolytic capacitor chip 201 becomes conductive with and is fixed to the manufacturing lead 40 via the silver paste 50. The bonding member 5 is achieved by curing the silver paste 50.

Next, a welding step for welding together the lead side connector 32 of the manufacturing lead 30 and the connector 22 of the solid electrolytic capacitor chip 201 is carried out. This step is carried out by using a laser irradiation apparatus. FIG. 7 shows irradiation of welding laser lights La and Lb under a state where the connector 22 and the lead side connector 32 are brought into contact with each other. As shown in FIG. 7, the welding laser light La is irradiated on a contact portion between the inclined portion 221 and the lead side connector 32. More specifically, the welding laser light La is irradiated on a left end edge of the inclined portion 221 in the z direction in FIG. 7. This allows the left end edge of the inclined portion 221 in FIG. 7 to be welded to the lead side connector 32. In addition, the welding laser light Lb is irradiated on a contact portion between the inclined portion 222 and the lead side connector 32. More specifically, the welding laser light Lb is irradiated on a right end edge of the inclined portion 222 in the z direction in FIG. 7. This allows the right end edge of the inclined portion 222 in FIG. 7 to be welded to the lead side connector 32. The irradiation of the welding lasers light La and Lb is performed for the entire length in the x direction of the region where the lead side connector 32 overlaps with the connector 22 when viewed in the y direction. This welding may be performed by sequentially shifting irradiation positions of the welding laser lights La and Lb in the x direction.

After completing the welding, a step of forming the resin package 1 is performed. This step is achieved by performing a molding to enclose the solid electrolytic capacitor chip 201 with epoxy resin. The epoxy resin enclosing the solid electrolytic capacitor chip 201 is cured to be the resin package 1. Thereafter, the anode lead 3 is formed by bending the manufacturing lead 30 and the cathode lead 4 is formed by bending the manufacturing lead 40.

Through the above-described steps, the solid electrolytic capacitor 101 is completed.

Next, operation of the solid electrolytic capacitor 101 and a method for manufacturing the same will be described.

The connector 22 of the solid electrolytic capacitor chip 201 is formed into a relatively thin plate shape whose thickness in the y direction is smaller than the diameter of the base 21. According to the above-described manufacturing method, the relatively thin connector 22 and the lead side connector 32 are welded together by means of the welding laser lights La and Lb. In this welding step, since the connector 22 is formed to be relatively thin, the amount of heat required for the welding may be less than that required for welding of the base 21 and the lead side connector 32 without providing the connector 22. That is, even if the base 21 is formed to be thick, it is possible to prevent an increase in the amount of heat required for the welding by forming the connector 22 into the above-mentioned thin plate shape. Since the amount of heat applied to the connector 22 for the welding is restricted, the amount of heat applied to the porous sintered body 24 is also restricted, which makes it easier to prevent the tantalum pentoxide film formed on the porous sintered body 24 from being damaged. This allows the solid electrolytic capacitor 101 to advantageously prevent the generation of a leakage current. Accordingly, in the solid electrolytic capacitor 101, the anode wire 2 can be formed by using the manufacturing wire 20 which is thicker than, for example, the anode wire 921 used for the conventional solid electrolytic capacitor 90. In case of using the manufacturing wire 20 having a large diameter, the diameter of the base 21, which is a non-machined portion, becomes thick and thus the contact area between the base 21 and the porous sintered body 24 is increased. The solid electrolytic capacitor 101 provided with such a solid electrolytic capacitor chip 201 is suitable for decreasing ESR.

In this embodiment, the welding laser lights La and Lb are irradiated on the inclined portions 221 and 222 formed in the connector 22. In the connector 22, the inclined portions 221 and 222 are portions whose thicknesses in the y direction are decreasing. Thus, the amount of heat required for the welding of the connector 22 and the lead side connector 32 can be further restricted. With this configuration, operation of the above-described solid electrolytic capacitor chip 201 and solid electrolytic capacitor 101 becomes more remarkable. In addition, by restricting the amount of heat required for the welding, the welding step can be performed, for example, with restricted power for the welding laser lights La and Lb. This can result in low power consumption required for the welding step and hence reduction of manufacturing costs of the solid electrolytic capacitor 101.

FIGS. 8A to 15 show different embodiments of the present disclosure. Throughout these figures, the same or similar elements as the above-described embodiment are denoted by the same reference numerals as the above-described embodiment. Explanation of some of the same or similar elements as the above-described embodiment will not be repeated.

Figure 8A:
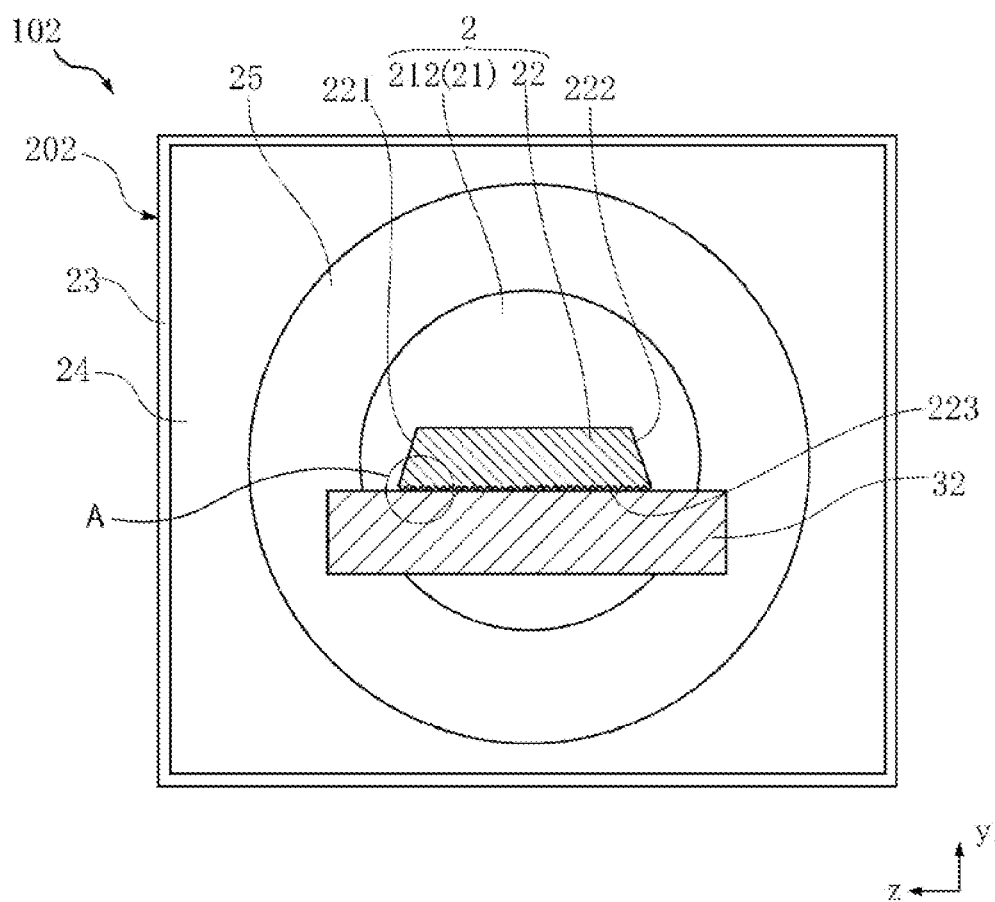
FIG. 8A is a main part sectional view showing a solid electrolytic capacitor according to a second embodiment of the present disclosure.
Figure 8B:
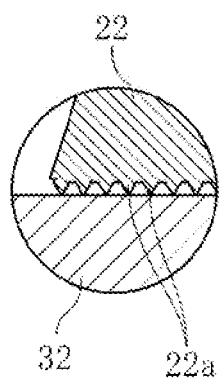
FIG. 8B is an enlarged view of region A in FIG. 8A.
Figure 9:
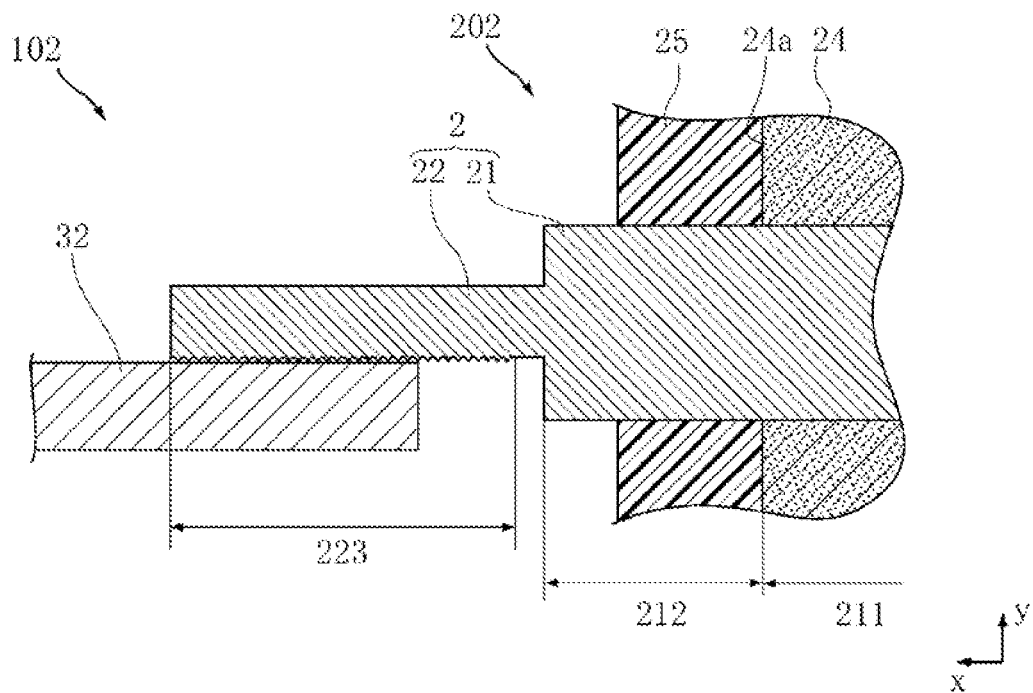
FIG. 9 is a main part sectional view showing the solid electrolytic capacitor shown in FIGS. 8A and 8B.

FIGS. 8A, 8B and 9 are views for explaining a solid electrolytic capacitor according to a second embodiment of the present disclosure. In this embodiment, a solid electrolytic capacitor 102 includes a solid electrolytic capacitor chip 202 having a connector 22 of a structure different from that of the solid electrolytic capacitor chip 201. Other configurations are the same as those in the solid electrolytic capacitor 101. The resin package 1 is not shown in FIGS. 8A, 8B and 9.

As shown in FIGS. 8A and 8B, the connector 22 of the solid electrolytic capacitor chip 202 is formed with a rough surface 223 having a plurality of protrusions 22a thereon. The rough surface 223 is formed on the bottom surface of the connector 22 in the y direction and brought into contact with the lead side connector 32. As shown in FIGS. 8A and 8B, the rough surface 223 is formed substantially over the entire width of the connector 22 in the z direction. As shown in FIG. 9, the rough surface 223 is formed over most of the bottom surface of the connector 22 in the x direction. The length of the rough surface 223 in the x direction is larger than the length in the x direction of the region where the lead side connector 32 overlaps with the connector 22 when viewed in the y direction. This rough surface 223 can be formed, for example, by pressing a portion of the manufacturing wire 20 into a thin plate shape and subjecting the plate-shaped portion to a roughening process at an appropriate point in the wire machining step.

In this embodiment, the rough surface 223 of the connector 22 is brought into contact with the lead side connector 32. More specifically, as shown in FIGS. 8A and 8B, leading ends of the protrusions 22a are brought into contact with the lead side connector 32. Accordingly, the contact area between the roughened connector 22 and the lead side connector 32 becomes smaller as compared to the case where the connector 22 is flat. It may be considered that the amount of heat required for welding the roughened connector 22 and the lead side connector 32 becomes smaller than that required for welding the flat connector 22 and the lead side connector 32. Accordingly, the intensity of the welding laser lights La and Lb used to manufacture the solid electrolytic capacitor 102 in this embodiment may be lower than that used to manufacture the solid electrolytic capacitor 101. This restricts the amount of heat transferred to the porous sintered body 24 during welding, thereby making it easier to prevent the tantalum pentoxide film formed on the porous sintered body 24 from being damaged. In addition, this provides an advantage of reducing power consumption required for the welding step.

Figure 10:
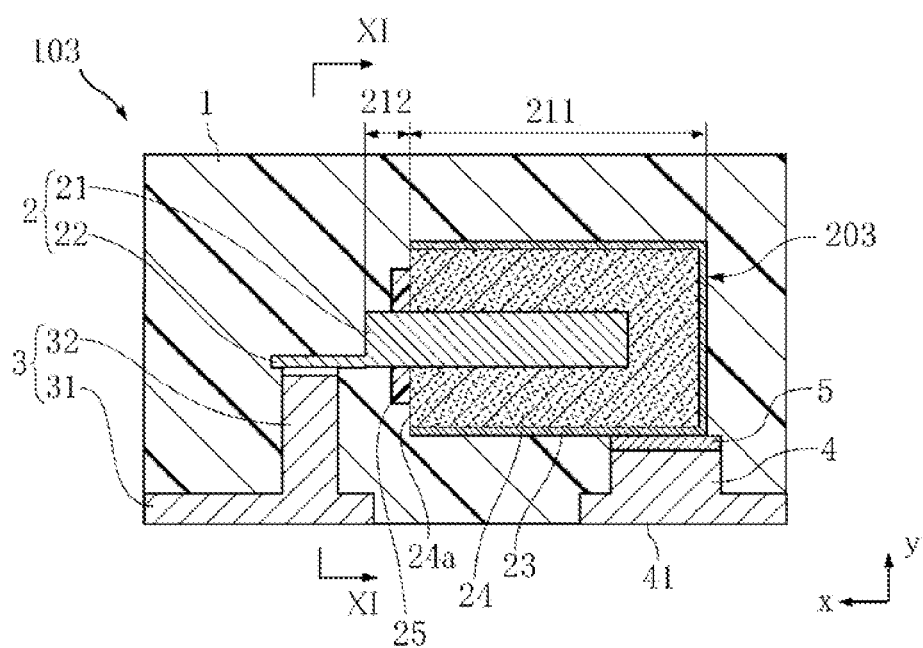
FIG. 10 is a sectional view showing a solid electrolytic capacitor according to a third embodiment of the present disclosure.
Figure 11:
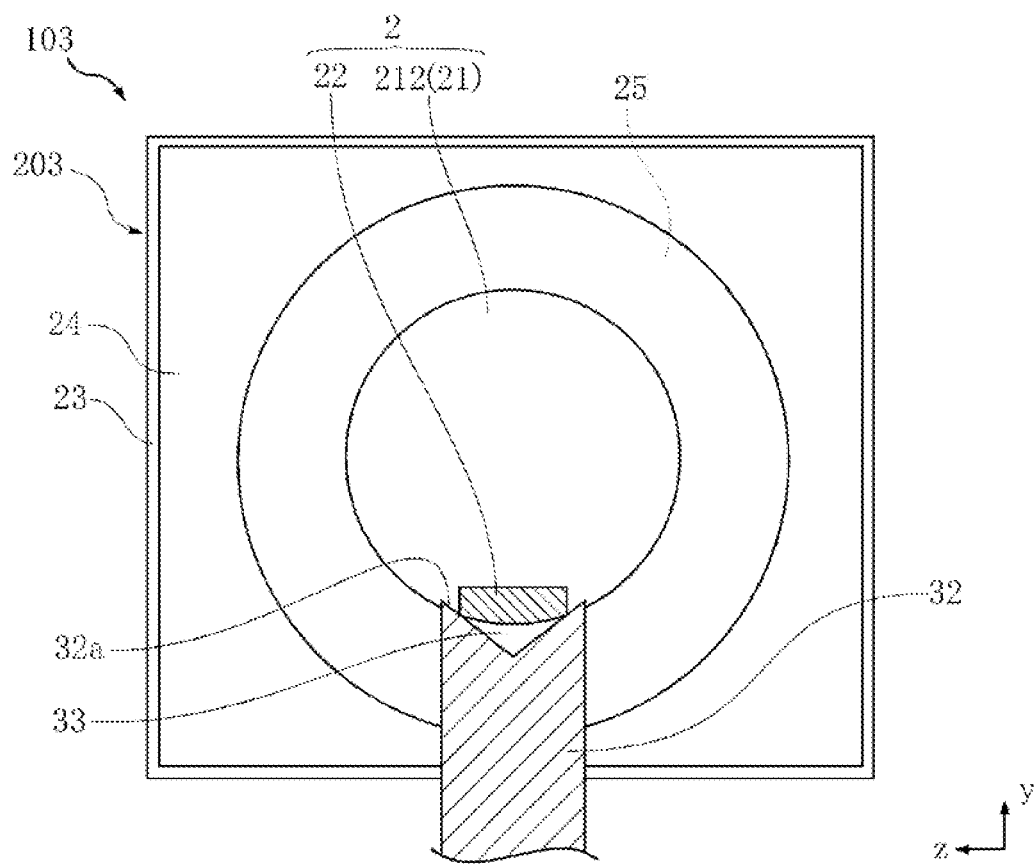
FIG. 11 is a main part sectional view taken along line XI-XI in FIG. 10.

FIGS. 10 and 11 show a solid electrolytic capacitor according to a third embodiment of the present disclosure. A solid electrolytic capacitor 103 shown in FIGS. 10 and 11 includes the resin package 1, a solid electrolytic capacitor chip 203, the anode lead 3, the cathode lead 4 and the bonding member 5. The resin package 1 is not shown in FIG. 11.

The solid electrolytic capacitor 203 is different in the shape of the connector 22 from the solid electrolytic capacitor 201. Other configurations are the same as those in the solid electrolytic capacitor 201. As shown in FIG. 10, the connector 22 of the solid electrolytic capacitor 203 extends to project from the bottom portion of the base 21 in the y direction. The connector 22 is formed to overlap with the bottom portion of the base 21 when viewed in the x direction, and has a sectional area which is greatly smaller than that of the base 21.

The anode lead 3 includes the terminal 31 and the lead side connector 32 connected to the terminal 31. As shown in FIG. 10, the lead side connector 32 is placed to support the bottom surface of the connector 22 in the y direction. As shown in FIG. 11, the lead side connector 32 has a groove 32a indented in the y direction. The groove 32a extends in the x direction and has a V shape when viewed in the x direction. A pair of slopes forming the V shape of the groove 32a supports both end edges in the z direction of the bottom surface of the connector 22 in the y direction in FIG. 11. A cavity 33 is formed between the bottom portion of the groove 32a in the y direction in FIG. 11 and the connector 22. Contact between the groove 32a and the connector 22 forms substantially a linear region extending in the x direction and the contact area therebetween is relatively small. The connector 22 of the solid electrolytic capacitor chip 203 in this embodiment is also welded to the lead side connector 32 by using laser lights. Since the contact area between the connector 22 and the lead side connector 32 is small, the amount of heat required for welding is reduced.

The groove 32a is formed by, for example an excavating process in the step of manufacturing the manufacturing lead 30.

As described above, when the solid electrolytic capacitor 103 is manufactured, the connector 22 and the lead side connector 32 can be welded together with a relatively small amount of heat. Accordingly, the solid electrolytic capacitor 103 is suitable for decreasing ESR, like the solid electrolytic capacitor 101.

In addition, by providing the connector 22 with the same rough surface as the rough surface 223 formed on the connector 22 of the solid electrolytic capacitor chip 202, it is possible to further reduce the amount of heat required for welding.

Figure 12:
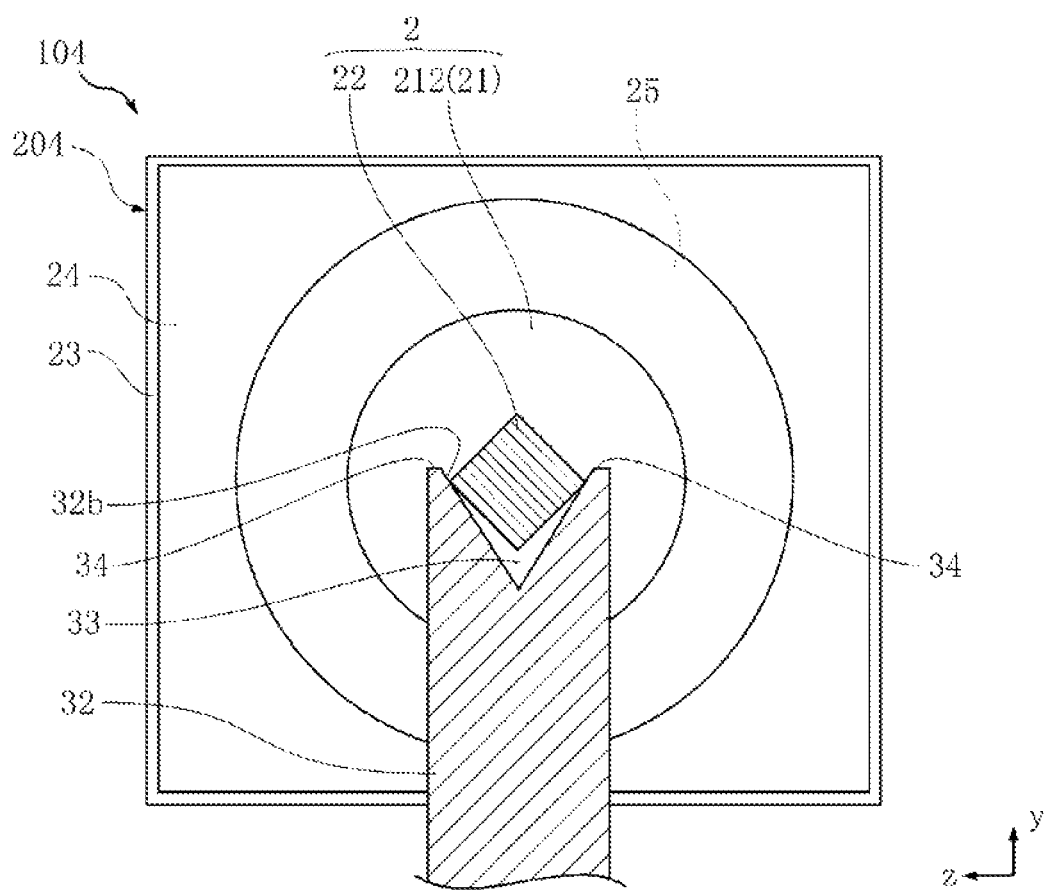
FIG. 12 is a main part sectional view showing a solid electrolytic capacitor according to a fourth embodiment of the present disclosure.

FIG. 12 shows a solid electrolytic capacitor according to a fourth embodiment of the present disclosure. A solid electrolytic capacitor 104 shown in FIG. 12 includes a solid electrolytic capacitor chip 204 and the lead side connector 32 formed with a groove 32b. Other configurations are the same as those in the solid electrolytic capacitor 103. The resin package 1 is not shown in FIG. 12.

As shown in FIG. 12, the solid electrolytic capacitor 204 includes the connector 22 having a diamond-shaped section. Other configurations are the same as those in the solid electrolytic capacitor chip 201. The connector 22 is placed such that one of the diagonals of the diamond-shaped section extends in the z direction, and thus is brought into contact with the groove 32b at apexes of both ends in the z direction. Both widths of the diagonals extending in the y and the z direction of the diamond-shaped section of the connector 22 are smaller than the diameter of the base 21.

The groove 32b formed in the lead side connector 32 has the same V-like section as the groove 32a. As shown in FIG. 12, the groove 32b is formed to be deeper than the groove 32a, and accordingly, it becomes more likely that the top portion of the lead side connector 32 in the y direction is structurally weak. To overcome this problem, in this embodiment, the lead side connector 32 is provided with flat portions 34 to reinforce both sides of the groove 32b. In addition, as shown in FIG. 12, a cavity 33 is formed between the bottom portion of the groove 32b in the y direction and the connector 22. With this configuration, the contact area between the connector 22 and the lead side connector 32 can become smaller. Accordingly, like the solid electrolytic capacitor 103, the solid electrolytic capacitor 104 has a structure that allows a reduction of the amount of heat required for the welding step in manufacturing the capacitor 103.

In addition, by providing the connector 22 with the same rough surface as the rough surface 223 formed on the connector 22 of the solid electrolytic capacitor chip 202, it is possible to further reduce the amount of heat required for welding.

In addition, although it is shown in FIG. 12 that the connector 22 is placed at a position overlapping with the center portion of a circular section of the base 21 when viewed in the x direction, the connector 22 may be formed to project from the bottom portion of the base 21 in the y direction, like the connector 22 of the solid electrolytic capacitor chip 203.

Figure 13:
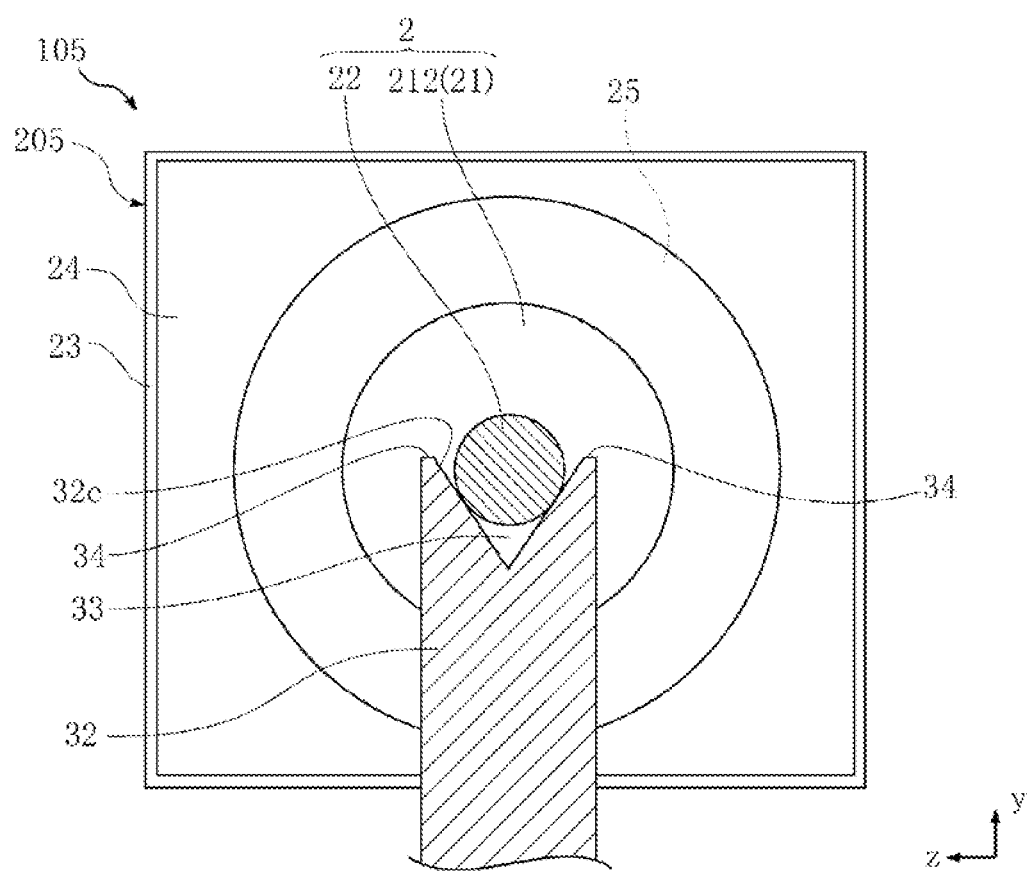
FIG. 13 is a main part sectional view showing a solid electrolytic capacitor according to a fifth embodiment of the present disclosure.

FIG. 13 shows a solid electrolytic capacitor according to a fifth embodiment of the present disclosure. A solid electrolytic capacitor 105 shown in FIG. 13 includes a solid electrolytic capacitor chip 205 and the lead side connector 32 formed with a groove 32c. Other configurations are the same as those in the solid electrolytic capacitor 104. The resin package is not shown in FIG. 13.

As shown in FIG. 13, the solid electrolytic capacitor 205 includes the connector 22 having a circular section. Other configurations are the same as those in the solid electrolytic capacitor chip 201. The diameter of the connector 22 is smaller than that of the base 21. Specifically, the diameter of the connector 22 may be about 200 µm.

The groove 32c formed in the lead side connector 32 has the same V-like section as the groove 32b. As shown in FIG. 13, the cavity 33 is formed between the bottom portion of the groove 32c in the y direction and the connector 22. With this configuration, the contact area between the connector 22 and the lead side connector 32 can become smaller. Accordingly, like the solid electrolytic capacitors 103 and 104, the solid electrolytic capacitor 105 has a structure that allows a reduction of the amount of heat required for the welding step in manufacturing the capacitor 103.

In addition, by providing the connector 22 with the same rough surface as the rough surface 223 formed on the connector 22 of the solid electrolytic capacitor chip 202, it is possible to further reduce the amount of heat required for welding.

In addition, although it is shown in FIG. 13 that the connector 22 is placed at a position overlapping with the center portion of the circular section of the base 21 when viewed in the x direction, the connector 22 may be formed to project from the bottom portion of the base 21 in the y direction, like the connector 22 of the solid electrolytic capacitor chip 203.

Figure 14:
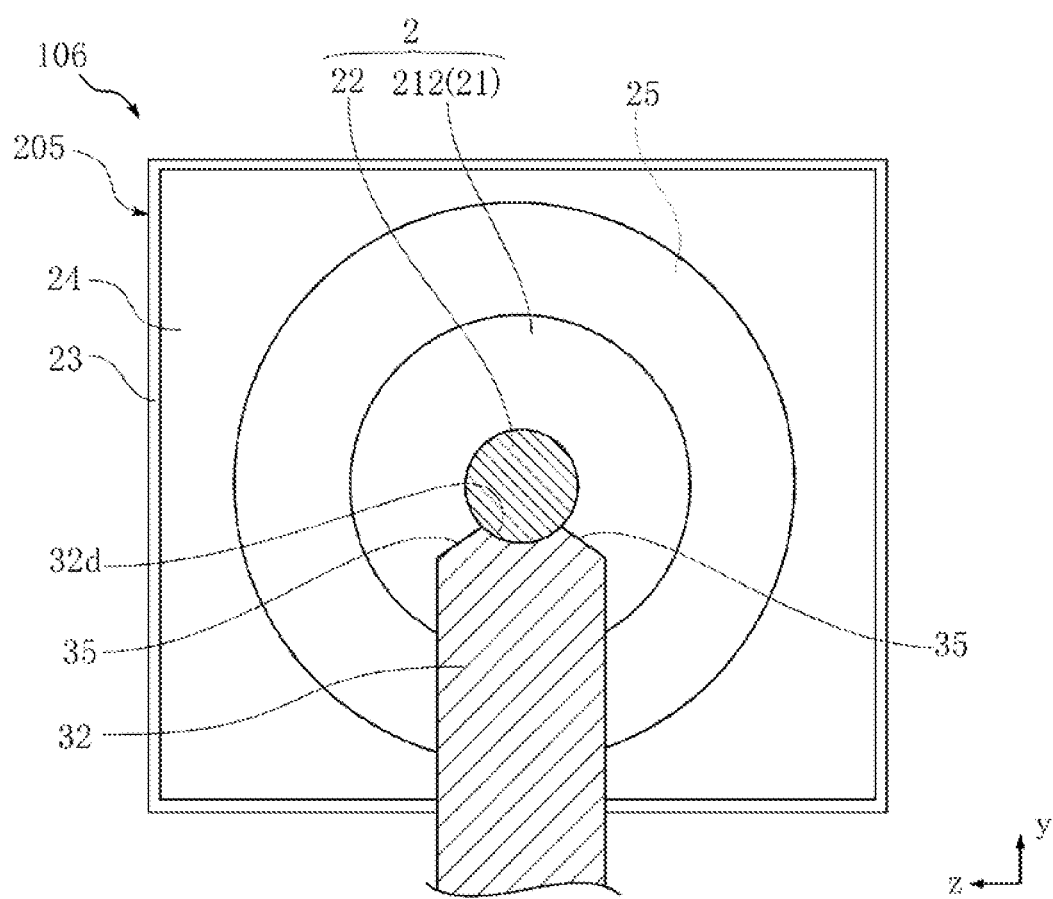
FIG. 14 is a main part sectional view showing a solid electrolytic capacitor according to a sixth embodiment of the present disclosure.

FIG. 14 shows a solid electrolytic capacitor according to a sixth embodiment of the present disclosure. A solid electrolytic capacitor 106 shown in FIG. 14 includes the lead side connector 32 having a shape different from that of the solid electrolytic capacitor 105. Other configurations are the same as those in the solid electrolytic capacitor 105. The resin package 1 is not shown in FIG. 14.

In this embodiment, at the top portion of the lead side connector 32 in the y direction in FIG. 14, a pair of slopes 35 is formed to approach each other in the z direction as they go upward in the y direction. Accordingly, the width in the z direction of the top portion of the lead side connector 32 in the y direction is smaller than the width in the z direction of the lower portion of the lead side connector 32 in the y direction. At the top portion of the lead side connector 32 is formed a groove 32d fitted to the circular section of the connector 22. The connector 22 is brought into contact with the groove 32d as shown in FIG. 14. In this embodiment, during manufacturing of the solid electrolytic capacitor 106, for example, welding laser lights propagating in the z direction are irradiated on a contact portion between the connector 22 and the groove 32d from the left and the right side in FIG. 14. At this time, both end portions in the z direction of the contact portion between the connector 22 and the groove 32d are welded. Accordingly, it may be considered that the amount of heat required for the welding step when the solid electrolytic capacitor 106 is manufactured has no significant difference from that required for the welding step when the solid electrolytic capacitor 105 is manufactured. Accordingly, like the solid electrolytic capacitor 105, the solid electrolytic capacitor 106 in this embodiment has a structure that allows a reduction of the amount of heat required for the welding step.

In addition, by providing the connector 22 with the same rough surface as the rough surface 223 formed on the connector 22 of the solid electrolytic capacitor chip 202, it is possible to further reduce the amount of heat required for welding.

In addition, although it is shown in FIG. 14 that the connector 22 is placed at a position overlapping with the center portion of the circular section of the base 21 when viewed in the x direction, the connector 22 may be formed to project from the bottom portion of the base 21 in the y direction, like the connector 22 of the solid electrolytic capacitor chip 203.

Figure 15:
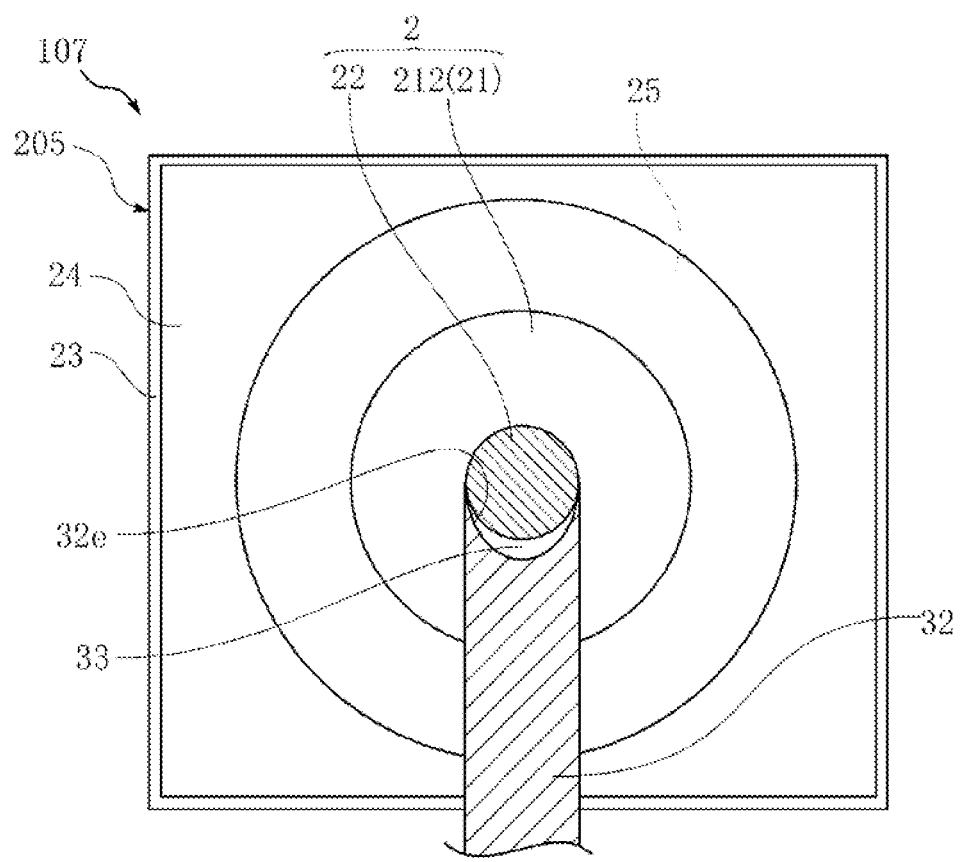
FIG. 15 is a main part sectional view showing a solid electrolytic capacitor according to a seventh embodiment of the present disclosure.

FIG. 15 shows a solid electrolytic capacitor according to a seventh embodiment of the present disclosure. A solid electrolytic capacitor 107 shown in FIG. 15 includes the lead side connector 32 having a shape different from that of the solid electrolytic capacitor 105. Other configurations are the same as those in the solid electrolytic capacitor 105. The resin package 1 is not shown in FIG. 15.

As shown in FIG. 15, in this embodiment, the width of the lead side connector 32 in the z direction is substantially the same to that of the connector 22. At the top of the lead side connector 32 is formed a groove 32e having a long semi-elliptical section in the y direction. The cavity 33 is formed between the bottom portion of the groove 32e in the y direction in FIG. 15 and the connector 22.

Also, in this embodiment, the contact area between the connector 22 and the groove 32e is made small like the solid electrolytic capacitor 105. The solid electrolytic capacitor 107 in this embodiment can also reduce the amount of heat required for the welding step.

The above-described embodiments are not intended to limit the scope of the present disclosure. Detailed configuration of various parts of the solid electrolytic capacitors of the present disclosure and the methods for manufacturing the same may be modified in design in different ways.

For example, although the groove 32a formed in the lead side connector 32 in the solid electrolytic capacitor 103 is configured to reduce the contact area with the connector 22, this configuration may be employed for the solid electrolytic capacitor 101 and/or the solid electrolytic capacitor 102.

In addition, although, in the above-described manufacturing method, manganese dioxide is used as semiconductors for filling the gaps between the tantalum powder of the porous sintered body 24, the gaps may be filled with, for example, polymeric organic electrolytes. In addition, in order to prevent the polymeric organic electrolytes from permeating into the manufacturing wire, silicone resin may be applied on a portion corresponding to the exposed portion 212 of the manufacturing wire 20 in a finished product. In addition, although, in the above-described embodiments, an annular solidified material is used as the hydrophobic member 25, this may be replaced with an application of fluorine resin on the end surface 24a of the porous sintered body 24.

In addition, although, in the above-described manufacturing method, it is illustrated that the manufacturing wire 20 is embedded in the tantalum powder and then the tantalum powder is pressurized to form the porous sintered body 24, the manufacturing wire may be connected to the porous sintered body after forming the porous sintered body. In this case, it is appropriate to interconnect the porous sintered body and the manufacturing wire by means of welding. At this time, a wiring machining step of forming a connector and a base by machining the manufacturing wire may be performed before or after the manufacturing wire is welded to the porous sintered body.

Hereinafter, a solid electrolytic capacitor having a configuration capable of simultaneously achieving high capacity and compactness and a method of manufacturing the same will be described in detail with reference to FIGS. 16 to 35.

Figure 16:
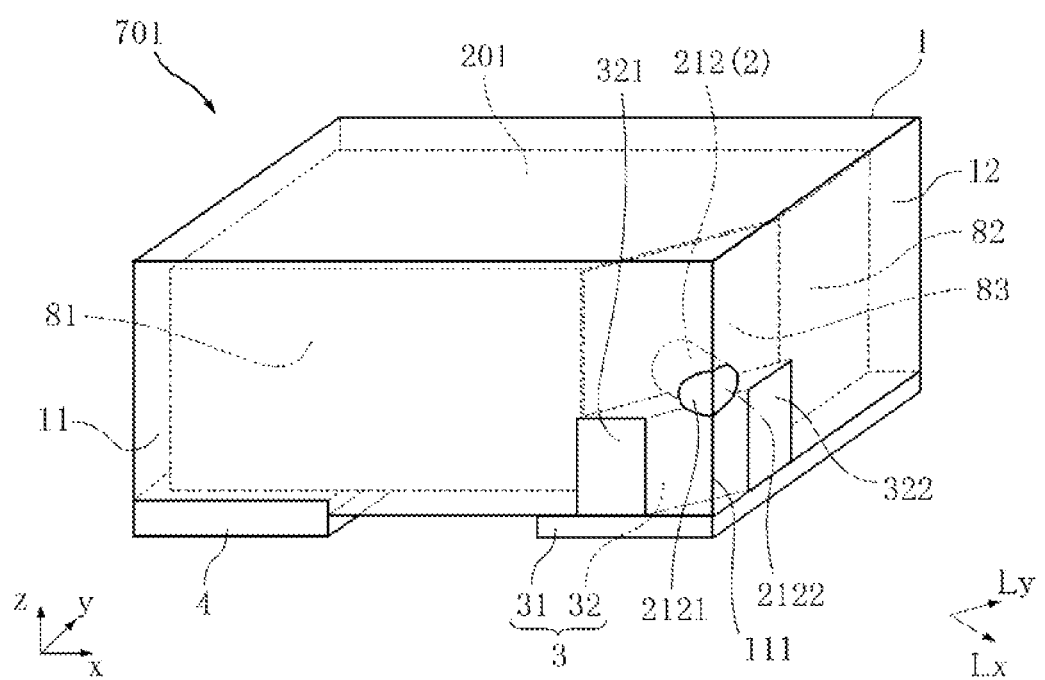
FIG. 16 is a perspective view showing a solid electrolytic capacitor according to an eighth embodiment of the present disclosure.
Figure 17:
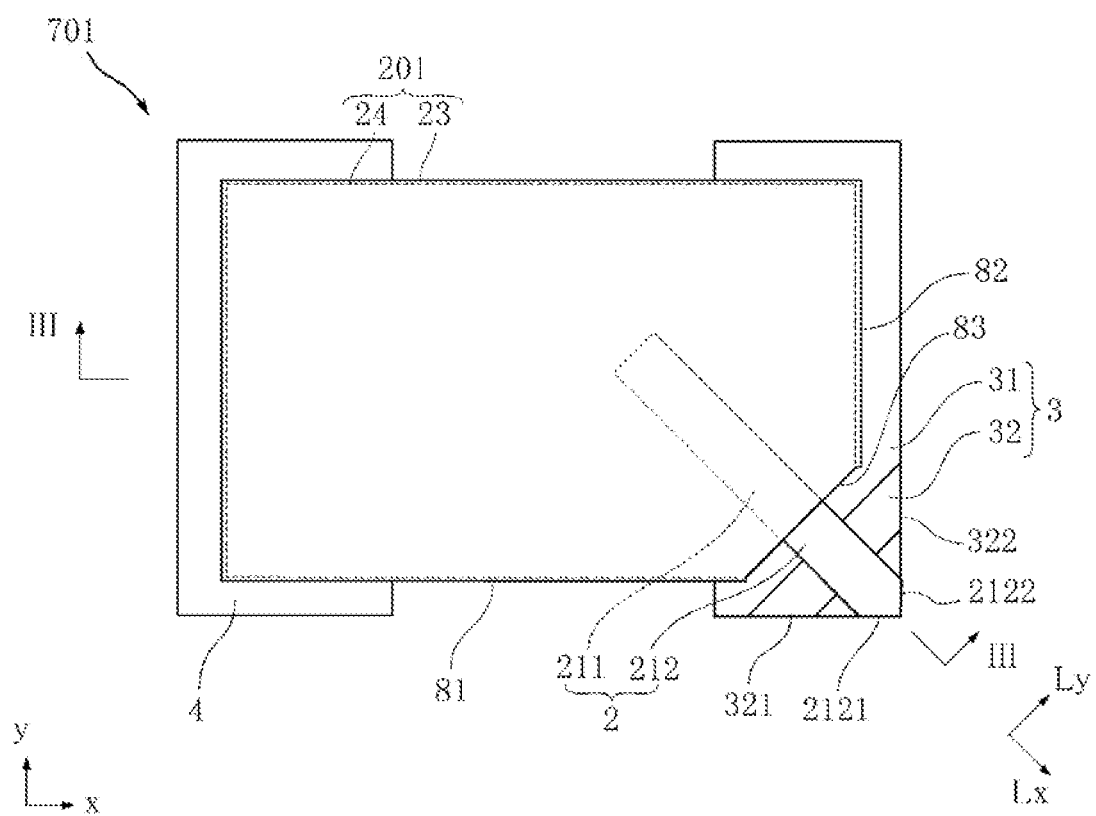
FIG. 17 is a main part plan view showing the solid electrolytic capacitor shown in FIG. 16.
Figure 18:
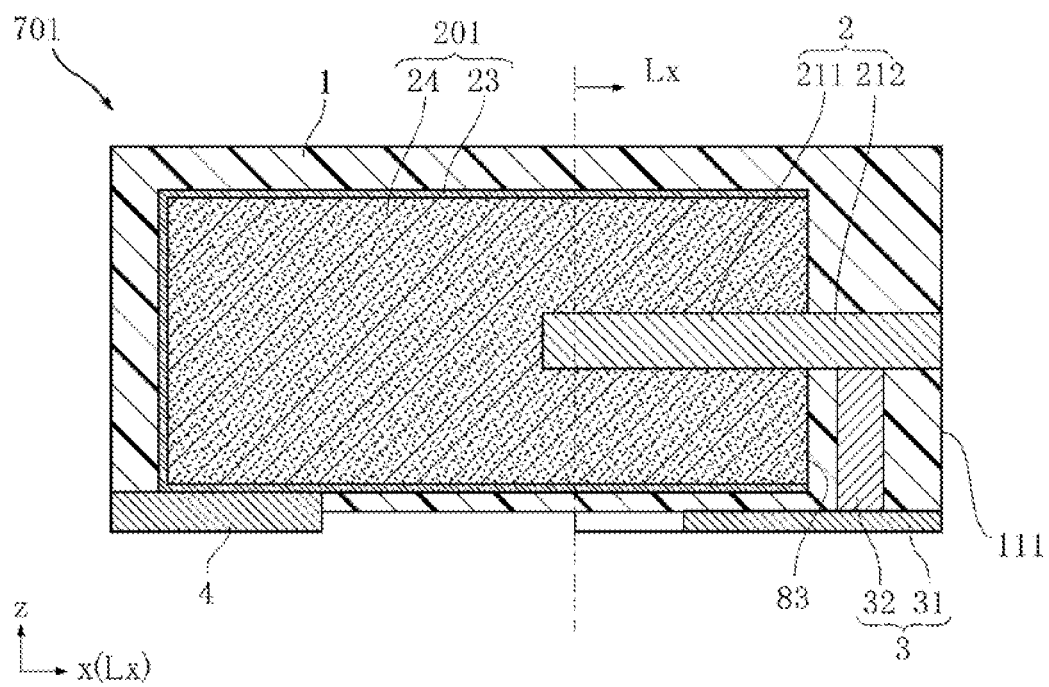
FIG. 18 is a sectional view taken along line in FIG. 17.

FIGS. 16 to 18 show one example of a solid electrolytic capacitor according to an eighth embodiment of the present disclosure. A solid electrolytic capacitor 701 shown in FIGS. 16 to 18 includes the resin package 1, the solid electrolytic capacitor chip 201, the anode wire 2, the anode lead 3 and the cathode lead 4. The resin package 1 is not shown in FIG. 17. FIG. 18 is a sectional view taken along line III-III in FIG. 17.

The resin package 1 is made of a thermosetting resin such as epoxy resin or the like and covers the entire surface of the solid electrolytic capacitor chip 201. In addition, the resin package 1 covers the anode wire 2 in a manner to expose a portion of the anode wire 2. The resin package 1 also covers the anode lead 3 in a manner to expose a portion of the anode lead 3 and the cathode lead 4 in a manner to expose a portion of the cathode lead 4.

As shown in FIG. 16, the resin package 1 is formed into a cubic shape having a first lateral surface 11 and a second lateral surface 12 perpendicular to the first lateral surface 11. The x, y and z directions used in the following description are orthogonal to each other. The first lateral surface 11 is of a rectangular shape having a long side extending in the x direction and a short side extending in the z direction. The second lateral surface 12 is of a rectangular shape having a side extending in the y direction and a side extending in the z direction. An edge 111 forming one edge of the first lateral surface 11 in the x direction also forms one edge of the second lateral surface 12 in the y direction. The edge III extends in the z direction of the first lateral surface 11 and also extends in the z direction of the second lateral surface 12. The dimension of the resin package 1 is, for example, 1.6 mm in the x direction, 0.85 mm in the y direction, and 0.8 mm in the z direction.

As shown in FIG. 17, the solid electrolyte capacitor chip 201 is formed into a rectangular shape having four corners, one of which is cut out, when viewed in the z direction, and has a first surface 81, a second surface 82 and a third surface 83. The first surface 81 is parallel with the first lateral surface II and is of a rectangular shape having a long side extending in the x direction and a short side extending in the z direction. The second surface 82 is parallel with the second lateral surface 12 and is of a rectangular shape having a side extending in the y direction and a side extending in the z direction. The third surface 83 is of a rectangular shape having a side extending in an Ly direction inclined by 45 degrees with respect to the x and the y direction and by 90 degrees with respect to the z direction and a side extending in the z direction. As shown in FIG. 17, the third surface 83 is interposed between the first surface 81 and the second surface 82 when viewed in an Lx direction perpendicular to the Ly direction. The third surface 83 is perpendicular to the Lx direction. When viewed in the y direction, one edge of the first surface 81 in the x direction is positioned differently in the x direction from the second surface 82. In addition, when viewed in the x direction, one edge of the second surface 82 in the y direction is positioned differently in the y direction from the first surface 81.

As shown in FIG. 18, the solid electrolytic capacitor chip 201 includes the porous sintered body 24 and the cathode metal film 23 covering most of the porous sintered body 24. The porous sintered body 24 is made of a valve-acting metal such as tantalum, niobium or the like. The cathode metal film 23 is made of, for example, silver and is formed to cover most of the porous sintered body 24. As shown in FIG. 17, since the cathode metal film 23 is not provided on the third surface 83 of the solid electrolytic capacitor chip 201, the porous sintered body 24 is exposed.

The anode wire 2 is made of a valve-acting metal such as tantalum, niobium or the like. As shown in FIG. 17, the anode wire 2 projects from the third surface 83 and extends along the Lx direction. That is, the Lx direction corresponds to a longitudinal direction of the anode wire 2. The Lx direction is inclined by 45 degrees with respect to the x and the y direction and perpendicular to the z direction. The diameter of the anode wire is, for example, 0.15 mm.

The anode wire 2 includes an exposed portion 212 exposed from the porous sintered body 24 and an embedded portion 211 embedded in the porous sintered body 24. The embedded portion 211 corresponds to a portion including one end portion of the anode wire 2 in the Lx direction and is connected to the porous sintered body 24. As shown in FIG. 16, at the other end portion of the anode wire 2 in the Lx direction are formed a first and a second wire exposed surface 2121 and 2122 exposed from the resin package 1. The first wire exposed surface 2121 is formed to be on the same plane with the first lateral surface 11. The second wire exposed surface 2122 is formed to be on the same plane with the second lateral surface 12. As shown in FIG. 16, one edge of the first wire exposed surface 2121 in the x direction overlaps with the edge 111 when viewed in the z direction, and one edge of the second wire exposed surface 2122 in the y direction overlaps with the edge 111 when viewed in the z direction.

The anode lead 3 includes the terminal 31 and the lead side connector 32. As shown in FIG. 17, the terminal 31 has a long rectangular shape when viewed in the z direction and is placed such that a portion thereof overlaps with one end portion of the solid electrolytic capacitor chip 201 in the x direction. As shown in FIG. 18, the terminal 31 is exposed to the outside of the resin package 1. The lead side connector 32 is formed to extend in the z direction from the vicinity of one end portion of the terminal 31 in the y direction and makes electrical conduction with the terminal 31. The lead side connector 32 is fixed to the terminal 31 and is also enclosed by and fixed to the resin package 1. In addition, the top portion of the lead side connector 32 in the z direction in FIG. 18 is brought into contact with the anode wire 2 and makes electrical conduction with the anode wire 2.

As shown in FIG. 18, the lead side connector 32 is interposed between the edge 111 and the third surface 83 in the Lx direction. As shown in FIG. 17, most of the lead side connector 32 overlaps with the solid electrolytic capacitor chip 201 when viewed in the x direction. Similarly, most of the lead side connector 32 overlaps with the solid electrolytic capacitor chip 201 when viewed in the y direction. As shown in FIGS. 16 and 17, the lead side connector 32 is of a trapezoidal shape when viewed in the z direction and has, at both end portions in the Ly direction, a first and a second exposed surface 321 and 322 exposed from the resin package 1. The first exposed surface 321 is formed to be on the same plane with the first lateral surface 11. The second exposed surface 322 is formed to be on the same plane with the second lateral surface 12.

As shown in FIG. 17, the cathode lead 4 is of a long rectangular shape when viewed in the z direction and is placed such that a portion thereof overlaps with the other end portion of the solid electrolytic capacitor chip 201 in the x direction. As shown in FIG. 18, the bottom portion of the cathode lead 4 in the z direction is exposed to the outside of the resin package 1. The top portion of the cathode lead 4 in the z direction in FIG. 18 penetrates into the resin package 1 to be brought into contact with the solid electrolytic capacitor chip 201. The cathode lead 4 is bonded to the cathode metal film 23 by means of a silver paste (not shown).

Next, a method for manufacturing the solid electrolytic capacitor 701 will be described with reference to FIGS. 19 to 27.

A method for manufacturing the solid electrolytic capacitor 701 includes a process of forming an intermediate element 2A including the manufacturing wire 20 and the solid electrolytic capacitor chip 201, and a process of forming the resin package 1 covering the solid electrolytic capacitor chip 201. FIGS. 19 to 22 show the process of forming the intermediate element 2A.

The process of forming the intermediate element 2A includes a step of placing the manufacturing wire 20 in a pressing mold 6, and a step of forming the solid electrolytic capacitor chip 201 using the pressing mold 6 in which the manufacturing wire 20 is placed. The process of forming the intermediate element 2A will be described in detail below.

Figure 19:
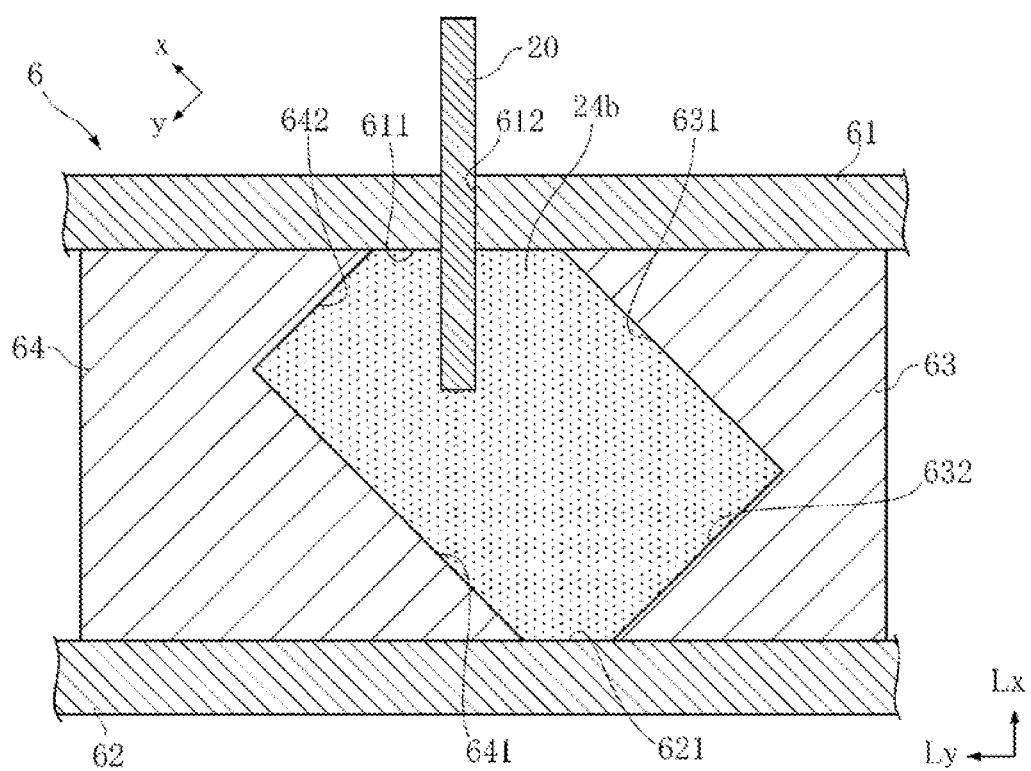
FIG. 19 is a view showing a step of forming the solid electrolytic capacitor chip shown in FIG. 16.

First, the manufacturing wire 20 made of a valve-acting metal such as tantalum, niobium or the like and metal powders 24b made of a valve-acting metal such as tantalum, niobium or the like are prepared. Then, as shown in FIG. 19, a step of placing the prepared manufacturing wire 20 in the pressing mold 6 is performed. At this time, the longitudinal direction of the manufacturing wire 20 is set to the Lx direction. The pressing mold 6 includes a pair of fixed molds 61 and 62 separated from each other in the Lx direction and a pair of movable molds 63 and 64 separated from each other in the Ly direction perpendicular to the Lx direction. The movable molds 63 and 64 can be moved in the Ly direction. The fixed mold 61 has an inner surface 611 perpendicular to the Lx direction and a through-hole 612 passing therethrough the manufacturing wire 20 in the Lx direction. The fixing mold 62 has an inner surface 621 facing the inner surface 611. The movable mold 63 has a pressing surface 631 of a rectangular shape having a long side extending in the x direction and a short side extending in the z direction, and a pressing surface 632 of a rectangular shape having a side extending, in the y direction and a side extending in the z direction. The movable mold 64 has a pressing surface 641 of a rectangular shape having a long side extending in the x direction and a short side extending in the z direction, and a pressing surface 642 of a rectangular shape having a side extending in the y direction and a side extending in the z direction. In addition, in this step, the previously prepared metal powders 24b are placed in a region surrounded by the fixed molds 61 and 62 and the movable molds 63 and 64. As shown in FIG. 19, one side of the manufacturing wire 20 in the Lx direction (the lower portion thereof in FIG. 19) is embedded in the metal powers 24b.

Figure 20:
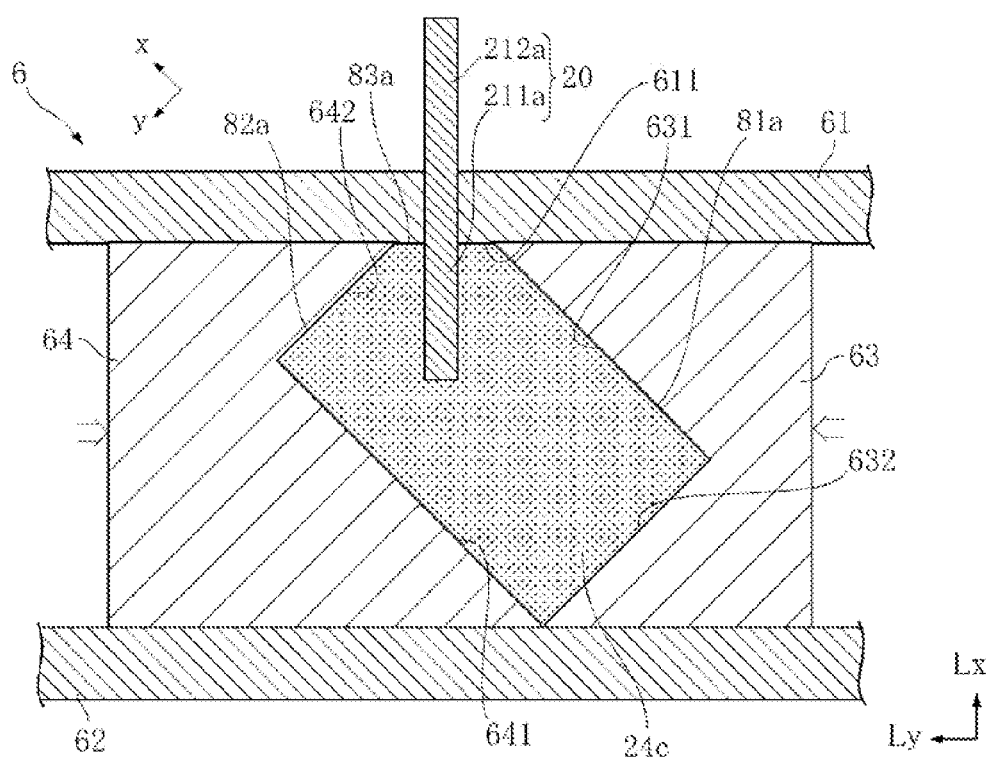
FIG. 20 is a view showing a step subsequent to that shown in FIG. 19.

After performing the step of placing the manufacturing wire 20 and the metal powders 24b in the pressing mold 6, a pressing step of pressing the metal powders 24b is performed. In this step, as shown in FIG. 20, the movable molds 63 and 64 are moved to be close to each other in the Ly direction so that the metal powders 24b are pressed to be hardened. The pressed and hardened metal powders 24b become a powder solidified body 24c. In this step, a first surface 81a of a rectangular shape having a long side extending in the x direction and a short side extending in the z direction is formed to correspond to the pressing surface 631. A second surface 82a of a rectangular shape having a side extending in the y direction and a side extending in the z direction is formed to correspond to the pressing surface 642. In addition, as shown in FIG. 20, end portions at the side of the movable molds 63 and 64 in the Lx direction (the upper side of the movable molds 63 and 64 in FIG. 20) are separated from each other in the Ly direction. Accordingly, in this step, a third surface 83a of a rectangular shape having a side extending in the Ly direction and a side extending in the z direction is formed along the inner surface 611. The portion of the manufacturing wire 20 exposed from the power solidified body 24c is referred to as an exposed portion 212a and the portion of the manufacturing wire 20 embedded in the power solidified body 24c is referred to as an embedded portion 211a.

Figure 21:
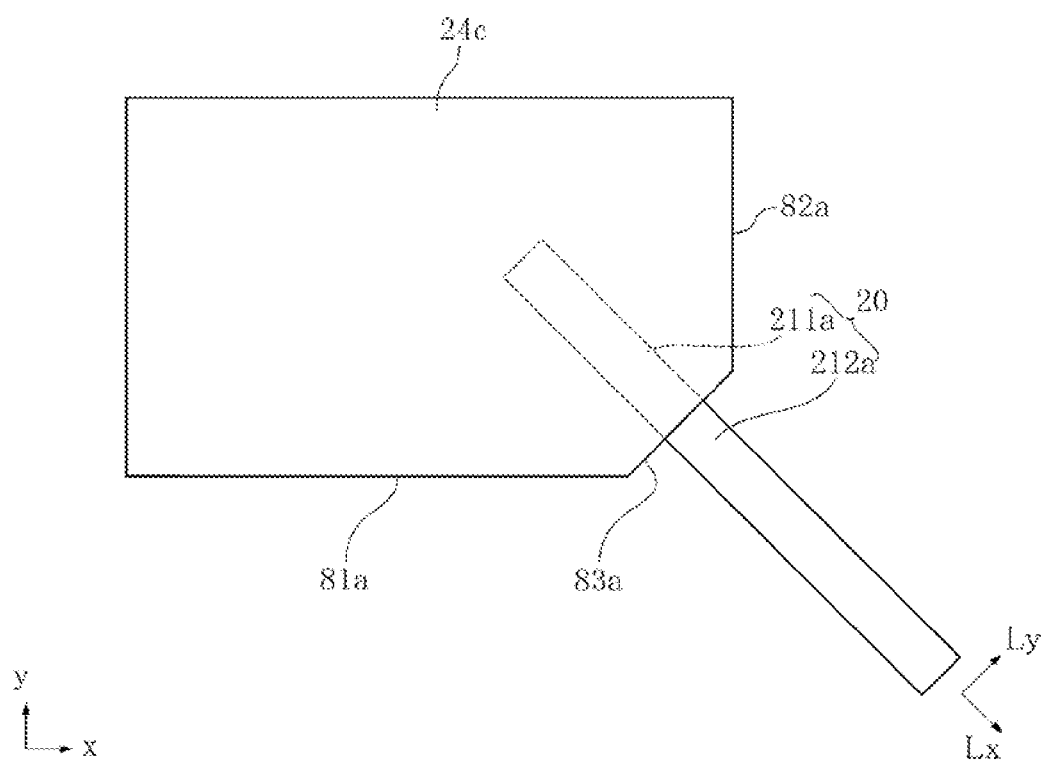
FIG. 21 is a view showing a state where a powder solidified body formed in the step shown in FIG. 20 is taken out of a mold.

Next, a step of taking the manufacturing wire 20 and the powder solidified body 24c out of the pressing mold 6 and forming the porous sintered body 24 from the powder solidified body 24c is performed. FIG. 21 shows a state where the manufacturing wire 20 and the powder solidified body 24c are taken out of the pressing mold 6.

In this step, the powder solidified body 24c is first sintered under a vacuum. Next, the sintered powder solidified body 24c is immersed in a strong acid solution while a voltage is being applied. The result is that a dielectric oxide film is formed on a surface of the powder particles of the powder solidified body 24c. The dielectric oxide film is made of tantalum pentoxide or niobium pentoxide. Next, gaps between the powders of the powder solidified body 24c are filled with a solid electrolyte. The solid electrolyte is made of manganese dioxide or a conductive polymer. Thereafter, the powder solidified body 24c filled with the solid electrolyte is covered by a graphite layer to form the porous sintered body 24.

Figure 22:
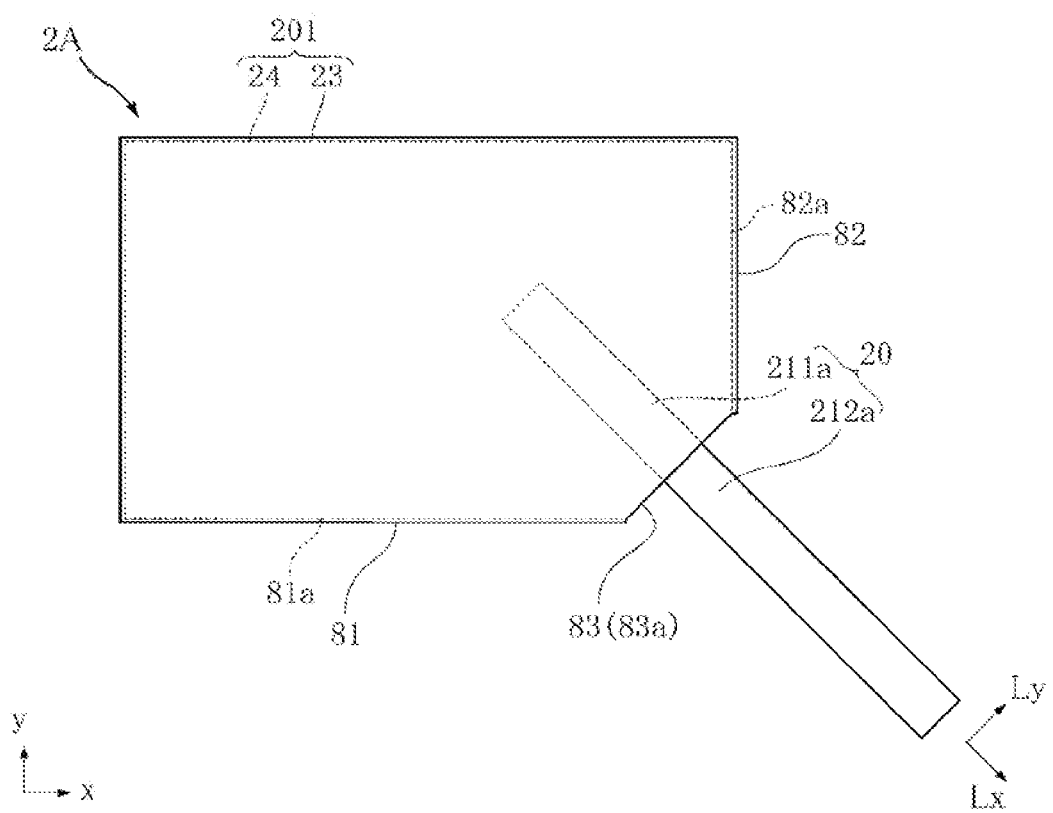
FIG. 22 is a view showing an intermediate element formed with a solid electrolytic capacitor chip and a manufacturing wire.

Next, a step of forming the cathode metal film 23 to cover the porous sintered body 24 is performed. FIG. 22 shows a state where the cathode metal film 23 is formed. This step is performed by covering the porous sintered body 24 with silver plating in such a manner that the third surface 83a is exposed. The silver plating formed in this step corresponds to the cathode metal film 23. The porous sintered body 24 on which the cathode metal film 23 is formed corresponds to the solid electrolytic capacitor chip 201. Since the cathode metal film 23 is formed to have substantially a uniform thickness, the external shape of the solid electrolytic capacitor chip 201 follows the shape of the porous sintered body 24. As shown in FIG. 22, the solid electrolytic capacitor chip 201 is formed to have the first surface 81 following the first surface 81a, the second surface 82 following the second surface 82a, and the third surface 83 following the third surface 83a. The third surface 83 is identical to the third surface 83a.

The intermediate element 2A is formed by the above-described steps. According to this manufacturing method, the manufacturing wire 20 naturally has a shape projecting from the third surface 83 of the solid electrolytic capacitor chip 201.

Figure 23:
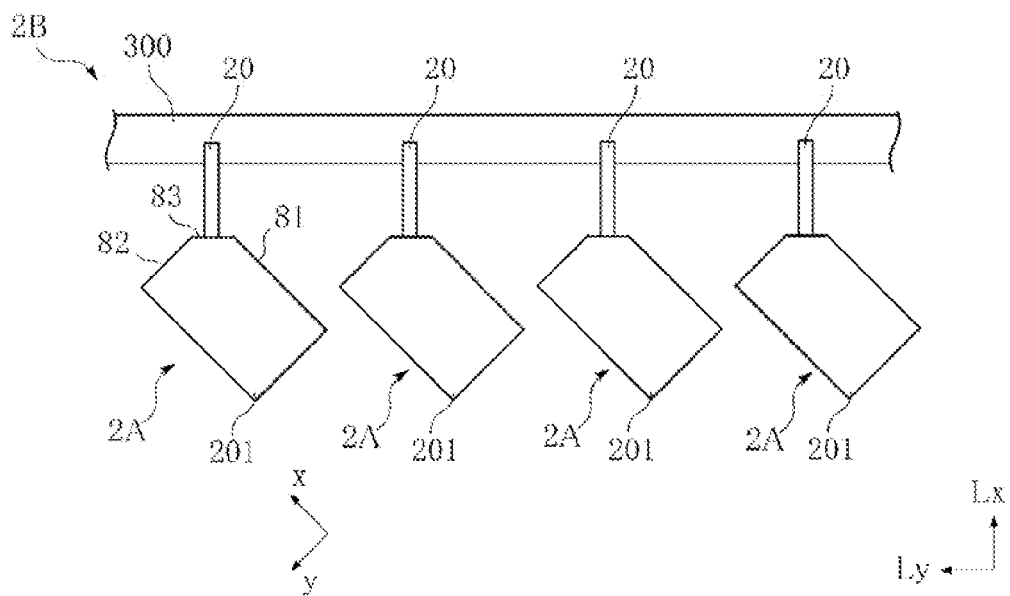
FIG. 23 is a view showing a step of manufacturing a plurality of solid electrolytic capacitors by using a plurality of intermediate elements.

Next, as shown in FIG. 23, a step of fixing a plurality of intermediate elements 2A to a wire supporting lead 300 is performed. This step is performed by welding end portions at one end of the manufacturing wires 20 in the longitudinal Lx direction (the upper end of the manufacturing wires 20 in FIG. 23) to the wire supporting lead 300 which is made of metal and extends in the Ly direction. Instead of this step, a state as shown in FIG. 23 may be realized by attaching the manufacturing wires 20 to the wire supporting lead 300 in advance and forming the solid electrolytic capacitor chips 201 to cover the end portions at the other end of the manufacturing wires 20 in the Lx direction (the lower end of the manufacturing wires 20 in FIG. 23). The plurality of intermediate elements 2A hung on the wire supporting lead 300 as shown in FIG. 23 is referred to as an intermediate body 2B.

Figure 24:
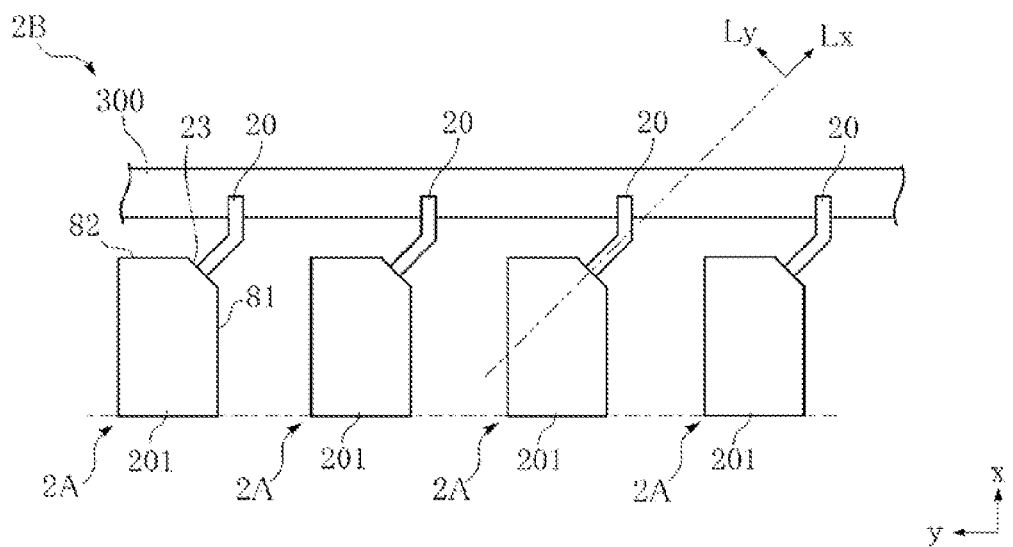
FIG. 24 is a view showing a state after a manufacturing wire of each intermediate element is bent.

Next, a bending step of bending the manufacturing wires 20 is performed. FIG. 24 shows a state after performing the step of bending the manufacturing wires 20 with respect to the intermediate body 2B. According to this step, as shown in FIG. 24, the end portions of one end of the manufacturing wires 20 in the longitudinal direction (the upper end of the manufacturing wires 20 in FIG. 24) extend in the x direction, while the other portions thereof are inclined by 45 degrees with respect to the x direction. In the state shown in FIG. 24, the wire supporting lead 300 extends in the y direction and the plurality of intermediate elements 2A is arranged in an overlapping manner when viewed in the y direction.

In parallel to the above-described step, manufacturing leads 410 and 411 are prepared. The manufacturing lead 410 is formed into a band shape extending in the y direction when viewed in the z direction, for example, by subjecting a metal plate to a punching process. The manufacturing lead 411 is formed into a band shape extending in the y direction when viewed in the z direction, for example, by subjecting a metal plate thicker than the manufacturing lead 410 in the z direction to a punching process. The manufacturing leads 410 and 411 are arranged to be separated from each other in the x direction.

Next, a plurality of lead side connector leads 320 is placed at appropriate positions of the manufacturing lead 410. In this step, for example, with the Lx direction set as a thickness direction, the lead side connector leads 320 of a plate shape extending in the Ly direction are placed to extend with respect to the manufacturing lead 410 and then fixed thereto by welding.

Figure 25:
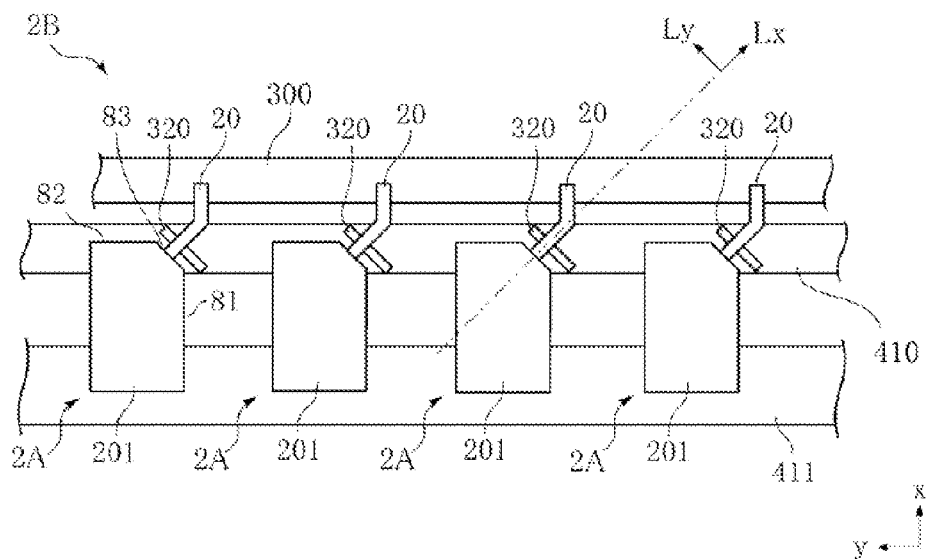
FIG. 25 is a view showing a state where a plurality of intermediate elements is provided at a manufacturing lead.

Next, as shown in FIG. 25, a step of placing the intermediate body 2B on the manufacturing leads 410 and 411 is performed. In this step, the manufacturing wires 20 are brought into contact with the lead side connector leads 320 in one-to-one correspondence, and the solid electrolytic capacitor chips 201 are brought into contact with the manufacturing lead 411. Thereafter, the manufacturing wires 20 are welded to the respective corresponding lead side connector leads 320.

Figure 26:
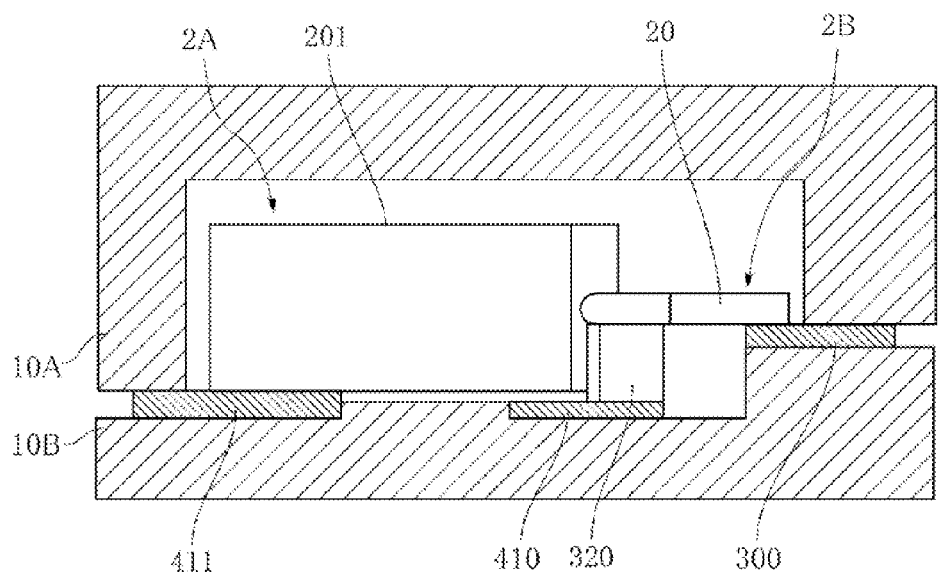
FIG. 26 is a view showing a step of forming resin material to cover an intermediate element.

Next, a step of forming the resin package 1 is performed. First, as shown in FIG. 26, the intermediate body 2B and the manufacturing leads 410 and 411 are interposed between molds 10A and 10B. Next, a step of forming a resin material 10 covering the solid electrolytic capacitor chip 201 by casting epoxy resin into a space defined by the molds 10A and 10B and curing the epoxy resin is performed. Thereafter, a resin cutting step of cutting the resin material 10 is performed. In the resin cutting step, the resin material 10 is cut along cutting lines C1 to C4 indicated by two-dot chain lines in FIG. 27. The cutting lines C1 and C3 extend along the x direction and the cutting lines C2 and C4 extend along the y direction. The resin package 1 is obtained by cutting the resin material 10. A cut surface formed along the cutting line C1 corresponds to the first lateral surface 11 and a cut surface formed along the cutting line C2 corresponds to the second lateral surface 12.

Figure 27:
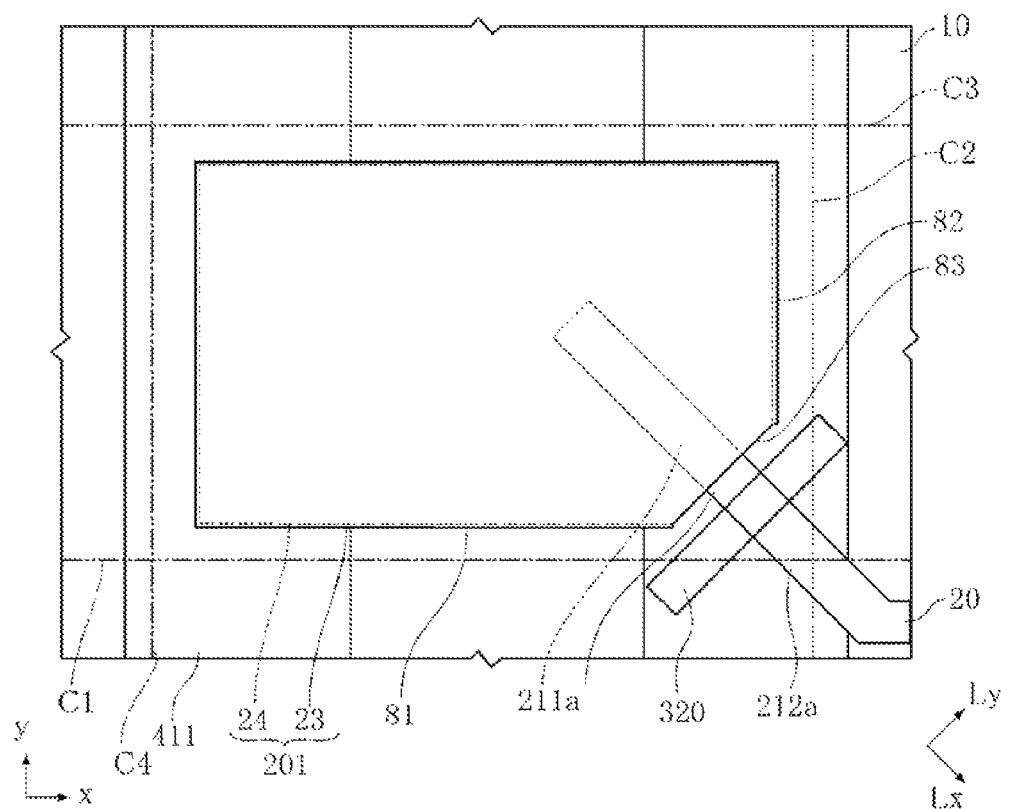
FIG. 27 is a view showing a step of forming a resin package by cutting resin material.

As shown in FIG. 27, the cutting lines C1 and C2 pass through the lead side connector lead 320. In the resin cutting step, the lead side connector lead 320 is also cut. The lead side connector 32 is formed by cutting the lead side connector lead 320. A cut surface formed by cutting the lead side connector lead 320 along the cutting line C1 corresponds to the first exposed surface 321. A cut surface formed by cutting the lead side connector lead 320 along the cutting line C2 corresponds to the second exposed surface 322. According to this manufacturing process, the first exposed surface 321 naturally comes to be in the same plane as the first lateral surface 11 and the second exposed surface 322 naturally comes to be in the same plane as the second lateral surface 12.

In addition, the cutting lines C1 and C2 pass through the manufacturing wire 20. In the resin cutting step, the manufacturing wire 20 is also cut. The anode wire 2 is formed by cutting the manufacturing wire 20. The embedded portion 211a of the manufacturing wire 20 corresponds to the embedded portion 211 of the anode wire 2. In the exposed portion 212a of the manufacturing wire 20, a portion left after the resin cutting step corresponds to the exposed portion 212. A cut surface formed by cutting the manufacturing wire 20 along the cutting line C1 corresponds to the first wire exposed surface 2121. A cut surface formed by cutting the manufacturing wire 20 along the cutting line C2 corresponds to the second wire exposed surface 2122. According to this manufacturing process, the first wire exposed surface 2121 naturally comes to be in the same plane as the first lateral surface 11 and the second wire exposed surface 2122 naturally comes to be in the same plane as the second lateral surface 12.

The cutting lines C1 to C4 shown in FIG. 27 are merely examples and other different cutting lines may be set.

Next, operation of the solid electrolytic capacitor 701 will be described.

In the solid electrolytic capacitor 701, the solid electrolytic capacitor chip 201 has the third surface 83 inclined with respect to the x and the y direction and is of a shape where one of the four corners thereof is not present when viewed in the z direction. When the solid electrolytic capacitor chip 201 is received in the cubic resin package 1, an additional space is provided to the degree as one corner of the solid electrolytic capacitor chip 201 is not present. In the above-described embodiment, the lead side connector 32 is placed in this space. Accordingly, the solid electrolytic capacitor 701 has a structure that achieves compactness of the resin package 1.

In addition, if the resin package 1 has the same size as that of a conventional resin package, for example, the dimension in the x direction of the solid electrolytic capacitor 201 can be increased by as much as the lead side connector 32. Although one corner of the solid electrolytic capacitor chip 201 is not present, the volume thereof can be increased over as much as a volume decreases by the absence of the corner by increasing the dimension in the x direction thereof. The increase in volume of the solid electrolytic capacitor chip 201 leads to an increase in the volume of the porous sintered body 24 occupying most of the solid electrolytic capacitor chip 201. The increase in volume of the porous sintered body 24 results in an improvement of the capacitance of the solid electrolytic capacitor 101.

As described above, by placing the lead side connector 32 in the space formed by the absence of one corner of the solid electrolytic capacitor chip 201, it is possible in the solid electrolytic capacitor 701 to increase the volume of the solid electrolytic capacitor chip 201 received in the resin package 1. Accordingly, it is possible for the solid electrolytic capacitor 701 to improve a volume ratio occupied by the solid electrolytic capacitor chip 201 in the resin package 1. Thus, the solid electrolytic capacitor 701 can reduce the size of the resin package 1 while increasing the volume of the solid electrolytic capacitor chip 201 in the resin package 1, thereby simultaneously achieving high capacity and compactness.

In addition, in the above-described manufacturing method, the bending step of bending the manufacturing wires 20 is performed. FIG. 23 shows a state before the bending step is performed. As shown in FIG. 23, the solid electrolytic capacitor chips 201 are arranged to be deviated from each other when viewed in the y direction. With this arrangement, it is difficult to place the plurality of intermediate elements 2A on the same manufacturing leads 410 and 411. On the other hand, in FIG. 24 showing a state after the bending step is performed, the solid electrolytic capacitor chips 201 are arranged to overlap with each other when viewed in the y direction. With this arrangement, it is possible to place all of the solid electrolytic capacitor chips 201 arranged along the y direction on the same manufacturing leads 410 and 411 extending in the y direction, as shown in FIG. 25. Accordingly, the bending step of bending the manufacturing wires 20 can provide the great benefit of mass production of the solid electrolytic capacitor 701.

In addition, although, in the above-described manufacturing method, powder material 201a is formed to cover one end portion of the manufacturing wire 20 in the Lx direction, the following manufacturing method of forming the manufacturing wire 20 may be also performed. In this case, it is possible to realize substantially the same state as that shown in FIG. 19 by first pressing the metal powders 24b and passing the manufacturing wire 20 through the third surface 83a before sintering the metal powders 24b.

Figure 28:
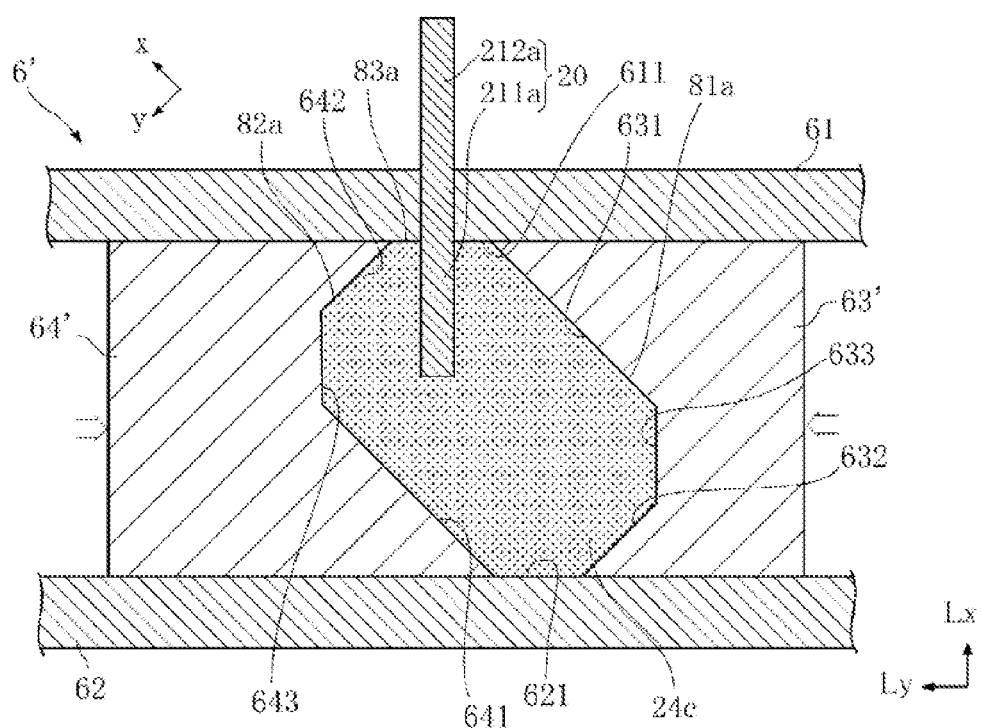
FIG. 28 is a view showing a step of forming a powder solidified body of a shape different from that of the eighth embodiment.

In addition, although one corner of the solid electrolytic capacitor chip 201 is not present in the above-described solid electrolytic capacitor 701, other corners of the solid electrolytic capacitor chip 201 may also not be present. FIG. 28 shows a power solidified body 24c of a rectangular shape with its four corners not present and a pressing mold 6' used to form the power solidified body 24c. A movable mold 63' of the pressing mold 6' has a pressing surface 633 which is interposed between pressing surfaces 631 and 632 and is perpendicular to the Ly direction. A movable mold 64' has a pressing surface 643 which is interposed between pressing surfaces 641 and 642 and is perpendicular to the Ly direction. In addition, end portions at one side of the movable molds 63' and 64' in the Lx direction (the lower side of the movable molds 63' and 64' in FIG. 28) are separated from each other even under a state where they are moved to be close to each other, and a surface along the inner side 621 is formed on the power solidified body 24c.

FIGS. 29 to 33 show different embodiments of the present disclosure. Throughout these figures, the same or similar elements as the above-described embodiments are denoted by the same reference numerals as the above-described embodiments, and explanation of which will not be repeated.

Figure 29:
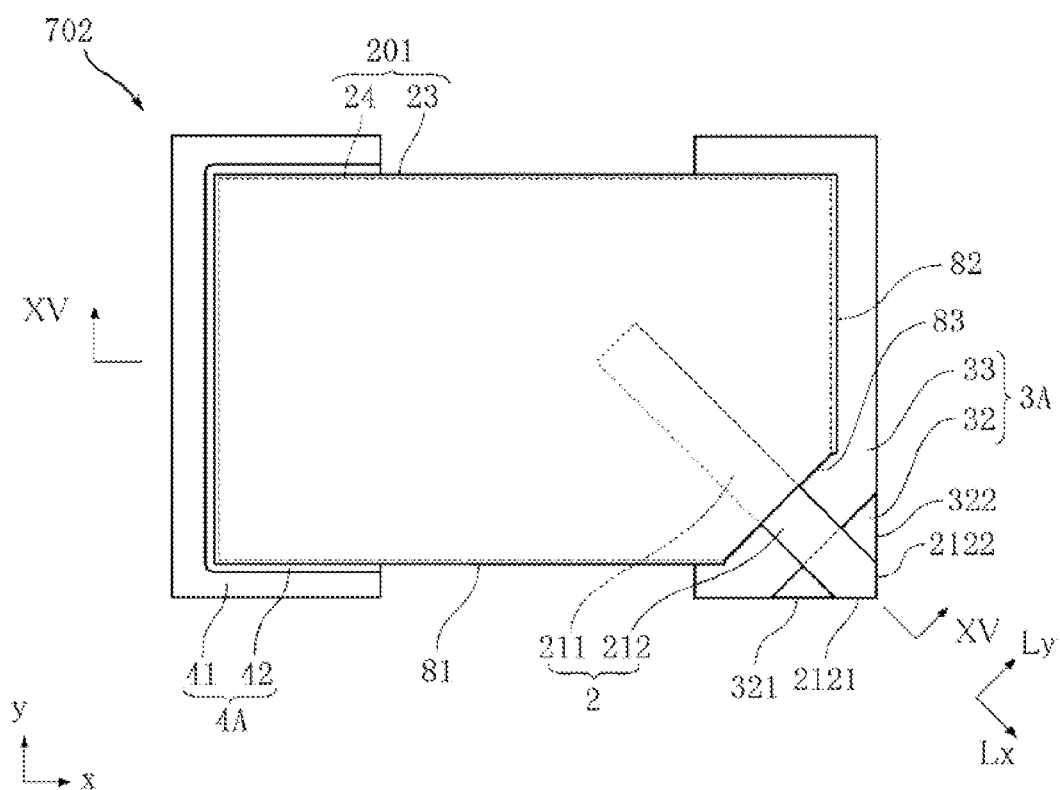
FIG. 29 is a main part plan view showing a solid electrolytic capacitor according to a ninth embodiment of the present disclosure.
Figure 30:
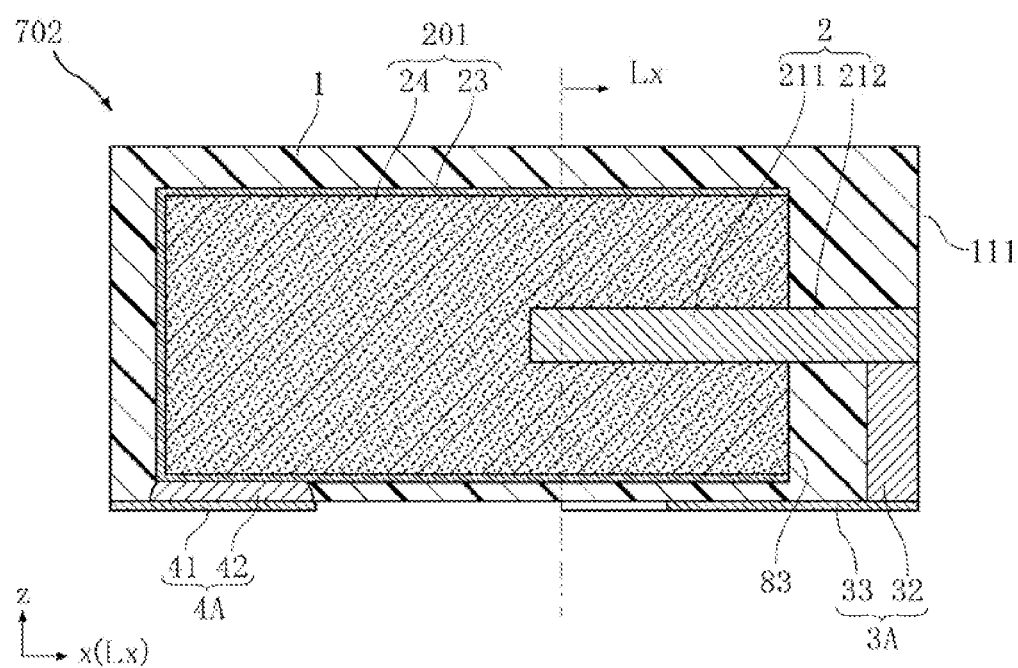
FIG. 30 is a sectional view taken along line XV-XV in FIG. 29.

FIGS. 29 and 30 show a solid electrolytic capacitor according to a ninth embodiment of the present disclosure. In this embodiment, a solid electrolytic capacitor 702 includes an anode lead 3A and a cathode member 4A instead of the anode lead 3 and the cathode lead 4, respectively. Other configurations are the same as those in the solid electrolytic capacitor 701. The resin package is not shown in FIG. 29.

The anode lead 3A includes the lead side connector 32 and the terminal electrode 33. In this embodiment, as shown in FIG. 29, the lead side connector 32 is formed into a triangular prism shape having a right-angled triangular section when viewed in the z direction. The lead side connector 32 also has the first and second exposed surface 321 and 322. The terminal electrode 33 is a metal terminal of a thin film shape formed, for example, by plating. The terminal electrode 33 is fixed to the lead side connector 32.

As shown in FIG. 29, an edge at one side of the first exposed surface 321 in the x direction overlaps with an edge at one side of a first wire exposed surface 2121 in the x direction when viewed in the z direction. Similarly, an edge at one side of the second exposed surface 322 in the y direction overlaps with an edge at one side of a second wire exposed surface 2122 in the y direction. As described in the description for the solid electrolytic capacitor 701, when viewed in the z direction, the edge at one side of the first wire exposed surface 2121 in the x direction overlaps with the edge 111 of the resin package 1 and the edge at one side of the second wire exposed surface 2122 in the y direction also overlaps with the edge 111. Further, when viewed in the z direction, the edge at one side of the first exposed surface 321 in the x direction overlaps with the edge 111 and the edge at one side of the second exposed surface 322 in the y direction also overlaps with the edge 111.

Also in this embodiment, the anode wire 2 and the lead side connector 32 are welded together. If a welding area is small, the anode wire 2 can be separated from the lead side connector 32 when an external force is applied thereto. Accordingly, it is required to increase the contact area between the anode wire 2 and the lead side connector 32 to a certain extent. The lead side connector 32 shown in FIG. 29 has a shape more suitable to increase the contact area with the anode wire 2 than the lead side connector 32 of a trapezoidal shape.

The anode member 4A includes a bonding member 42 to bond the cathode metal film 23 and the terminal electrode 41 made of a thin metal formed, for example, by plating. The bonding member 42 is made of, for example, a silver paste and is formed such that the bottom portion thereof in FIG. 30 in the z direction is exposed from the resin package 1.

By forming the terminal electrodes 33 and 41 through plating, it is possible to reduce the thickness of the solid electrolytic capacitor 702 in the z direction.

Figure 31:
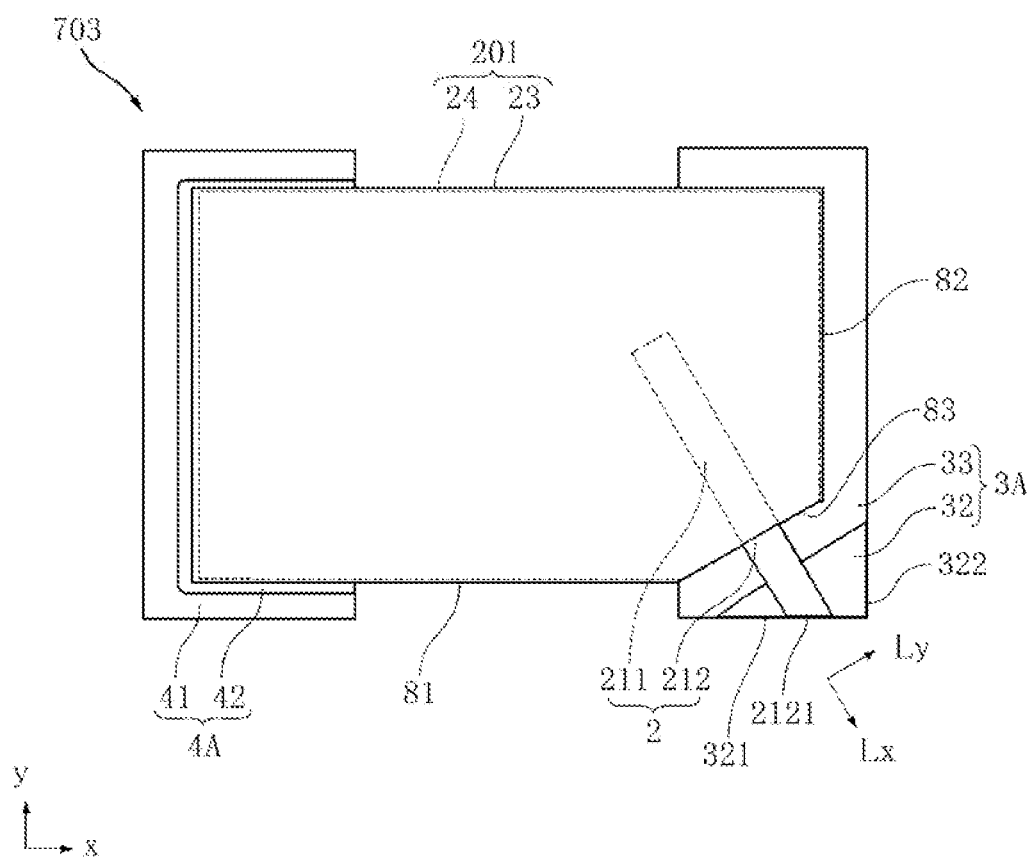
FIG. 31 is a main part plan view showing a solid electrolytic capacitor according to a tenth embodiment of the present disclosure.

FIG. 31 shows a solid electrolytic capacitor according to a tenth embodiment of the present disclosure. In a solid electrolytic capacitor 702 of this embodiment, the Lx direction, which is the longitudinal direction of the anode wire 2, is inclined by 60 degrees with respect to the x direction. As shown in FIG. 31, the Ly direction is perpendicular to the Lx direction and is inclined by 60 degrees with respect to the y direction, thereby making the inclination of the third lateral surface 83 different from that in the solid electrolytic capacitor 702. The anode wire 2 does not reach the second lateral surface 12 of the resin package 1 and has the first wire exposed surface 2121 on the same plane with the first lateral surface 11. In addition, the lead side connector 32 also has a triangular prism shape having a surface parallel with the third lateral surface 83. Other configurations of the solid electrolytic capacitor 703 are the same as those in the solid electrolytic capacitor 702. The resin package 1 is not shown in FIG. 31.

This embodiment can obtain the same effects as the case where the Lx direction is inclined by 45 degrees with respect to the x direction, like the solid electrolytic capacitor 702.

Figure 32:
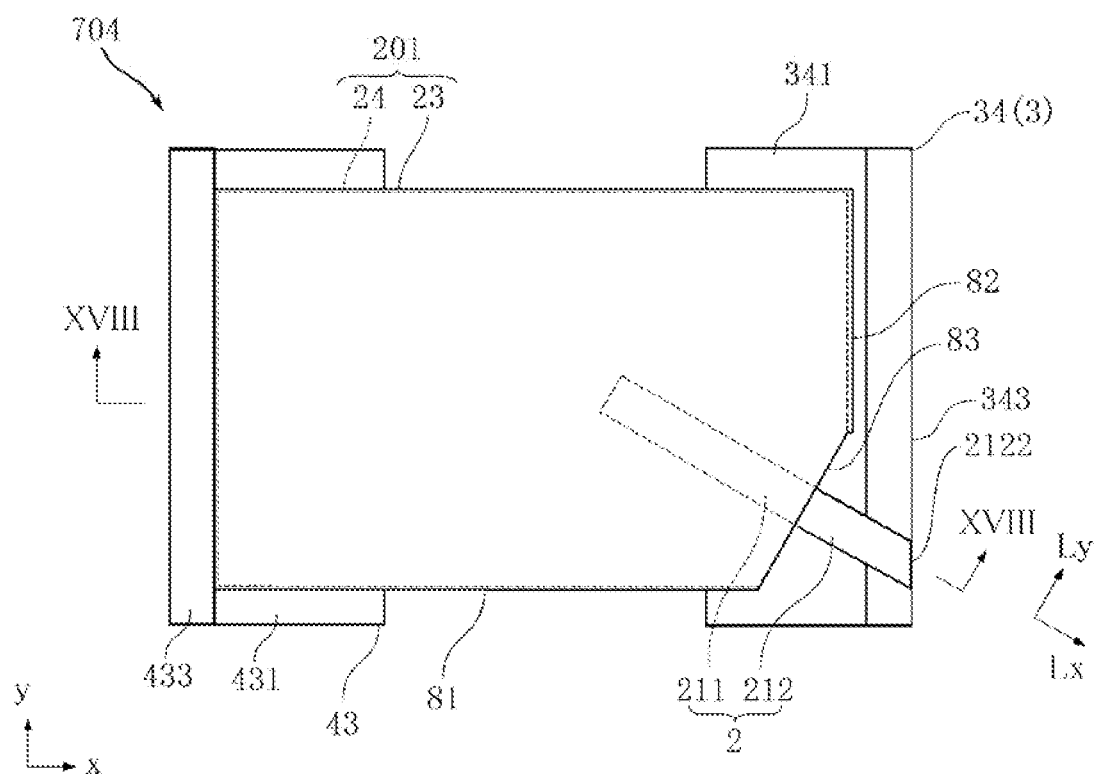
FIG. 32 is a main part plan view showing a solid electrolytic capacitor according to an eleventh embodiment of the present disclosure.
Figure 33:
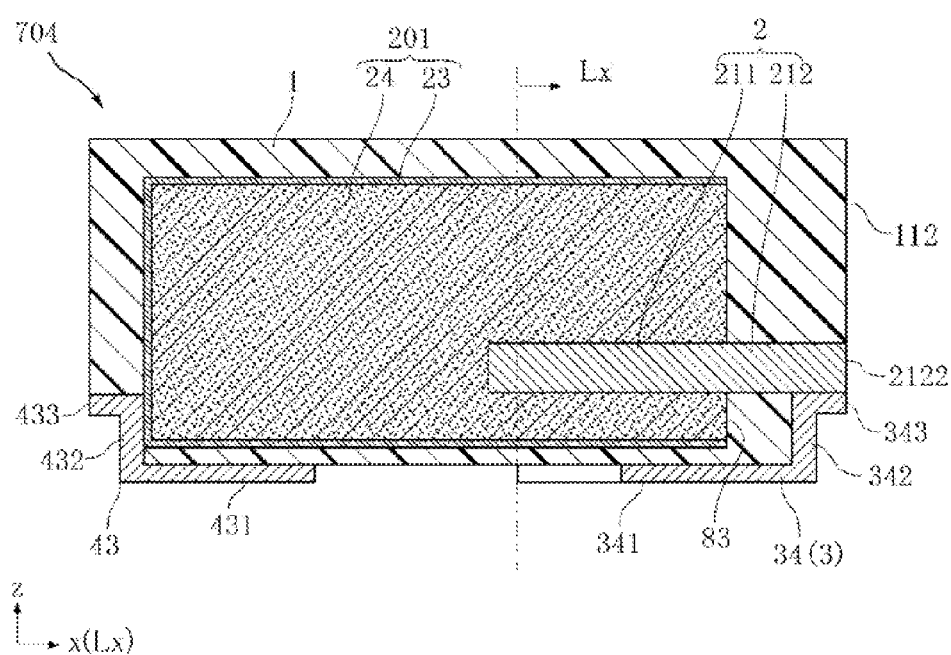
FIG. 33 is a sectional view taken along line XVIII-XVIII in FIG. 32.

FIGS. 32 and 33 show a solid electrolytic capacitor according to an eleventh embodiment of the present disclosure. In a solid electrolytic capacitor 704 of this embodiment, the Lx direction, which is the longitudinal direction of the anode wire 2, is inclined by 30 degrees with respect to the x direction. As shown in FIG. 32, the Ly direction is perpendicular to the Lx direction and is inclined by 30 degrees with respect to the y direction, thereby making the inclination of the third lateral surface 83 different from that in the solid electrolytic capacitor 701. In addition, in this embodiment, a terminal 34 forms the anode lead 3 and a cathode lead 43 is used instead of the cathode lead 4. In addition, as shown in FIG. 33, the anode wire 2 is not placed at the center portion of the porous sintered body 24 in the z direction but at a portion biased downward of the porous sintered body 24. Other configurations of the solid electrolytic capacitor 704 are the same as those in the solid electrolytic capacitor 701. The resin package is not shown in FIG. 32.

In this embodiment, as shown in FIG. 32, the anode wire 2 does not extend up to a position intersecting the first lateral surface 11 of the resin package 1 and has the second wire exposed surface 2122 on the same plane with the second lateral surface 12.

As shown in FIG. 33, the terminal 34 includes a terminal portion 341 brought into contact with the bottom end of the resin package 1 in the z direction, an erecting portion 342 extended in the z direction from an end portion of the terminal portion 341, and a pillow portion 343 projecting in the x direction from the top portion of the erecting portion 342. For example, the terminal 34 may be formed relatively easily by bending a metal plate having a uniform thickness. The erecting portion 342 and the pillow portion 343 together correspond to the lead side connector 32 in the solid electrolytic capacitor 701.

As described above, the anode wire 2 is placed at a portion biased downward in FIG. 33. This provides the effect of shortening the erecting portion 342. By shortening the erecting portion 342, it is possible to shorten the width in the x direction of a manufacturing lead used to manufacture the terminal 34.

As shown in FIG. 33, the cathode lead 43 includes a terminal portion 431 brought into contact with the bottom end of the resin package 1 in the z direction, an erecting portion 432 extended in the z direction from an end portion of the terminal portion 431, and a pillow portion 443 projecting in the x direction from the top portion of the erecting portion 432. The erecting portion is brought into contact with the cathode metal film 23. A position in the z direction of the pillow portion 433 is the same as that of the pillow portion 343. In addition, the erecting portion 432 and the cathode metal film 23 may be configured to make electrical conduction therebetween via a silver paste or the like without making direct contact.

As shown in FIG. 33, in this embodiment, the resin package 1 is formed to expose the erecting portions 342 and 432 and the pillow portions 343 and 433 as well as the terminal portions 341 and 431. With this configuration, for example when the solid electrolytic capacitor 704 is mounted on a substrate (not shown) by means of a solder, the solder can be adhered to the erecting portions 342 and 432 and the pillow portions 343 and 433 as well as the terminal portions 341 and 431. As an adhesion area of the solder increases, the solid electrolytic capacitor 704 can be more firmly fixed to the substrate.

As shown in FIG. 32, in the solid electrolytic capacitor 704, the anode wire 2 extending in the Lx direction is welded to the band-like pillow portion 343 extending in the y direction. This arrangement can increase the contact area between the anode wire 2 and the pillow portion 343 when viewed in the z direction, compared with an arrangement where the anode wire 2 extends straight in the x direction. In other words, even when the dimension of the pillow portion 343 in the x direction is small, the anode wire 2 and the pillow portion 343 can be welded together with sufficient strength. Accordingly, compactness of the resin package 1 can be achieved in the solid electrolytic capacitor 704.

Figure 34:
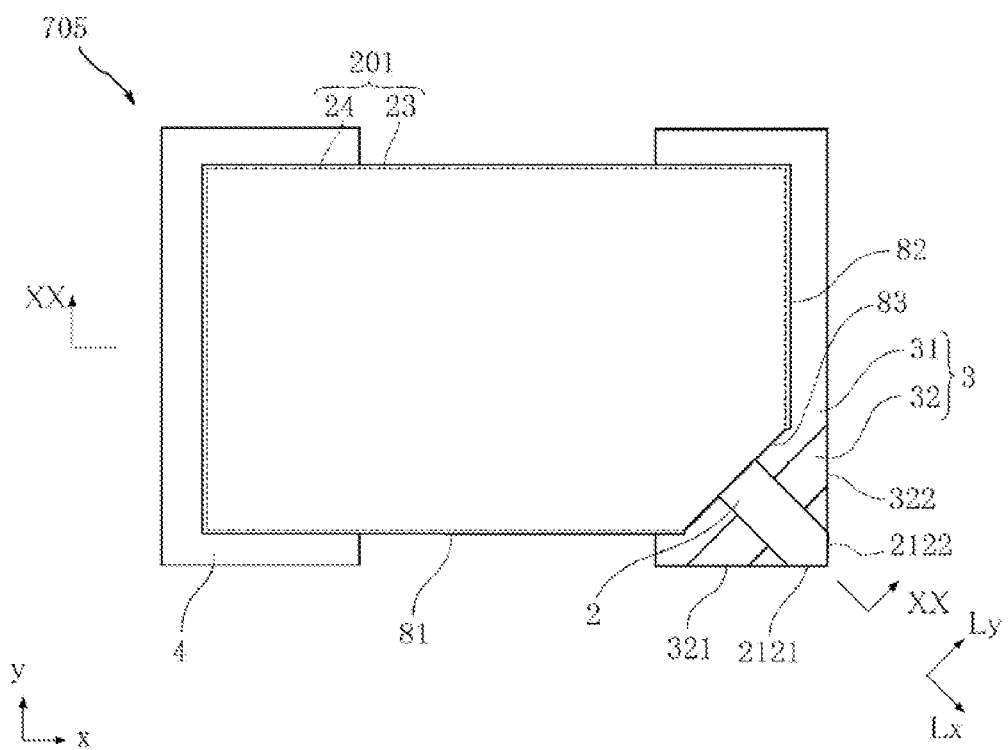
FIG. 34 is a main part plan view showing a solid electrolytic capacitor according to a twelfth embodiment of the present disclosure.
Figure 35:
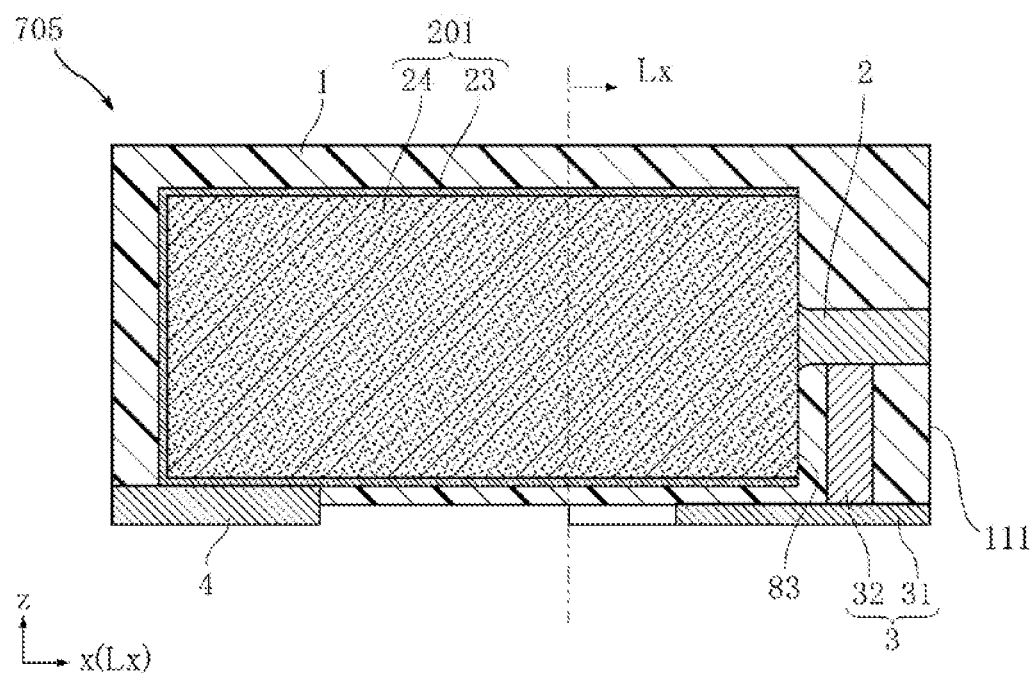
FIG. 35 is a sectional view taken along line XX-XX in FIG. 34.

FIGS. 34 and 35 show a solid electrolytic capacitor according to a twelfth embodiment of the present disclosure. The resin package 1 is not shown in FIG. 34. In a solid electrolytic capacitor 705 of this embodiment, an end portion at one end of the anode wire 2 in the Lx direction is welded to the third surface 83. In other words, in this embodiment, the anode wire 2 is configured to not have the embedded portion 211 but to have only the exposed portion 212 in the anode wire 2 of the solid electrolytic capacitor 701. Other configurations of the solid electrolytic capacitor 705 are the same as those in the solid electrolytic capacitor 701.

When this solid electrolytic capacitor 705 is manufactured, the powder solidified body 24c is shaped without placing the manufacturing wire 20 in the pressing mold 6. Thereafter, the manufacturing wire 20 is welded to the third surface 83a formed on the powder solidified body 24c.

The above-described embodiments are not intended to limit the scope of the present disclosure. Detailed configurations of various elements used in the solid electrolytic capacitors and methods of manufacturing the same according to the embodiments of the present disclosure may be modified in design in different ways. For example, configurations of various elements shown in the solid electrolytic capacitors 701 to 705 may be used in proper combinations.

Although, in the above embodiments, the resin package 1 has a cubic shape and the first and second lateral surfaces 11 and 12 share the edge 111, the resin package 1 is not limited to such a shape but may have substantially a cubic shape. For example, the resin package may have a shape having a slope formed between the first and the second lateral surface 11 and 12.

Although the anode wire 2 is placed to be perpendicular to the z direction in the above embodiments, the anode wire 2 may be inclined by an angle other than 90 degrees with respect to the z direction. In this case, the third surface 83 may become a surface inclined with respect to the z direction. Specifically, the solid electrolytic capacitor 201 may have a shape where one corner of a cube is cut away. In this case, for example, in comparison with the above-described embodiments, it is possible to prevent a reduction of the volume of the solid electrolytic capacitor chip 201.

Hereinafter, a solid electrolytic capacitor and a method for manufacturing the same, the solid electrolytic capacitor having a structure in which metal materials such as metal or an alloy are stacked, cutouts and unevenness are formed, and contact points between elements and resin materials are optimally designed, thereby improving heat resistance and reliability, will be described in detail with reference to FIGS. 36A and 36B to 41.

Figure 36A:
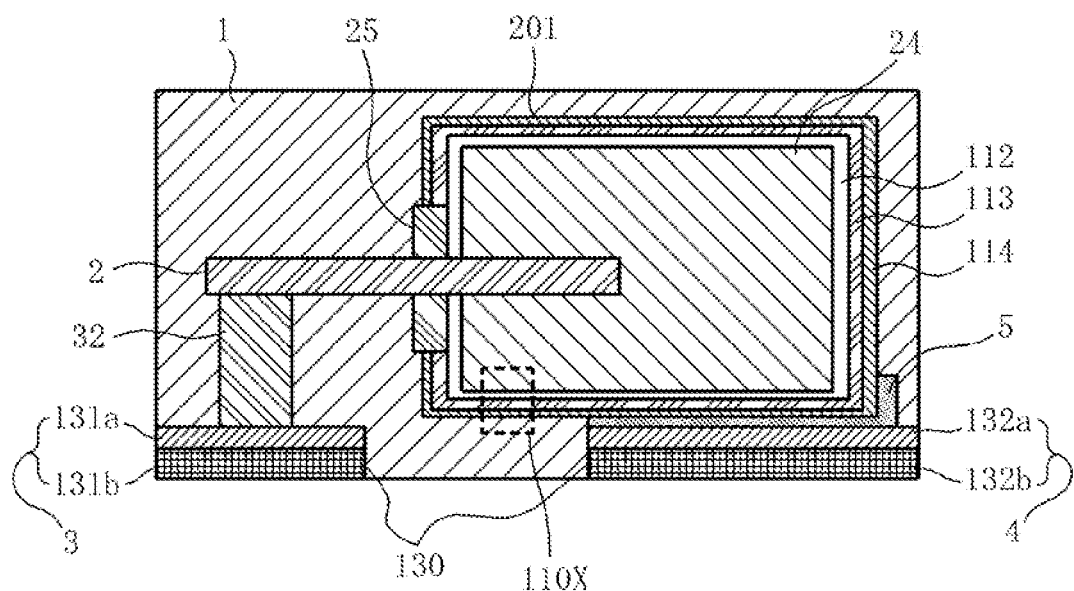
FIG. 36A is a sectional view showing a solid electrolytic capacitor according to a thirteenth embodiment of the present disclosure.
Figure 36B:
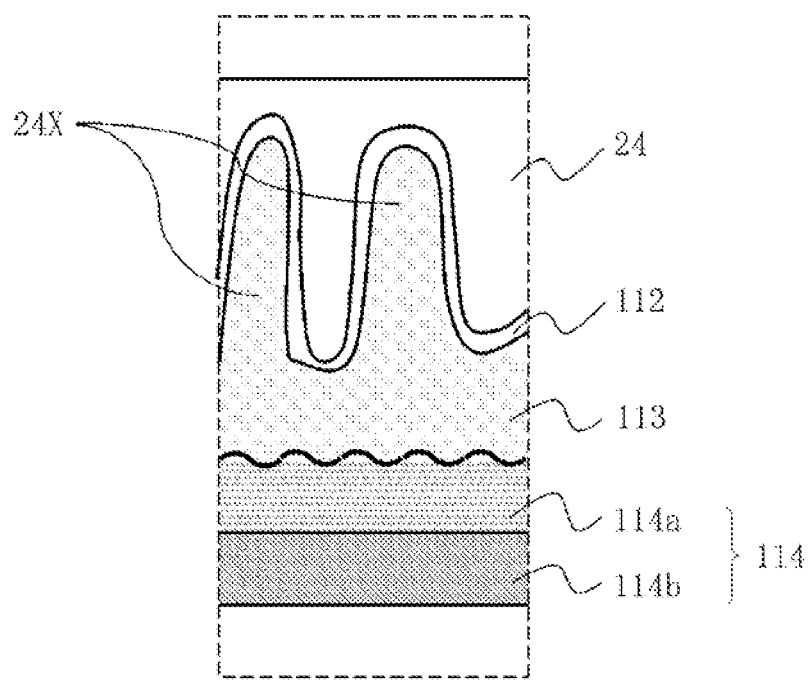
FIG. 36B is an enlarged view of a main part of FIG. 36A.

FIGS. 36A and 36B show a solid electrolytic capacitor according to a thirteenth embodiment of the present disclosure.

FIG. 36A shows a solid electrolytic capacitor 801 according to this embodiment. The solid electrolytic capacitor 801 includes the solid electrolytic capacitor chip 201, the lead side connector 32 and an electrode substrate 130.

FIG. 36B shows an enlarged conceptual view of a detailed portion 110X of the solid electrolytic capacitor chip 201 shown in FIG. 36A. Hereinafter, the solid electrolytic capacitor 801 will be described with reference to FIGS. 36A and 36B.

The solid electrolytic capacitor chip 201 includes the porous sintered body 24, a dielectric layer 112, a solid electrolytic layer 113 and a cathode lead-out layer 114 stacked in order and further includes the anode wire 2. In addition, the solid electrolytic capacitor chip 201 includes the permeable hydrophobic member 25 made of, for example, fluorine resin. The permeable hydrophobic member 25 faces one surface of the porous sintered body 24 and covers a region in the vicinity of the root of the anode wire 2.

The porous sintered body 24 is made of a valve-acting metal such as tantalum, niobium or the like. The porous sintered body 24 is formed by pressing and then sintering powders of the valve-acting metal along with the anode wire 2 and has a structure including a plurality of fine holes 24X as shown in FIG. 36B.

The dielectric layer 112 can be obtained by subjecting the porous sintered body 24 to an anodizing treatment while the porous sintered body 24 is immersed in a phosphoric acid aqueous solution, for example. The dielectric layer 112 is formed on the outer surface of the porous sintered body 24 and is made of a valve-acting metal oxide such as niobium pentoxide, tantalum pentoxide or the like.

The solid electrolytic layer 113 is formed into a shape filling the fine holes 24X of the porous sintered body 24, which are generated by the sintering of the powders, and covers at least a portion of the outer surface of the solid electrolytic capacitor chip 201. The solid electrolytic layer 113 is sequentially formed after the dielectric layer 112 is formed on the porous sintered body 24.

The solid electrolytic layer 113 may be of a manganese dioxide type or of a conductive polymer type, for example.

A step of forming the solid electrolytic layer 113 of the manganese dioxide type will be described below. The solid electrolytic layer 113 is formed, for example, by immersing the porous sintered body 24 in a manganese sulfate solution and pyrolizing the manganese sulfate solution. In this step, the previously placed permeable hydrophobic member 25 prevents the manganese sulfate solution from permeating into the anode wire 2. Manganese dioxide, i.e., the solid electrolytic layer 113, which is a semiconductor oxide covering the fine holes 24X of the porous sintered body 24, is formed by pyrolizing the manganese sulfate solution.

Next, a step of forming the solid electrolytic layer 113 of the conductive polymer type will be described in brief below. The porous sintered body 24 of the solid electrolytic capacitor chip 201 is impregnated into an aqueous solution containing a transition metal salt, e.g., ferric sulfate or ferric acetate, as an oxidizer, and is then dried. Through the above-mentioned treatment, the oxidizer permeates into the fine holes 24X of the porous sintered body 24 to be adhered thereto. Subsequently, the porous sintered body 24 is impregnated into a solution which contains monomers forming a conductive polymer and dopants providing conductivity to the conductive polymer. Through the above-mentioned treatment, the solid electrolytic layer 113 made of the conductive polymer is oxidation-polymerized and formed to cover the entire surface of the porous sintered body 24 and at least a portion of the fine holes 24X. In addition, the solid electrolytic layer 113 is subjected to cleaning and drying.

As shown in FIG. 36B, the cathode lead-out layer 114 is formed by sequentially stacking a graphite layer 114a and a silver layer 114b, for example, and covers the solid electrolytic layer 113. As shown in FIG. 36A, the cathode lead-out layer 114 is formed to cover at least a portion of the outer surface of the solid electrolytic capacitor chip 201.

The cathode lead-out layer 114 is bonded to a main surface of the cathode lead 4 via the bonding member 5 made of, for example, a silver paste, thereby making electrical conduction between the solid electrolytic layer 113 and the cathode lead 4.

The anode wire 2 is made of a metal such as tantalum, niobium or the like. The anode wire 2 may be made of the same kind of metal that forms the valve-acting metal powders forming the porous sintered body 24. In addition, as shown in FIG. 36A, a portion of the anode wire 2 is introduced into the porous sintered body 24.

The permeable hydrophobic member 25 covers a region on a main surface of the porous sintered body 24, the region being in the vicinity of the root of the anode wire 2. As used herein, the term "main surface of the porous sintered body 24" refers to the surface on which the anode wire 2 projects from the porous sintered body 24 of substantially a cubic shape. The permeable hydrophobic member 25 is made of, for example, hydrophobic fluorine resin, and has an annular shape toward the main surface of the porous sintered body 24. The permeable hydrophobic member 25 is brought into contact with an exposed portion of the anode wire 2 and the main surface of the porous sintered body 24. The function of the permeable hydrophobic member 25 is shown when the solid electrolytic capacitor chip 201 is manufactured.

The lead side connector 32 has one main surface electrically conductively bonded to the anode wire 2 by means of laser welding, for example, and the other main surface electrically conductively bonded to the anode lead 3 by means of resistive welding, for example.

The electrode substrate 130 is a plate-like member formed by plating, e.g., copper on a base material made of metal, and includes the anode lead 3 and the cathode lead 4. One main surface of the anode lead 3 makes electrical conduction with the anode wire 2 via the lead side connector 32. The other main surface of the anode lead 3 is exposed from the resin package 1 and serves as a mounting surface of the solid electrolytic capacitor 801. One main surface of the cathode lead 4 is bonded to the cathode lead-out layer 114 via the bonding member 5, as described above. The other main surface of the cathode lead 4 is exposed from the resin package 1, which will be described below, and serves as a mounting surface for the solid electrolytic capacitor 801.

The resin package 1 is made of e.g., epoxy resin, and completely surrounds the solid electrolytic capacitor chip 201 such that the porous sintered body 24, the dielectric layer 112, the solid electrolytic layer 113, the cathode lead-out layer 114, the anode wire 2, the lead side connector 32 and the bonding member 5 are prevented from being exposed from the resin package 1. The resin package 1 covers and protects at least one main surface of the electrode substrate 130. The other main surface of the electrode substrate 130, which is not covered by the resin package 1, is used to mount the solid electrolytic capacitor 801 thereon.

A process of manufacturing the solid electrolytic capacitor 801 will be described in brief below with reference to FIGS. 36A and 36B. The same process is also used for solid electrolytic capacitors 802, 803 and 804, which will be described later.

The anode lead 3 and the cathode lead 4 forming the electrode substrate 130 are connected as a lead frame (not shown) before the manufacturing process. In manufacturing the solid electrolytic capacitor 801, the lead side connector 32 is first adhered to a portion of the lead frame which corresponds to the anode lead 3, by means of, e.g., resistive welding, and then the bonding member 5 is applied on a portion of the lead frame which corresponds to the cathode lead 4. Thereafter, the solid electrolytic capacitor chip 201 including the porous sintered body 24, the dielectric layer 112, the solid electrolytic layer 113 and the cathode lead-out layer 114 stacked in order is placed on the anode wire 2, and subsequently, bonding the anode wire 2 to the lead side connector 32 by means of, e.g., laser welding, curing the bonding member 5 or the like, is carried out. Next, packaging is performed by using the resin package 1. Finally, the electrode substrate 130, i.e., the anode lead 3 and the cathode lead 40, is cut off from the lead frame (not shown) and exposed portions of the remaining anode lead 3 and cathode lead 4 are subjected to Pb-free solder plating for solder mounting (not shown), thereby completing the solid electrolytic capacitor 801.

In the thirteenth embodiment of the present disclosure, the electrode substrate 130 has a stacked structure of different kinds of metal materials. The electrode substrate 130 of the solid electrolytic capacitor 801 shown in FIGS. 36A and 36B includes a first metal material layer forming a first anode lead layer 131a and a first cathode lead layer 132a, and a second metal material layer placed on the first metal material layer and forming a second anode lead layer 131b and a second cathode lead layer 132b. The first metal material layer is an upper layer, i.e., at a side of the solid electrolytic capacitor chip 201, and the second metal material layer is a lower layer, i.e., at a side of the mounting surface of the solid electrolytic capacitor 801.

In the thirteenth embodiment, the first metal material layer (i.e., the first anode lead layer 131a and the first cathode lead layer 132a) may be made of for example, nickel or a 42 alloy which is a nickel alloy, and the second metal material layer (i.e., the second anode lead layer 131b and the second cathode lead layer 132b) may be made of, for example, copper. The first metal material layer made of nickel or a 42 alloy (nickel alloy) improves heat resistance and corrosion resistance. The second metal material layer made of copper provides higher conductivity than the first metal material layer. It is known that nickel and copper have high compatibility with each other such that they are frequently used for clad material. In addition, the second metal material layer may be made of tin when considering solder wettability.

The thickness of each of the first anode lead layer 131a and first cathode lead layer 132a forming the first metal material layer is preferably 10 μm to 100 μm, and the thickness of each of the second anode lead layer 131b and second cathode lead layer 132b forming the second metal material layer is preferably 10 μm to 100 μm. In addition, the thickness of the metal substrate 130 including the first and the second metal material layer is preferably 0.05 mm to 1.0 mm. In this embodiment, the sum of thicknesses of the first and the second metal material layer, i.e., the total thickness of the electrode substrate 130, may be set to have a standard value of 0.15 mm with a tolerance of ±0.006 mm.

In addition, the outermost layer of the electrode substrate 130 may be subjected to copper plating or tin plating where appropriate. The thickness of a plating layer on the outermost layer may be 1 μm to 20 μm. This copper plating layer can improve conductivity and solder wettability.

In the present disclosure, separation of heterogeneous metals for use in the electrode substrate 130 into a plurality of layers is preferred to a mixture (or alloy) thereof. Typically, such a mixture (or alloy) may neutralize unique properties of constituent metals in the mixture. However, since the present disclosure adopts a stacked structure of the heterogeneous metals, physical properties of the metals, e.g., thermal conductivity and thermal expansion coefficients, can be arranged in a gradient manner for the purpose of devices. In addition, the metal material of the layers is not limited to pure metals shown in the above examples, but may be alloys which can be selected to obtain intended physical properties.

The lead frame (not shown) serving as the base material of the above-configured electrode substrate 130 may be formed by a rolling process or a process for forming an additional layer on a base material made of the first or the second metal material, e.g., plating, vacuum deposition or sputtering. In consideration that advantages of the present disclosure can be achieved by the stacked structure of the heterogeneous metals, a rolling process capable of providing a desirable thickness to each layer is particularly preferable.

Figure 37:
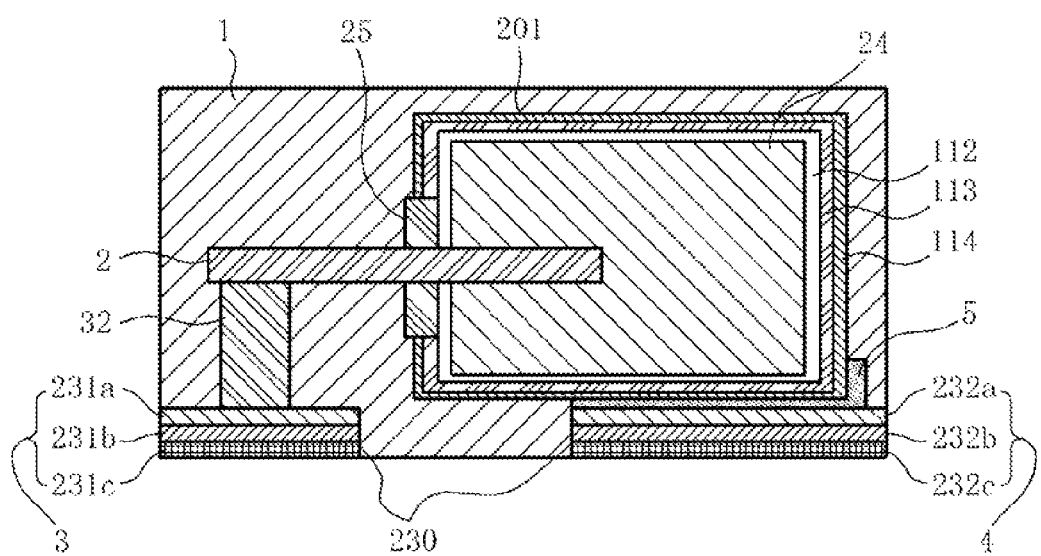
FIG. 37 is a sectional view showing a solid electrolytic capacitor according to a fourteenth embodiment of the present disclosure.

FIG. 37 shows a solid electrolytic capacitor 802 according to a fourteenth embodiment of the present disclosure. The fourteenth embodiment shows an example where a three-layered structure made of heterogeneous metals is used for the solid electrolytic capacitor 802. In this embodiment, an electrode substrate 230 is formed as a lead frame (not shown) serving as a base material in the manufacturing process, as described in the thirteenth embodiment. In the present disclosure, the three-layered structure made of heterogeneous metals includes a first metal material layer including a first anode lead layer 231a and a first cathode lead layer 232a, a second metal material layer placed on the first metal material layer and including a second anode lead layer 231b and a second cathode lead layer 232b, and a third metal material layer placed on the second metal material layer and including a second anode lead layer 231c and a third cathode lead layer 232c. That is, in the three-layered structure made of the heterogeneous metals in the present disclosure, the first metal material layer is formed on one main surface of the second metal material layer and the third metal material layer is formed on the other main surface of the second metal material layer.

In the solid electrolytic capacitor 802 in the present disclosure, the first anode lead layer 231a and the first cathode lead layer 232a forms the first metal material layer. The first anode lead layer 231a makes electrical conduction with the lead side connector 32 and the first cathode lead layer 232a makes electrical conduction with the solid electrolytic capacitor chip 201 via the bonding member 5.

In this configuration, for example, a 42 alloy may be used for the first metal material layer including the first anode lead layer 231a and the first cathode lead layer 232a, nickel may be used for the second metal material layer including the second anode lead layer 231b and the second cathode lead layer 232b, and copper may be used for the third metal material layer including the third anode lead layer 231c and the third cathode lead layer 232c.

In this configuration, a thermal expansion coefficient of the 42 alloy is $45[10^{-7}/\text{degrees C.}]$ to $65[10^{-7}/\text{degrees C.}]$ at 30 to 330 degrees C., a thermal expansion coefficient of the nickel is $133[10^{-7}/\text{degrees C.}]$ at 20 degrees C., and a thermal expansion coefficient of the copper is $168[10^{-7}/\text{degrees C.}]$ at 20 degrees C. In addition, a thermal expansion coefficient of the epoxy resin forming the resin package 1 is $200[10^{-7}/\text{degrees C.}]$ to $500[10^{-7}/\text{degrees C.}]$.

According to the electrode substrate 230 shown in the above configuration, thermal expansion coefficients are set to be in an increasing order from an upper layer at a side of the solid electrolytic capacitor chip 201 to a lower layer at a mounting surface side. That is, the thermal expansion coefficients of the first to the third layer have a relationship of (thermal expansion coefficient of the first metal material layer)<(thermal expansion coefficient of the second metal material layer)<(thermal expansion coefficient of the third metal material layer). Accordingly, since thermal expansion can be distributed among the metal material layers, it is possible to distribute a thermal stress, for example, due to a heat load during a reflow process, and prevent deterioration of device performance such as an increase in current leakage, ESR and the like.

In addition, the thermal conductivities of the layers of the electrode substrate 230 are 14.6 W/(m·K) for 42 alloy, 113 W/(m·K) for nickel and 397 W/(m·K) for copper. The electrode substrate 230 has a structure where thermal conductivities decrease in a stepwise manner as it gets closer to the uppermost layer thereof, i.e., a contact surface with the solid electrolytic capacitor chip 201. That is to say, the thermal conductivities of the layers have a relationship of (thermal expansion coefficient of the first metal material layer)<(thermal expansion coefficient of the second metal material layer)<(thermal expansion coefficient of the third metal material layer). This structure makes it difficult to transfer a reflow heat, for example, in device mounting, from the lower layer of the device, i.e., the mounting surface, to the solid electrolytic capacitor chip 201. In addition, since the stacked structure is designed such that the thermal conductivities increase in a stepwise manner toward the mounting surface, heat generated in the solid electrolytic capacitor chip 201 and transferred to the first metal material layer, i.e., the first cathode lead layer 232a, can be expected to be efficiently emitted to the outside of the device, i.e., to the device mounting surface.

In the metal material layers forming the structure of this embodiment, for example, it is preferable that the thickness of the first metal material layer including the first anode lead layer 231a and the first cathode lead layer 232a is 10 μm to 100 μm, the thickness of the second metal material layer including the second anode lead layer 231b and the second cathode lead layer 232b is 10 μm to 100 μm, the thickness of the third metal material layer including the third anode lead layer 231c and the third cathode lead layer 232c is 10 μm to 100 μm, and the thickness of the metal substrate 230 including the first to the third metal material layer is 0.05 mm to 1.0 mm. In this embodiment, the sum of the thicknesses of the first to the third metal material layer, i.e., the total thickness of the electrode substrate 230, may be set to have a standard value of 0.15 mm with a tolerance of ±0.006 mm.

The metal material layers forming the structure of this embodiment may be manufactured by a rolling process. Also, the metal material layers may be manufactured by a process in which the second metal material layer made of nickel is formed on a substrate made of a base material, e.g., a 42 alloy, by using plating, vacuum deposition, sputtering or the like, and then the third metal material layer made of copper is formed on the second metal material layer by using the same process used for the second metal material layer or other processes. The manufacturing method is not limited to the above-mentioned processes, but any other processes that can form a three-layered structure may be employed.

In addition, the outermost layer of the lead frame (not shown) corresponding to the electrode substrate 230 may be suitably subjected to copper plating or tin plating. The thickness of a plating layer on the outermost layer may be 1 μm to 20 μm.

Figure 38:
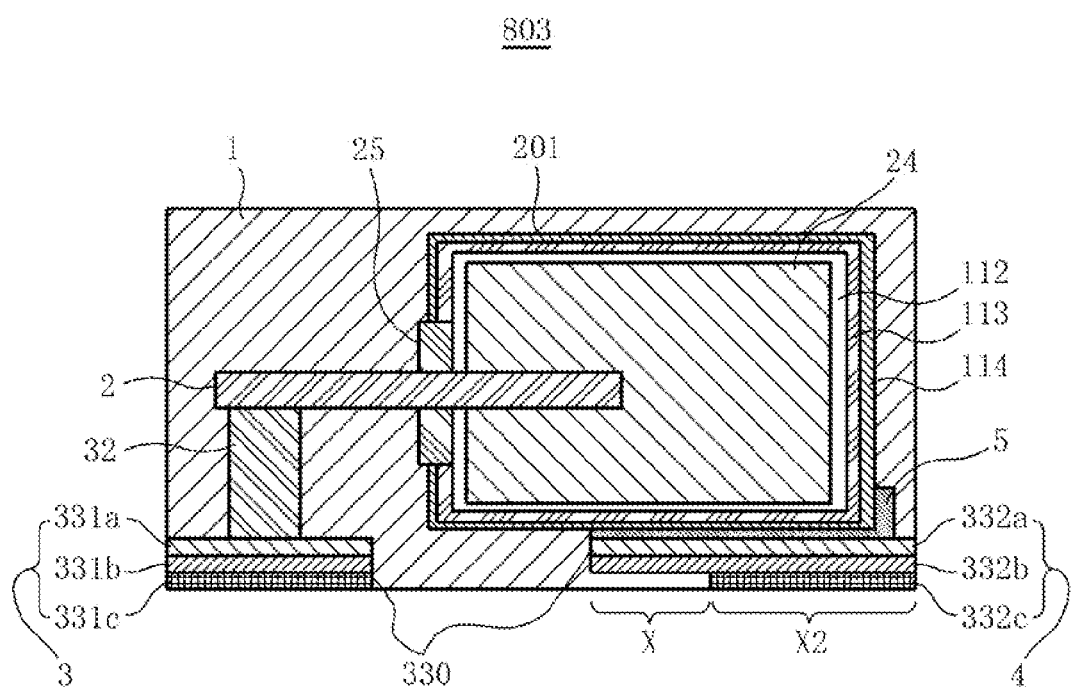
FIG. 38 is a sectional view showing a solid electrolytic capacitor according to a fifteenth embodiment of the present disclosure.

FIG. 38 shows a solid electrolytic capacitor 803 according to a fifteenth embodiment of the present disclosure. A cathode lead 4 corresponding to a characteristic part of the solid electrolytic capacitor 803 is formed with a cutout portion X. This structure is manufactured by machining a lead frame (not shown) and forming an electrode substrate 330, like the thirteenth and fourteenth embodiments. In addition, in the present disclosure, "cutout portion" indicates that the electrode substrate 330 has different thicknesses in the form of a step or a slope.

The cutout portion X is formed, for example, at a side used for surface mounting of the cathode lead 4, that is, a third cathode lead layer 332c, and accordingly, the side used for surface 1 mounting of the cathode lead 4 is divided into the cutout portion X and a residual portion X2, as shown in FIG. 38. Due to the cutout portion X, the thickness of the portion corresponding to the cutout portion X of the cathode lead 4 is smaller than the thickness of the portion corresponding to the residual portion X2. In addition, it is preferable that the thickness of the portion corresponding to the cutout portion X of the cathode lead 4 is 20% to 80% of the thickness of the electrode substrate 330 in order to maintain structural strength.

The cutout portion X is covered and protected by the resin package 1, while some of the residual portion X2 other than the cutout portion X is exposed from the resin package 1 and used for the surface mounting of the solid electrolytic capacitor 803.

One main surface of the residual portion X2 serves as a mounting surface used for the surface mounting of the solid electrolytic capacitor chip 201 and corresponds to one main surface of a third cathode lead layer 332c. The other main surface not used for the mounting is brought into contact with a second cathode lead layer 332b. The surface used for surface mounting of the third cathode lead layer 332c preferably has the same area as the surface used for surface mounting of a third anode lead layer 331c. This is a preferable electrode specification for surface mounting and, at the same time, an effective way to prevent a so-called Manhattan effect which may occur during the surface mounting.

By forming the cutout portion X, since the resin package 1 is deeply inserted and cured in the cutout portion X during a resin sealing process, i.e., a molding process, adhesiveness between the resin package 1 and the cathode lead 4 can be improved. Accordingly, it is preferable that the cutout portion X is completely embedded with the resin package 1, as shown in FIG. 38. In addition, by forming the cutout portion X, it becomes possible to increase the area making electrical conduction with the solid electrolytic capacitor chip 201 via the bonding member 5 without increasing the area of the mounting surface, i.e., an area of the cathode lead 4 exposed from the resin package 1. With this configuration, requirements of the above-mentioned surface mounting specification can be satisfied while maintaining good electrical conductivity between the cathode lead 4 and the solid electrolytic capacitor chip 201.

In the fifteenth embodiment, it is preferable that a section of the cutout portion X is placed near a boundary between the second metal material layer, i.e., the second cathode lead layer 332b, and the third metal material layer, i.e., the third cathode lead layer 332c, for example. As described in the fourteenth embodiment, the metal stacked structure of the electrode substrate 330 used in the fifteenth embodiment has the thermal expansion coefficients increasing as it moves closer from the solid electrolytic capacitor chip to the mounting surface. That is, in the fifteenth embodiment, the second cathode lead layer 332b has a thermal expansion coefficient larger than that of the third cathode lead layer 332c, which means that the difference in the thermal expansion coefficient between the epoxy resin of the resin package 1 and the metal material of the cathode lead 4 decreases as it goes downward. With this configuration, the cutout portion X can advantageously provide an effect of a distribution of heat stress in the device bottom having a weak structure and hence improve heat stress resistance of the solid electrolytic capacitor 803.

The electrode substrate 330 having the cutout portion X can be obtained by subjecting the three-layered substrate shown in the fourteenth embodiment, i.e., the electrode substrate 230, to half etching, for example. The half etching can be stopped in the middle of one of the metal material layers, but can be more easily stopped at one of boundaries between the metal material layers when considering different etching rates between the metal material layers. When forming the structure, i.e., the cutout portion X, shown in FIG. 38, in order to only remove the third cathode lead layer 332c made of copper, the nickel and copper stacked substrate may be selectively etched by using, for example, a well-known etching solution containing oxygenated water, sulfuric acid and water. By performing the above-mentioned method on the three-layered electrode substrate 230 in the fourteenth embodiment, the copper layer can be selectively dissolved and the electrode substrate 330 having the cutout portion X can be prepared.

In the metal stacked structure in the fifteenth embodiment, it is preferable that the thickness of the first metal material layer including the first anode lead layer 331a and the first cathode lead layer 332a is set to be 10 µm to 100 µm, the thickness of the second metal material layer including the second anode lead layer 331b and the second cathode lead layer 332b is set to be 10 µm to 100 µm, the thickness of the third metal material layer including the third anode lead layer 331c and the third cathode lead layer 332c is set to be 10 µm to 100 µm, and the thickness of the metal substrate 330 including the first to the third metal material layer is set to be 0.05 mm to 1.0 mm. In this embodiment, the sum of the thicknesses of the first to the third metal material layer, i.e., the total thickness of the electrode substrate 330, may be set to have a standard value of 0.15 mm with a tolerance of ±0.006 mm.

In addition, the outermost layer of the lead frame (not shown) corresponding to the electrode substrate 230 may be suitably subjected to copper plating or tin plating (not shown). The thickness of a plating layer on the outermost layer may be 1 µm to 20 µm, and the plating may be carried out even after the cutout portion X is formed.

Figure 39:
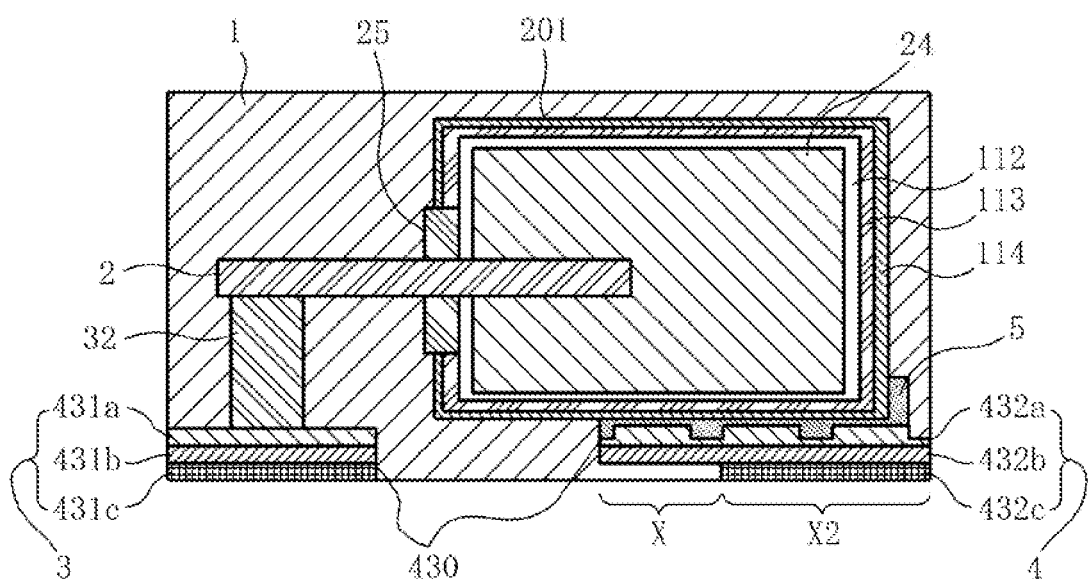
FIG. 39 is a sectional view showing a solid electrolytic capacitor according to a sixteenth embodiment of the present disclosure.

FIG. 39 shows a solid electrolytic capacitor 804 according to a sixteenth embodiment of the present disclosure. The structure shown in FIG. 39 is characterized in that a surface of the cathode lead 4, i.e., a first cathode lead layer 432a brought into contact with the solid electrolytic capacitor chip 201 via the bonding member 5, has unevenness, while the anode lead 3 has the same configuration as that of the fifteenth embodiment. The unevenness may be formed in at least one of a second cathode lead layer 432b and a third cathode lead layer 432c, as well as the first cathode lead layer 432a. Further, unevenness may be formed in the contact region between the second cathode lead layer 432b and the third cathode lead layer 432c in an engaging manner, for example. This structure can further improve the mechanical strength of the cathode lead 4. In addition to the cathode lead 4 side, such unevenness may be also formed in the anode lead 3 side. The unevenness of both the anode lead 3 and the cathode lead 4 can make a contribution to further improve the mechanical strength of the solid electrolytic capacitor 804.

In the unevenness structure shown in the present disclosure, the uppermost surface (i.e., the cathode electrode terminal 432*a*) is made of 42 alloy. A thermal expansion coefficient of the 42 alloy is 45[$10^{-7}$/degrees C.] to 65[$10^{-7}$/degrees C] at 30 degrees C. to 330 degrees C., which is smaller than those of other metal materials forming the stacked structure. In the present disclosure, since the bonding member 5 and the cathode electrode terminal 432*a* are bonded under a state where the unevenness structure made of 42 alloy is interposed therebetween, the contact area between the cathode electrode terminal 432*a* and the bonding member 5 is significantly increased. This facilitates an improvement of the adhesiveness between the bonding member 5 and the cathode electrode terminal 432*a* and an improvement of the heat stress resistance of the solid electrolytic capacitor 804. In addition, since the unevenness structure increases a surface area of the cathode electrode terminal 432*a*, it can be expected that electrical resistance between the cathode electrode terminal 432*a* and the solid electrolytic capacitor chip 201, between which the bonding member 5 is interposed, is reduced and accordingly ESR is reduced.

The same cutout portion X as the fifteenth embodiment may be formed in the cathode lead 4. This cutout portion X improves adhesiveness between the resin package 1 and the cathode lead 4. In addition, this can increase an area making electrical conduction with the solid electrolytic capacitor chip 201 via the bonding member 5 without extremely increasing the mounting surface, i.e., an area of the cathode lead 4 exposed from the resin package 1. These characteristics of the cutout portion X is the same as in the fifteenth embodiment. In addition, when manufacturing the cathode lead 4 having both the unevenness and the cutout portion X, i.e., the structure shown in FIG. 39, a lead frame (not shown) corresponding to a base material of the electrode substrate having the cutout portion X shown in the fifteenth embodiment may be sequentially treated with the above-described method to add an unevenness structure thereto.

The structure of the sixteenth embodiment may be formed by performing a series of treatments on a substrate having a structure in which two or three layers made of metal material shown in the thirteenth or fourteenth embodiment are stacked. For example, the structure of the sixteenth embodiment may be formed by performing a treatment for adding an unevenness structure to a substrate having a two-layered structure by using sputtering, vacuum deposition or the like, and then performing a treatment for subjecting a substrate having a three-layered structure to half etching, deep etching or the like by using photolithography.

Figure 40:
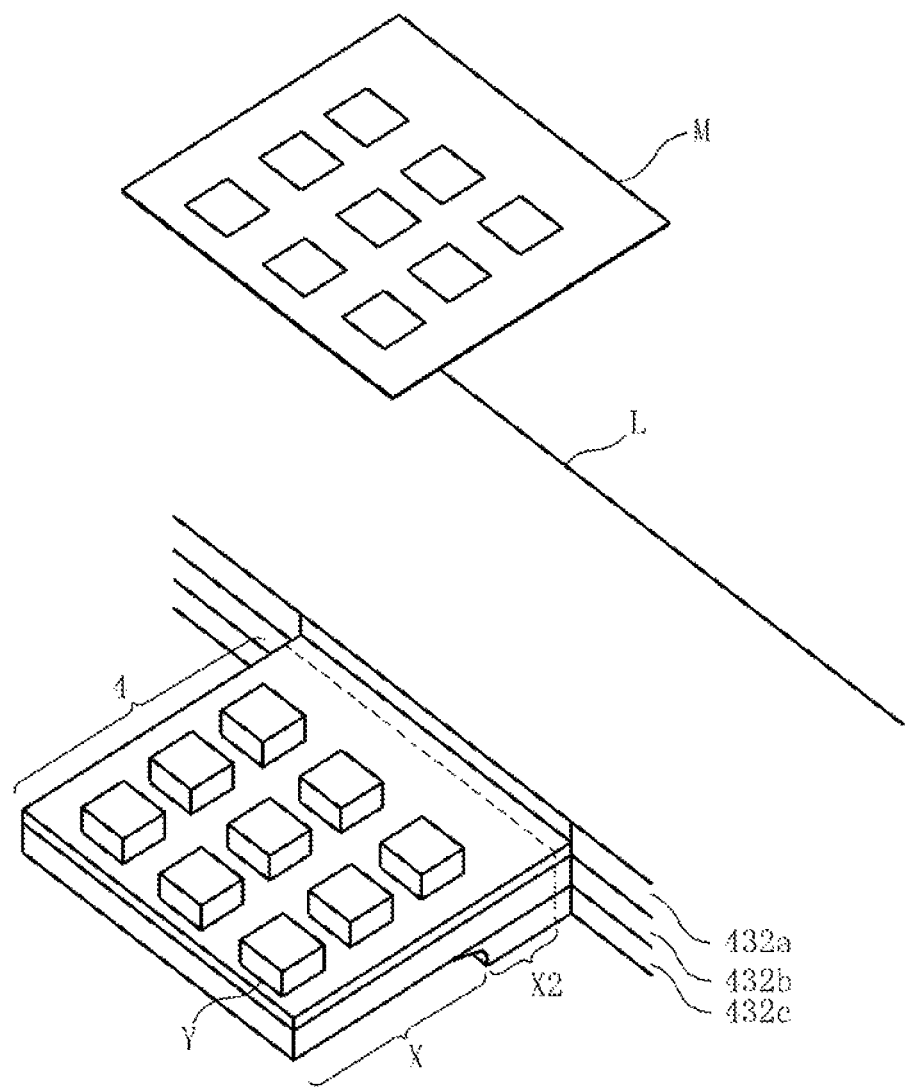
FIG. 40 is a conceptual view showing a method of manufacturing a cathode lead according to the sixteenth embodiment of the present disclosure.

FIG. 40 is a conceptual view showing a method of manufacturing the cathode lead 4 of the electrode substrate 430 shown in FIG. 39. A lead frame L may be inexpensively manufactured by, for example, performing a half etching or a deep etching on the lead frame used in the fifteenth embodiment to form an unevenness structure sequentially. Although, in the structure shown in FIG. 40, the three-layered metal material substrate having the cutout portion X shown in the fifteenth embodiment is used to manufacture the lead frame L, the unevenness of the present disclosure may be also adopted to a two-layered metal material stacked substrate, for example.

First, a photosensitive polyimide resin serving as a photosensitive resist is applied on the top surface of the cathode lead 4 of the electrode substrate 430, i.e., the first cathode lead layer 432*a*, by using dipping, for example. Next, a mask M for use in transferring a pattern is prepared as shown in FIG. 40. The mask M is closely adhered to the surface applied with the photosensitive resist and exposed by irradiating ultraviolet rays thereon. Thereafter, a predetermined chemical treatment is performed to form the unevenness structure on the first cathode lead layer 432*a* as shown in FIG. 40.

In the metal stacked structure used in the sixteenth embodiment, it is preferable that the thickness of the first metal material layer including the first anode lead layer 431*a* and the first cathode lead layer 432*a* is set to be 10 μm to 100 μm, the thickness of the second metal material layer including the second anode lead layer 431*b* and the second cathode lead layer 432*b* is set to be 10 μm to 100 μm, the thickness of the third metal material layer including the third anode lead layer 431*c* and the third cathode lead layer 432*c* is set to be 10 μm to 100 μm, and the thickness of the metal substrate 430 including the first to the third metal material layer is set to be 0.05 mm to 1.0 mm. In this embodiment, the sum of the thicknesses of the first to the third metal material layer, i.e., the total thickness of the electrode substrate 430, may be set to have a standard value of 0.15 mm with a tolerance of ±0.006 mm.

It is preferable that the etching for forming the unevenness structure is performed to a depth not exceeding the first cathode lead layer 432*a*. That is, the height of a convex portion Y in the unevenness structure may be 10% to 90% of the thickness of the first cathode lead layer 432*a*.

The unevenness structure may have roughness like the surface of a pear. The roughness may be formed by using, for example, air blast, short blast, sand blast, wet blast and the like. A wet blast is particularly preferable from the standpoint of uniformity, controllability and cleanness of an uneven surface. This configuration can also provide improvement of adhesiveness and reduction of electrical resistance, like the above-described unevenness structure.

The outermost layer of the lead frame L may be suitably subjected to copper plating or tin plating (not shown). The thickness of a plating layer on the outermost layer may be 1 μm to 20 μm, and the plating may be carried out even after the cutout portion X and the above-described unevenness structure are formed.

Figures 41, 42:
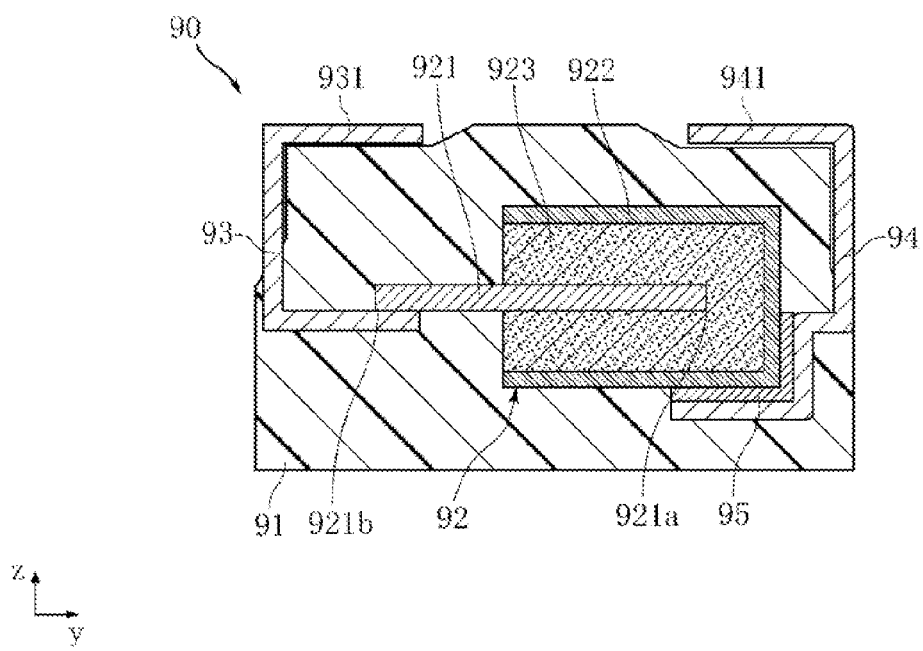
FIG. 41 is a view showing conditions suitable for an electrode substrate of a solid electrolytic capacitor according to the present disclosure.
FIG. 42 is a perspective view showing one example of a conventional solid electrolytic capacitor.
Figure 43:
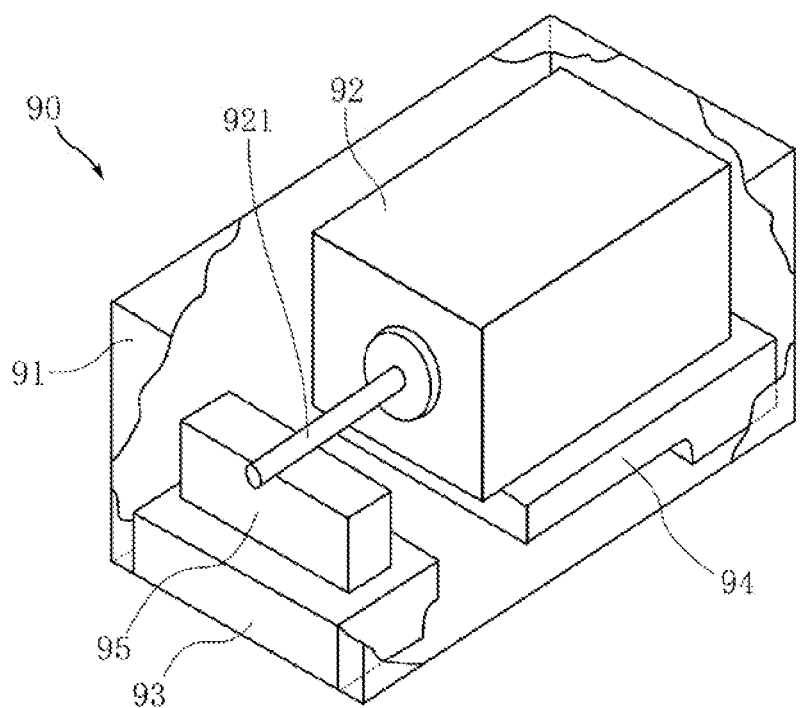
FIG. 43 is a sectional view showing one example of another conventional solid electrolytic capacitor.
Figure 44:
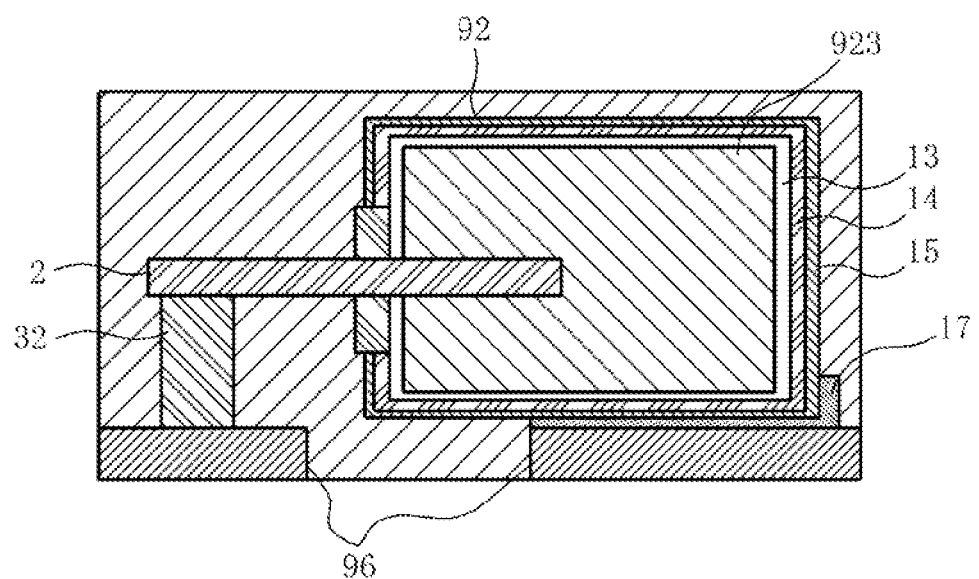
FIG. 44 is a sectional view of one example of another conventional solid electrolytic capacitor.

FIG. 41 is a table showing a preferable combination of the three-layered metal material stacked structure using the characteristics of the electrode substrates 230, 330 and 430 described in the fourteenth to sixteenth embodiments of the present disclosure. It is preferable that the respective thicknesses of the first to the third metal layer forming the layered structure of the present disclosure are properly adjusted to 10 μm to 100 μm and absolute values of thermal expansion coefficients and thermal conductivities of metals forming the layers increase in order of the first to the third layer. In addition, in FIG. 41, for example, the first layer corresponds to the first cathode lead layer 232*a* of the fourteenth embodiment shown in FIG. 37, and the second and the third layer respectively correspond to the second and third cathode lead layers 232*b* and 232*c* of the fourteenth embodiment shown in FIG. 37. This configuration mainly aims to provide the effect of efficient distribution of heat stress, as described above. In addition to the combination of metals described in the thirteenth to sixteenth embodiments, a group of metals meeting the relationship in the table shown in FIG. 41 can be used without deteriorating the effects of the present disclosure.

The solid electrolytic capacitors of the thirteenth to sixteenth embodiments of the present disclosure, which use a metal or alloy material stacked structure for an electrode substrate, have high industrial applicability due to high heat resistance and low defect rate.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A solid electrolytic capacitor comprising:
   a porous sintered body;
   an anode wire extending in a first direction and connected to the porous sintered body such that one end portion of the anode wire in the first direction is exposed;
   a resin package covering the porous sintered body and the anode wire; and
   a lead including a terminal exposed from the resin package and a lead side connector connected to the terminal,
   wherein the anode wire includes a base and a connector placed at one side of the base in the first direction,
   wherein a sectional area of the connector is smaller than that of the base, and
   wherein the connector and the lead side connector are welded together,
   wherein the base has a circular section and extends in the first direction,
   wherein the lead side connector is placed at one side of the connector in a second direction perpendicular to the first direction,
   wherein a thickness of the connector in the second direction is smaller than a diameter of the circular section of the base, and
   wherein a width of the connector in a third direction perpendicular to the first and second directions is smaller than a width of the one side of the base where the connector is placed.

2. The solid electrolytic capacitor of claim 1, wherein the connector has a plate shape having a thickness in the second direction smaller than the diameter of the circular section of the base 3. The solid electrolytic capacitor of claim 2, wherein the connector has an inclined portion formed at one edge portion of the connector in the third direction, a thickness of the inclined portion in the second direction decreasing as it moves toward the third direction.

4. The solid electrolytic capacitor of claim 3, wherein said one edge portion of the inclined portion of the connector in the third direction is welded to the lead side connector.

5. The solid electrolytic capacitor of claim 1, wherein the connector has a diamond-like section, wherein the width is a diagonal width that is smaller than the diameter of the base.

6. The solid electrolytic capacitor of claim 1, wherein the connector has a circular section, wherein the width is a diameter that is smaller than that of the base.

7. The solid electrolytic capacitor of claim 1, wherein the lead side connector has a groove depressed in the second direction and extending in the first direction, and the connector is welded to the groove.

8. The solid electrolytic capacitor of claim 7, further comprising a cavity interposed in the second direction between the connector and one end portion of the groove in the second direction.

9. The solid electrolytic capacitor of claim 8, wherein the groove has a V shape when viewed in the first direction, and a pair of slopes forming the V shape is welded to the connector.

10. The solid electrolytic capacitor of claim 1, wherein the connector is placed to overlap with the center portion of the circular section of the base when viewed in the first direction.

11. The solid electrolytic capacitor of claim 1, wherein the connector is placed to overlap with one end portion of the base in the second direction when viewed in the first direction.

12. The solid electrolytic capacitor of claim 1, wherein a rough surface is formed on one side of the connector in the second direction.

13. The solid electrolytic capacitor of claim 1, wherein one end portion of the connector in the first direction is exposed from the porous sintered body.

14. The solid electrolytic capacitor of claim 13, wherein one end portion of the base in the first direction is exposed from the porous sintered body.

15. The solid electrolytic capacitor of claim 1, further comprising a hydrophobic member,
   wherein the base has an exposed portion exposed from the porous sintered body, and
   wherein the hydrophobic member is brought into contact with the exposed portion and one end surface of the porous sintered body in the first direction.

16. The solid electrolytic capacitor of claim 15, wherein the base further has an embedded portion connected to the exposed portion and embedded in the porous sintered body.

17. The solid electrolytic capacitor of claim 1, wherein the width of the connector in the third direction perpendicular to the first and second directions is smaller than the diameter of the circular section of the base.

18. A method for manufacturing a solid electrolytic capacitor including a porous sintered body, an anode wire extending in a first direction and connected to the porous sintered body such that one end portion of the anode wire in the first direction is exposed, a resin package covering the porous sintered body and the anode wire, and a lead including a terminal exposed from the resin package and a lead side connector connected to the terminal, wherein the anode wire includes a base and a connector placed at one side of the base in the first direction, wherein a sectional area of the connector is smaller than that of the base, wherein the connector and the lead side Connector are welded together, wherein the base has a circular section and extends in the first direction, wherein the lead side connector is placed at one side of the Connector in a second direction perpendicular to the first direction, wherein thickness of the connector in the second direction is smaller than a diameter of the circular section of the base, and wherein a width of the connector in a third direction perpendicular to the first and second directions is smaller than a width of the one side of the base where the connector is placed, the method comprising:
   machining a manufacturing wire extending in a first direction and connected to a porous sintered body such that a first end portion is exposed in the first direction;
   welding the manufacturing wire and a lead side connector of a manufacturing lead together;
   and forming a resin package covering the porous sintered body,
   wherein said machining the manufacturing wire includes decreasing a sectional area of at least a portion of the manufacturing wire exposed from the porous sintered body,
   wherein a first portion of the manufacturing wire corresponds to a connector, the first portion having a sectional area decreased by said decreasing the sectional area, and
   wherein a second portion of the manufacturing wire corresponds to a base, the second portion including a second end portion opposite to the first end portion in the first direction and not subjected to said decreasing the sectional area.

19. The method of claim 18, wherein the manufacturing wire has a circular section, wherein in said machining the manufacturing wire, a thickness of the manufacturing wire in a second direction perpendicular to the first direction is machined to be smaller than a diameter of a section of the manufacturing wire, and wherein in said welding the manufacturing wire and the lead side connector, on one side of the connector in the second direction is welded to the lead side connector.

* * * * *